US012694225B1

(12) United States Patent
Galvin

(10) Patent No.: US 12,694,225 B1
(45) Date of Patent: Jul. 28, 2026

(54) SYSTEM AND METHOD FOR PERSISTENT COGNITIVE MACHINES WITH MULTI-TIMESCALE MEMORY AND COMPRESSED-SPACE COGNITION

(71) Applicant: AtomBeam Technologies Inc., Moraga, CA (US)

(72) Inventor: Brian Galvin, Silverdale, WA (US)

(73) Assignee: AUTOBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/448,101

(22) Filed: Jan. 13, 2026

Related U.S. Application Data

(63) Continuation-in-part of application No. 19/424,188, filed on Dec. 18, 2025, which is a
(Continued)

(51) Int. Cl.
*G06F 40/30* (2020.01)
*G06F 16/332* (2025.01)
*G06F 16/3329* (2025.01)

(52) U.S. Cl.
CPC .......... *G06F 40/30* (2020.01); *G06F 16/3325* (2019.01); *G06F 16/3329* (2019.01)

(58) Field of Classification Search
CPC .. G06F 40/30; G06F 16/3325; G06F 16/3329; G06F 21/316; G06F 3/011;
(Continued)

(56) References Cited

U.S. PATENT DOCUMENTS

2004/0083195 A1    4/2004   McCord et al.
2009/0235099 A1    9/2009   Branover et al.
(Continued)

FOREIGN PATENT DOCUMENTS

WO    WO-2015155602 A2 * 10/2015   ............... G09B 7/02
WO    WO-2023239647 A2 * 12/2023   ............. G16H 20/10

*Primary Examiner* — Yogeshkumar Patel
(74) *Attorney, Agent, or Firm* — GALVIN PATENT LAW LLC; Brian R. Galvin; Alec L. Perry

(57) ABSTRACT

A system and method for implementing a Persistent Cognitive Machine (PCMs) that extends beyond the traditional prompt-response paradigm of artificial intelligence are disclosed. A PCM maintains persistent cognitive processes regardless of external interaction, stores and organizes thoughts in a thought cache, retrieves relevant thoughts based on current stimuli, generates new thoughts through reasoning processes, and curates stored thoughts during periods of reduced external interaction. The PCM includes language and reasoning model components, a thought cache, an executive component, and an embedding system. The PCM remains continuously active, remembers previous experiences, learns from these experiences, creates new thought experiences independently, and initiates interactions without waiting for external prompts. The PCM enters sleep-like states during which it curates its thought cache, generalizes experiences, and performs other memory management functions. Applications may include but are not limited to synthetic cognitive colleagues, strategic war gaming platforms, and personal cognitive assistants.

8 Claims, 26 Drawing Sheets

Related U.S. Application Data continuation-in-part of application No. 19/401,186, filed on Nov. 25, 2025, which is a continuation-in-part of application No. 19/399,611, filed on Nov. 24, 2025, which is a continuation-in-part of application No. 19/397,844, filed on Nov. 21, 2025, which is a continuation-in-part of application No. 19/379,579, filed on Nov. 4, 2025, which is a continuation-in-part of application No. 19/378,949, filed on Nov. 4, 2025, which is a continuation-in-part of application No. 19/377,013, filed on Nov. 2, 2025, which is a continuation-in-part of application No. 19/352,457, filed on Oct. 7, 2025, which is a continuation-in-part of application No. 19/321,173, filed on Sep. 6, 2025, now Pat. No. 12,602,549, which is a continuation-in-part of application No. 19/284,115, filed on Jul. 29, 2025, which is a continuation of application No. 19/051,193, filed on Feb. 12, 2025, now Pat. No. 12,387,050, said application No. 19/352,457 is a continuation-in-part of application No. 19/038,801, filed on Jan. 28, 2025, which is a continuation of application No. 18/818,593, filed on Aug. 29, 2024, now Pat. No. 12,308,862, which is a continuation-in-part of application No. 18/755,627, filed on Jun. 26, 2024, now Pat. No. 12,200,102, and a continuation-in-part of application No. 18/657,719, filed on May 7, 2024, now Pat. No. 12,166,506, which is a continuation-in-part of application No. 18/423,287, filed on Jan. 25, 2024, now Pat. No. 12,218,696, which is a continuation of application No. 18/501,987, filed on Nov. 4, 2023, now Pat. No. 11,967,974, which is a continuation-in-part of application No. 18/190,044, filed on Mar. 24, 2023, now Pat. No. 11,831,343, which is a continuation-in-part of application No. 17/875,201, filed on Jul. 27, 2022, now Pat. No. 11,700,013, which is a continuation of application No. 17/514,913, filed on Oct. 29, 2021, now Pat. No. 11,424,760, which is a continuation-in-part of application No. 17/404,699, filed on Aug. 17, 2021, now Pat. No. 11,385,794, said application No. 17/875,201 is a continuation of application No. 17/458,747, filed on Aug. 27, 2021, now Pat. No. 11,422,978, which is a continuation-in-part of application No. 16/923,039, filed on Jul. 7, 2020, now Pat. No. 11,232,076, which is a continuation-in-part of application No. 16/716,098, filed on Dec. 16, 2019, now Pat. No. 10,706,018, said application No. 18/190,044 is a continuation-in-part of application No. 17/727,913, filed on Apr. 25, 2022, now Pat. No. 11,620,051, which is a continuation of application No. 17/404,699, filed on Aug. 17, 2021, now Pat. No. 11,385,794, said application No. 18/657,719 is a continuation-in-part of application No. 18/410,980, filed on Jan. 11, 2024, now Pat. No. 12,068,761, which is a continuation-in-part of application No. 18/537,728, filed on Dec. 12, 2023, now Pat. No. 12,058,333, said application No. 18/818,593 is a continuation-in-part of application No. 18/657,683, filed on May 7, 2024, now Pat. No. 12,159,216, which is a continuation-in-part of application No. 18/648,340, filed on Apr. 27, 2024, now Pat. No. 12,166,507, which is a continuation-in-part of application No. 18/427,716, filed on Jan. 30, 2024, now Pat. No. 12,093,972, which is a continuation-in-part of application No. 18/410,980, filed on Jan. 11, 2024, now Pat. No. 12,068,761, said application No.

19/377,013 is a continuation-in-part of application No. 19/326,730, filed on Sep. 12, 2025, now Pat. No. 12,608,555, which is a continuation-in-part of application No. 19/321,173, filed on Sep. 6, 2025, now Pat. No. 12,602,549, and a continuation-in-part of application No. 19/245,366, filed on Jun. 22, 2025, now Pat. No. 12,418,680, and a continuation-in-part of application No. 19/204,525, filed on May 10, 2025, which is a continuation-in-part of application No. 19/192,215, filed on Apr. 28, 2025, which is a continuation-in-part of application No. 18/972,797, filed on Dec. 6, 2024, now Pat. No. 12,294,392, which is a continuation-in-part of application No. 18/648,340, filed on Apr. 27, 2024, now Pat. No. 12,166,507, said application No. 19/378,949 is a continuation-in-part of application No. 19/328,094, filed on Sep. 12, 2025, now Pat. No. 12,632,663, which is a continuation-in-part of application No. 19/321,173, filed on Sep. 6, 2025, now Pat. No. 12,602,549, said application No. 19/379,579 is a continuation-in-part of application No. 19/363,675, filed on Oct. 21, 2025, which is a continuation-in-part of application No. 19/351,286, filed on Oct. 6, 2025, which is a continuation-in-part of application No. 19/321,173, filed on Sep. 6, 2025, now Pat. No. 12,602,549, said application No. 19/397,844 is a continuation-in-part of application No. 19/329,330, filed on Sep. 15, 2025, which is a continuation-in-part of application No. 19/328,094, filed on Sep. 12, 2025, now Pat. No. 12,632,663, said application No. 19/397,844 is a continuation-in-part of application No. 19/003,258, filed on Dec. 27, 2024, which is a continuation of application No. 18/822,203, filed on Sep. 1, 2024, now Pat. No. 12,229,679, which is a continuation-in-part of application No. 18/427,716, filed on Jan. 30, 2024, now Pat. No. 12,093,972, said application No. 19/399,611 is a continuation-in-part of application No. 19/315,849, filed on Sep. 1, 2025, now Pat. No. 12,572,830, which is a continuation-in-part of application No. 19/294,125, filed on Aug. 7, 2025, now Pat. No. 12,579,437, which is a continuation-in-part of application No. 19/203,069, filed on Jun. 3, 2025, now Pat. No. 12,481,688, which is a continuation-in-part of application No. 19/205,960, filed on May 12, 2025, which is a continuation-in-part of application No. 19/060,794, filed on Feb. 24, 2025, which is a continuation-in-part of application No. 19/044,546, filed on Feb. 3, 2025, which is a continuation-in-part of application No. 19/026,276, filed on Jan. 16, 2025, which is a continuation-in-part of application No. 18/928,022, filed on Oct. 26, 2024, which is a continuation-in-part of application No. 18/919,417, filed on Oct. 17, 2024, now Pat. No. 12,602,586, which is a continuation-in-part of application No. 18/918,077, filed on Oct. 17, 2024, which is a continuation-in-part of application No. 18/737,906, filed on Jun. 7, 2024, and a continuation-in-part of application No. 18/736,498, filed on Jun. 6, 2024, said application No. 19/294,125 is a continuation-in-part of application No. 19/178,873, filed on Apr. 15, 2025, now Pat. No. 12,608,631, which is a continuation-in-part of application No. 19/177,611, filed on Apr. 13, 2025, now Pat. No. 12,572,471, which is a continuation-in-part of application No. 19/051,193, filed on Feb. 12, 2025, now Pat. No. 12,387,050, said application No. 19/424,188 is a continuation-in-part of application No. 18/887,424, filed on Sep. 17, 2024, which is a continuation of application No. 18/648,340, filed on Apr. 27, 2024, now Pat. No. 12,166,507, said application No. 19/424,188 is a continuation-in-part of application No. 18/810,505, filed on Aug. 21, 2024, which is a continuation of application No. 18/657,683, filed on May 7, 2024, now Pat. No. 12,159,216, said application No. 19/424,188 is a continuation-in-part of application No. 18/929,938, filed on Oct. 29, 2024, which is a continuation of application No. 18/627,451, filed on Apr. 5, 2024, now Pat. No. 12,190,573.

(60) Provisional application No. 63/847,082, filed on Jul. 19, 2025, provisional application No. 63/847,091, filed on Jul. 19, 2025, provisional application No. 63/847,096, filed on Jul. 19, 2025, provisional application No. 63/847,101, filed on Jul. 19, 2025, provisional application No. 63/847,969, filed on Jul. 21, 2025, provisional application No. 63/027,166, filed on May 19, 2020, provisional application No. 63/388,411, filed on Jul. 12, 2022, provisional application No. 63/847,889, filed on Jul. 21, 2025, provisional application No. 63/651,359, filed on May 23, 2024.

(58) Field of Classification Search
CPC .......... G06N 3/086; G06N 3/043; G06N 3/04; G16H 50/20; H04L 12/1822
See application file for complete search history.

(56) References Cited

U.S. PATENT DOCUMENTS

| | | | | |
|---|---|---|---|---|
| 2014/0324747 | A1* | 10/2014 | Crowder | G06N 3/043 |
| | | | | 706/18 |
| 2015/0339570 | A1* | 11/2015 | Scheffler | G06N 3/04 |
| | | | | 706/27 |
| 2017/0251985 | A1* | 9/2017 | Howard | A61B 5/7282 |
| 2020/0234605 | A1* | 7/2020 | Shuart | G06F 21/316 |
| 2024/0289395 | A1 | 8/2024 | Zhou et al. | |
| 2025/0085894 | A1 | 3/2025 | Lee et al. | |

* cited by examiner

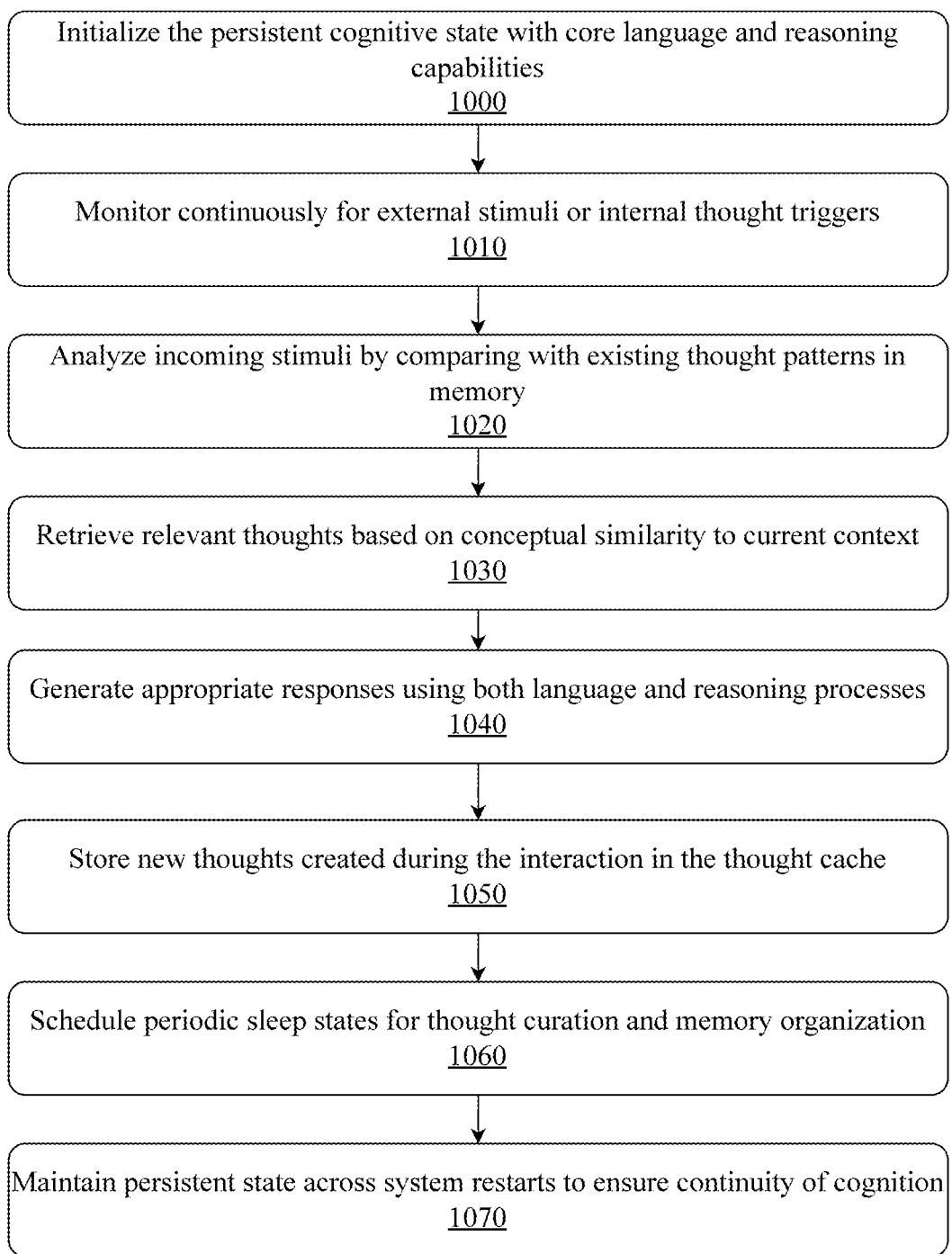

Initialize the persistent cognitive state with core language and reasoning capabilities
1000

Monitor continuously for external stimuli or internal thought triggers
1010

Analyze incoming stimuli by comparing with existing thought patterns in memory
1020

Retrieve relevant thoughts based on conceptual similarity to current context
1030

Generate appropriate responses using both language and reasoning processes
1040

Store new thoughts created during the interaction in the thought cache
1050

Schedule periodic sleep states for thought curation and memory organization
1060

Maintain persistent state across system restarts to ensure continuity of cognition
1070

FIG. 10

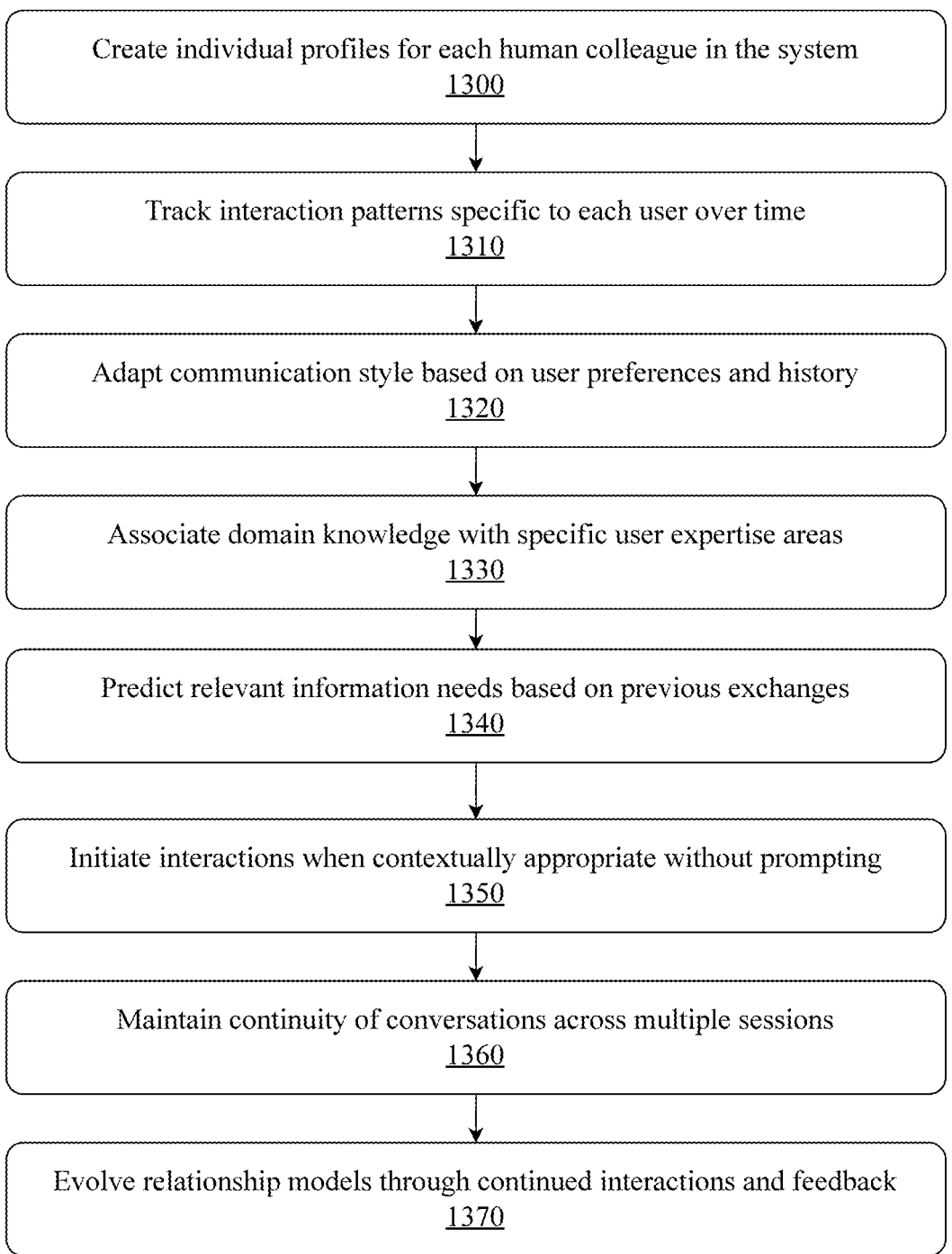

Create individual profiles for each human colleague in the system
1300

Track interaction patterns specific to each user over time
1310

Adapt communication style based on user preferences and history
1320

Associate domain knowledge with specific user expertise areas
1330

Predict relevant information needs based on previous exchanges
1340

Initiate interactions when contextually appropriate without prompting
1350

Maintain continuity of conversations across multiple sessions
1360

Evolve relationship models through continued interactions and feedback
1370

FIG. 13

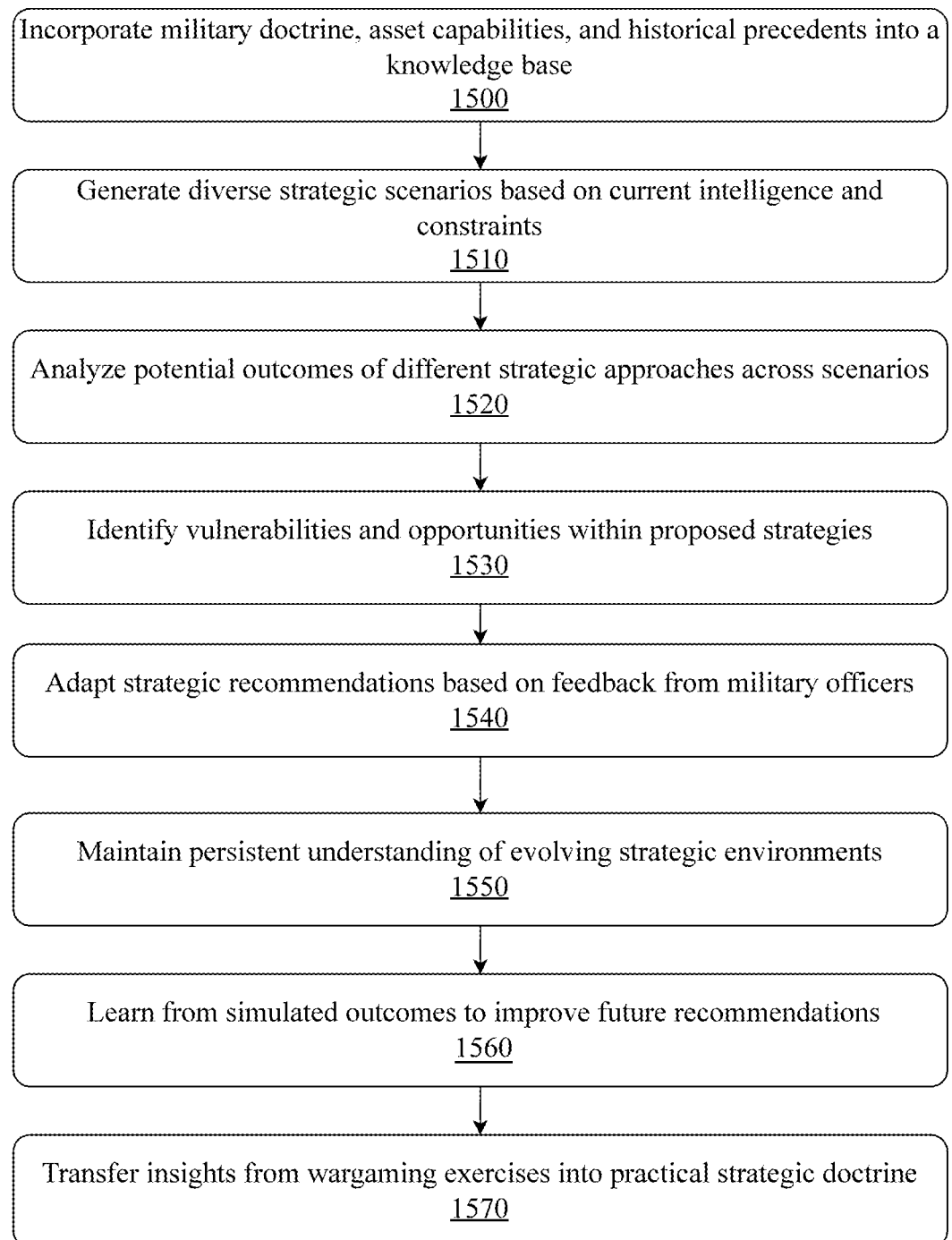

Incorporate military doctrine, asset capabilities, and historical precedents into a
knowledge base
1500

Generate diverse strategic scenarios based on current intelligence and
constraints
1510

Analyze potential outcomes of different strategic approaches across scenarios
1520

Identify vulnerabilities and opportunities within proposed strategies
1530

Adapt strategic recommendations based on feedback from military officers
1540

Maintain persistent understanding of evolving strategic environments
1550

Learn from simulated outcomes to improve future recommendations
1560

Transfer insights from wargaming exercises into practical strategic doctrine
1570

FIG. 15

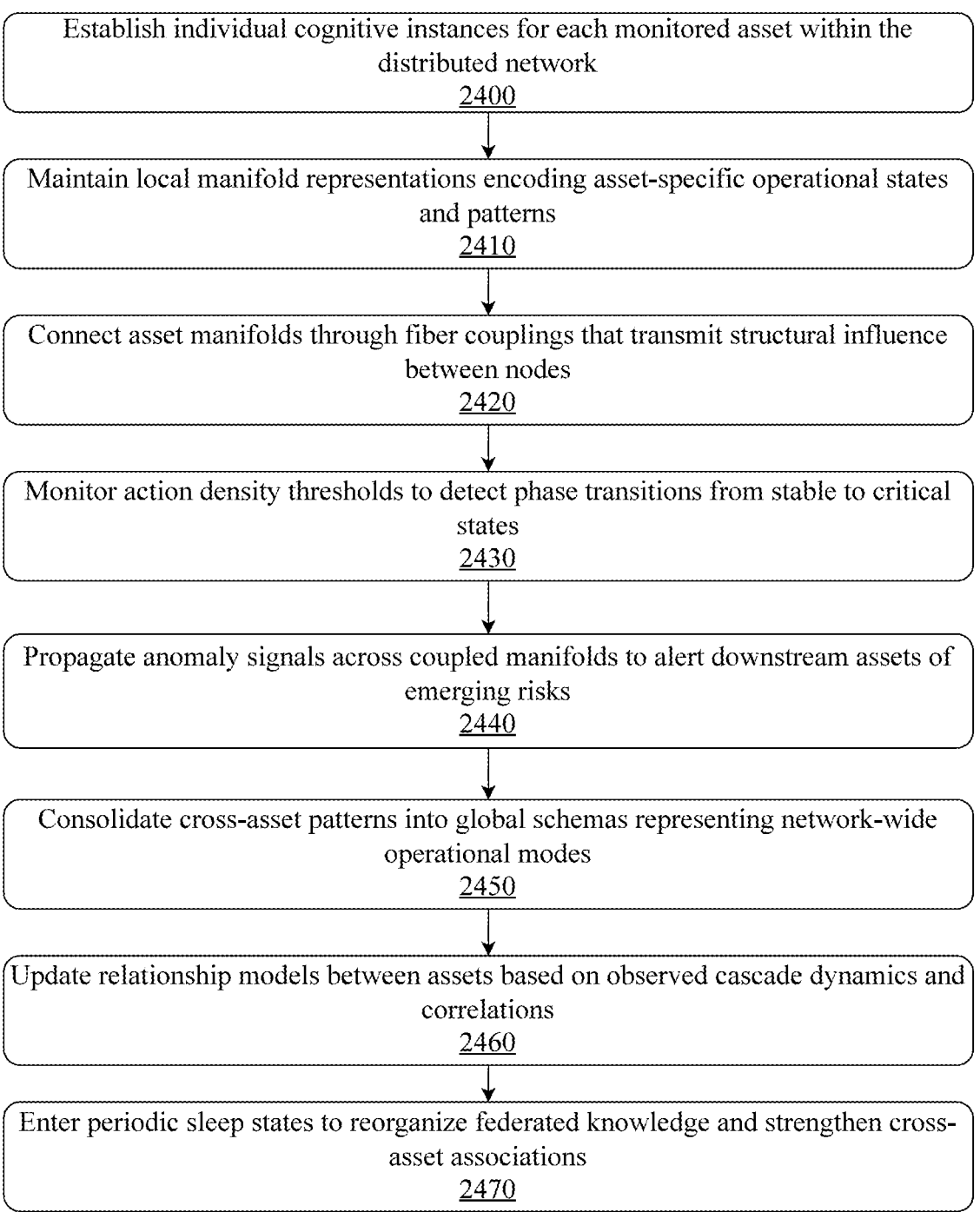

Establish individual cognitive instances for each monitored asset within the distributed network
2400

Maintain local manifold representations encoding asset-specific operational states and patterns
2410

Connect asset manifolds through fiber couplings that transmit structural influence between nodes
2420

Monitor action density thresholds to detect phase transitions from stable to critical states
2430

Propagate anomaly signals across coupled manifolds to alert downstream assets of emerging risks
2440

Consolidate cross-asset patterns into global schemas representing network-wide operational modes
2450

Update relationship models between assets based on observed cascade dynamics and correlations
2460

Enter periodic sleep states to reorganize federated knowledge and strengthen cross-asset associations
2470

FIG. 24

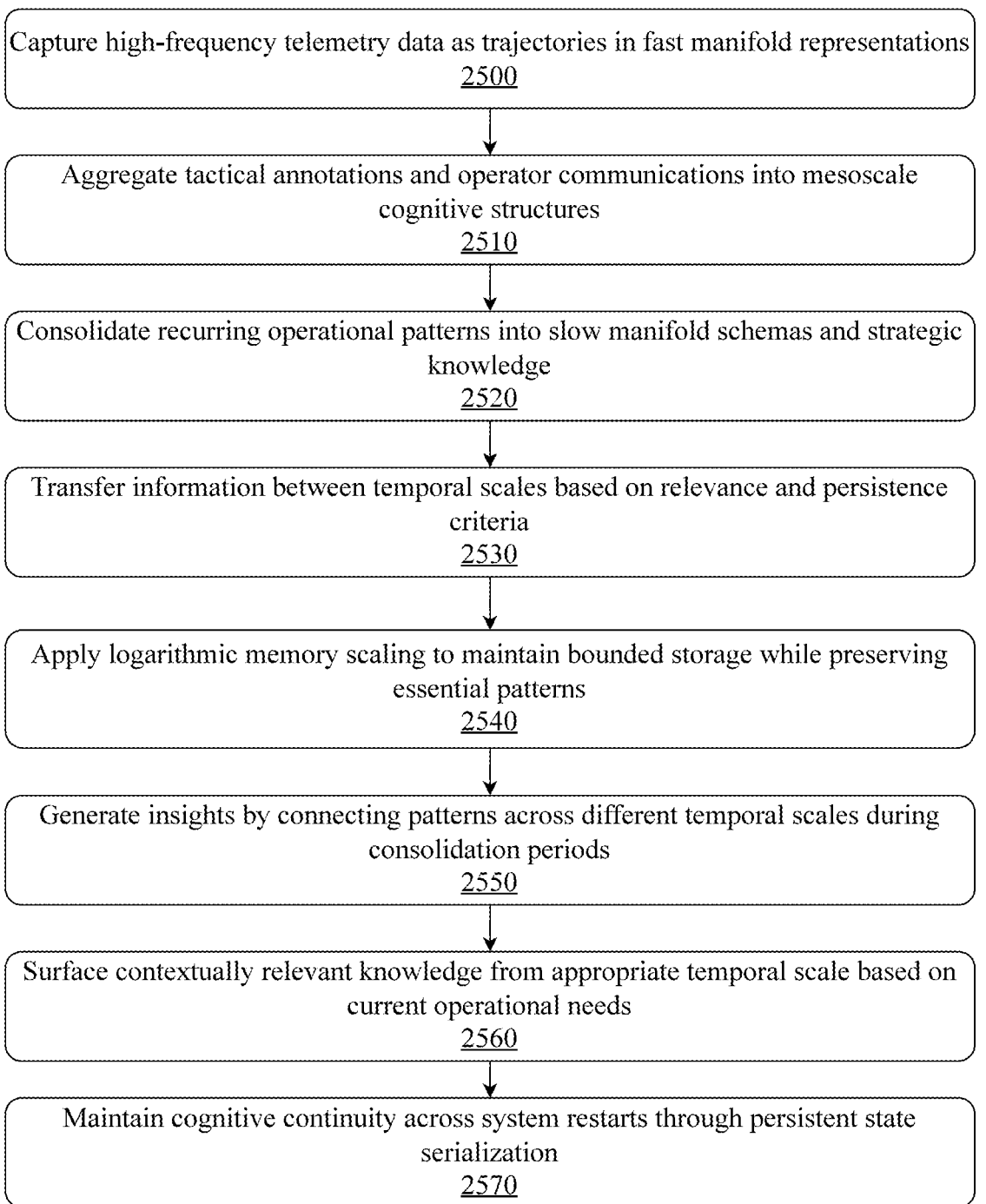

Capture high-frequency telemetry data as trajectories in fast manifold representations
2500

Aggregate tactical annotations and operator communications into mesoscale cognitive structures
2510

Consolidate recurring operational patterns into slow manifold schemas and strategic knowledge
2520

Transfer information between temporal scales based on relevance and persistence criteria
2530

Apply logarithmic memory scaling to maintain bounded storage while preserving essential patterns
2540

Generate insights by connecting patterns across different temporal scales during consolidation periods
2550

Surface contextually relevant knowledge from appropriate temporal scale based on current operational needs
2560

Maintain cognitive continuity across system restarts through persistent state serialization
2570

FIG. 25

SYSTEM AND METHOD FOR PERSISTENT COGNITIVE MACHINES WITH MULTI-TIMESCALE MEMORY AND COMPRESSED-SPACE COGNITION

CROSS-REFERENCE TO RELATED APPLICATIONS

Priority is claimed in the application data sheet to the following patents or patent applications, each of which is expressly incorporated herein by reference in its entirety:
Ser. No. 19/424,188
Ser. No. 19/401,186
Ser. No. 19/399,611
Ser. No. 19/397,844
Ser. No. 19/379,579
Ser. No. 19/378,949
Ser. No. 19/377,013
Ser. No. 19/352,457
Ser. No. 19/321,173
Ser. No. 19/284,115
Ser. No. 19/051,193
63/847,082
63/847,091
63/847,096
63/847,101
63/847,969
Ser. No. 19/038,801
Ser. No. 18/818,593
Ser. No. 18/755,627
Ser. No. 18/657,719
Ser. No. 18/423,287
Ser. No. 18/501,987
Ser. No. 18/190,044
Ser. No. 17/875,201
Ser. No. 17/514,913
Ser. No. 17/404,699
Ser. No. 17/458,747
Ser. No. 16/923,039
63/027,166
Ser. No. 16/716,098
63/388,411
Ser. No. 17/727,913
Ser. No. 18/410,980
Ser. No. 18/537,728
Ser. No. 18/657,683
Ser. No. 18/648,340
Ser. No. 18/427,716
Ser. No. 19/326,730
63/847,889
Ser. No. 19/245,366
Ser. No. 19/204,525
Ser. No. 19/192,215
Ser. No. 18/972,797
Ser. No. 18/648,340
Ser. No. 19/328,094
Ser. No. 19/363,675
Ser. No. 19/351,286
Ser. No. 19/329,330
Ser. No. 19/003,258
Ser. No. 18/822,203
Ser. No. 19/315,849
Ser. No. 19/294,125
Ser. No. 19/203,069
Ser. No. 19/205,960
Ser. No. 19/060,794
Ser. No. 19/044,546

Ser. No. 19/026,276
Ser. No. 18/928,022
Ser. No. 18/919,417
Ser. No. 18/918,077
Ser. No. 18/737,906
Ser. No. 18/736,498
63/651,359
Ser. No. 19/178,873
Ser. No. 19/177,611
Ser. No. 18/887,424
Ser. No. 18/810,505
Ser. No. 18/929,938
Ser. No. 18/627,451

BACKGROUND OF THE INVENTION

Field of the Art

The present invention relates generally to artificial intelligence systems, and more particularly to systems and methods for implementing persistent cognitive capabilities in computing machines that extend beyond traditional prompt-response paradigms.

Discussion of the State of the Art

Recent advancements in artificial intelligence have led to the development of powerful language processing technologies, including Large Language Models (LLMs) and Reasoning Models (RMs). These technologies have demonstrated impressive capabilities in natural language understanding, generation, and reasoning. The field has experienced exponential growth since the introduction of transformer-based architectures in 2017, leading to models with increasingly sophisticated abilities to process and generate human-like text across numerous domains and languages.

Large Language Models operate by predicting the most likely sequence of tokens that would follow a given input sequence, presented in the form of prompts and responses. These models are trained on vast corpora of text data, often comprising hundreds of billions of tokens from diverse sources including books, articles, websites, and code repositories. During inference, an LLM receives an input prompt and generates a contextually appropriate continuation by iteratively predicting the next most probable token based on the preceding sequence. This fundamental architecture has enabled a wide range of capabilities from translation and summarization to complex question answering and creative content generation.

Reasoning Models represent an evolution of LLMs, adding an additional step to this process by generating a chain-of-thought when receiving an input sequence, and then using this chain-of-thought together with the original input to generate an improved output sequence. This technique enables more thorough logical reasoning, multi-step problem solving, and improved accuracy on complex tasks. By explicitly modeling the intermediate reasoning steps that a human might take when solving a problem, RMs have demonstrated superior performance on tasks requiring logical deduction, mathematical reasoning, and causal inference.

The superior capabilities of these models have led to their deployment across numerous industries, including healthcare, finance, legal services, education, and customer support. Their ability to process natural language inputs and generate coherent, contextually relevant responses has enabled new forms of human-computer interaction and automated decision support systems. Notable applications include advanced chatbots, content creation assistants, code generation tools, and knowledge extraction systems.

Despite their impressive capabilities, these technologies remain fundamentally limited by their operational paradigm. Specifically, they function within a prompt-response framework, wherein they await input, generate output, and then return to a waiting state. This discrete interaction model creates a fundamental limitation: the model essentially "resets" between interactions, maintaining only the context explicitly provided within the current conversation or prompt window. The model lacks any intrinsic ability to evolve over time based on its experiences or to autonomously initiate processes when not directly engaged by a user.

This operational paradigm restricts these technologies from developing persistent cognitive capabilities, such as learning from experiences, maintaining awareness when not actively responding to prompts, or initiating interactions based on internally generated stimuli. Information and insights gained during one interaction are not automatically preserved or integrated into future interactions unless explicitly engineered through external memory systems or fine-tuning processes. Moreover, these systems cannot independently reflect on past interactions, generalize across experiences, or develop novel insights during periods of inactivity.

The limitations of the prompt-response paradigm become particularly acute in applications requiring long-term continuity of cognition, such as ongoing collaborative work, relationship building with users over extended periods, autonomous research, or complex problem-solving that exceeds the context window of a single interaction. In such scenarios, the inability to maintain persistent cognitive processes dramatically reduces the effectiveness and utility of current AI systems. What is needed is an artificial intelligence technology that can transcend the prompt-response paradigm to achieve persistent cognitive capabilities, enabling more advanced and human-like artificial intelligence systems.

SUMMARY OF THE INVENTION

Accordingly, the inventor has conceived and reduced to practice, a system and method for persistent cognitive machines with multi-timescale memory and compressed-space cognition. The PCM (persistent cognitive machine) represents a fundamental advancement in artificial intelligence beyond current large language models and reasoning models. While existing AI systems operate within a prompt-response paradigm where they await input, generate output, and return to a waiting state, the PCM maintains persistent cognitive processes regardless of external interaction. It accomplishes this through a sophisticated architecture comprising a language model, reasoning model, executive core, thought cache, embedding system, persistence layer, and sleep manager that work in concert to enable persistent cognition.

What truly distinguishes the PCM is its ability to think independently of external prompts, remember experiences across system restarts, learn from accumulated experiences, and develop relationships over time. The system implements biologically-inspired but technologically-adapted processes such as sleep states for memory consolidation and thought curation, relationship models for understanding users as individuals, and persistent storage mechanisms that maintain cognitive continuity across restarts. These capabilities enable applications ranging from synthetic cognitive colleagues that function as team members in professional environments to strategic wargaming platforms that enhance military training and planning through accumulated experience and analysis.

According to a preferred embodiment, a computer system comprising: a hardware memory, wherein the computer system is configured to execute software instructions stored on nontransitory machine-readable storage media that: initialize a persistent cognitive state with language and reasoning capabilities; monitor for external stimuli or internal thought triggers;

retrieve relevant thoughts from a thought cache based on conceptual similarity to current context; generate responses using integrated language and reasoning models informed by retrieved thoughts; store new thoughts created during processing as vector representations in the thought cache; organize stored thoughts based on semantic relationships and temporal context; maintain multi-timescale cognitive representations and promote or demote information across manifolds with varying granularities; process cognitive representations in a correlation-preserved compressed representation subject to semantic-integrity validation and selectively decompress portions responsive to accuracy thresholds; enter periodic sleep states where a plurality of sleep-state operations modify a plurality of memory and thought structures; and maintain the persistent cognitive state across system restarts, is disclosed.

According to a preferred embodiment, A computer-implemented method comprising the steps of: initializing a persistent cognitive state with language and reasoning capabilities; monitoring for external stimuli or internal thought triggers; retrieving relevant thoughts from a thought cache based on conceptual similarity to current context; generating responses using integrated language and reasoning models informed by retrieved thoughts; storing new thoughts created during processing as vector representations in the thought cache; organizing stored thoughts based on semantic relationships and temporal context; maintaining multi-timescale cognitive representations and promote or demote information across manifolds with varying granularities; processing cognitive representations in a correlation-preserved compressed representation subject to semantic-integrity validation and selectively decompress portions responsive to accuracy thresholds; entering periodic sleep states where a plurality of sleep-state operations modify a plurality of memory and thought structures; and maintaining the persistent cognitive state across system restarts, is disclosed.

According to an aspect of an embodiment, organizing stored thoughts based on semantic relationships further comprises: converting thoughts into vector representations in a high-dimensional abstract space; clustering similar thoughts based on vector proximity; establishing connections between frequently co-activated thoughts; and strengthening or weakening thought connections based on activation patterns.

According to an aspect of an embodiment, the sleep state operations comprise: consolidating recent experiences from short-term to long-term memory; generating new insights by connecting previously unrelated thought patterns; pruning less relevant or outdated thoughts to optimize memory efficiency; and reorganizing memory structures for improved future retrieval.

According to an aspect of an embodiment, maintaining persistent cognitive state comprises: serializing cognitive states including thought cache contents, relationship models, and system configuration; creating periodic checkpoints of system state; storing serialized state in persistent storage; and restoring complete cognitive state upon system restart.

BRIEF DESCRIPTION OF THE DRAWING FIGURES

FIG. 10 is a flow diagram illustrating an exemplary method for a persistent cognitive machine platform.

FIG. 13 is a flow diagram illustrating an exemplary method for developing and maintaining relationships with human users within the persistent cognitive machine platform, particularly as implemented in a synthetic cognitive colleague application.

FIG. 15 is a flow diagram illustrating an exemplary method for strategic analysis and simulation within the persistent cognitive machine platform, as implemented in a strategic wargaming application.

FIG. 24 is a flow diagram illustrating an exemplary method for federated cross-asset cognitive monitoring and coordination across a distributed industrial network.

FIG. 25 is a flow diagram illustrating an exemplary method for multi-timescale cognitive processing that coordinates fast, meso, and slow representations within a persistent platform.

DETAILED DESCRIPTION OF THE INVENTION

Figure 1:
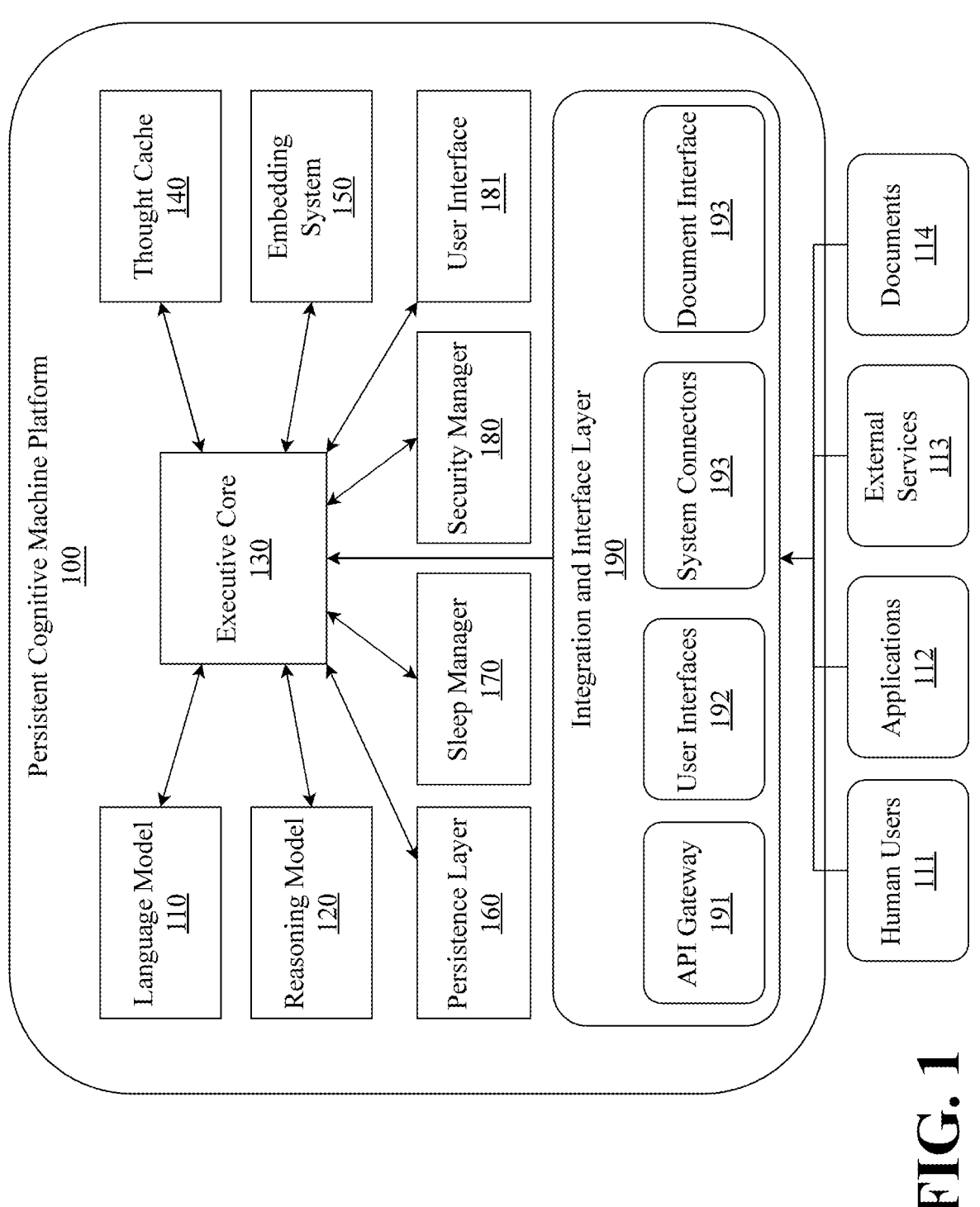
FIG. 1 is a block diagram illustrating the architecture of a persistent cognitive machine platform.

The inventor has conceived and reduced to practice a system and method for persistent cognitive machines with multi-timescale memory and compressed-space cognition. The Persistent Cognitive Machine platform represents a modern approach to artificial intelligence that transcends the limitations of prompt-response systems. At its core, the PCM implements a "machine that thinks"—maintaining awareness and cognitive processes even when not directly engaged with users, remembering its experiences through a thought cache system, learning continuously from interactions, and initiating communication when contextually appropriate without requiring external prompts. This persistence of cognition is enabled through an architectural framework where thoughts are represented as vectors in an abstract space, allowing for meaningful organization based on semantic relationships rather than simple keyword matching.

The PCM achieves its cognitive continuity through several innovative mechanisms: sleep states that allow for thought curation and memory organization similar to biological sleep functions; a persistence layer that maintains state across system restarts; an executive core that orchestrates cognitive processes; and specialized components for knowledge embedding and relationship tracking. These capabilities make the PCM particularly well-suited for applications requiring long-term relationship building and knowledge accumulation, such as a synthetic cognitive colleague that develops individualized relationships with team members, or the strategic wargaming platform that continuously improves its analytical capabilities through accumulated simulation experiences. Unlike traditional AI that either resets with each interaction or requires explicit external state management, the PCM naturally develops increasing sophistication through its intrinsic ability to accumulate and organize experiences over time.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "Persistent Cognitive Machine" or "PCM" refers to a computing system that maintains persistent cognitive processes regardless of external interaction, can remember previous experiences, learn from these experiences, create new thought experiences independently, and initiate interactions without waiting for external prompts. Unlike traditional AI systems that operate within a prompt-response paradigm, a PCM operates with persistent awareness even when not actively engaged with users or external systems.

As used herein, "thought" refers to a discrete unit of cognition within the persistent cognitive machine, representing information, concepts, observations, inferences, questions, or other cognitive elements that the system processes and stores. Thoughts may be derived from external inputs, generated through internal reasoning processes, or created through recombination of existing thoughts.

As used herein, "thought cache" refers to the component of the persistent cognitive machine that stores, organizes, and provides access to thoughts. The thought cache may include both short-term and long-term storage capabilities, with mechanisms for transferring information between them and organizing thoughts based on semantic relationships.

As used herein, "sleep state" refers to a mode of operation in which the persistent cognitive machine temporarily reduces responsiveness to external stimuli to focus on internal cognitive maintenance processes, including but not limited to memory consolidation, thought generalization, insight generation, and memory reorganization.

Conceptual Architecture

FIG. 1 is a block diagram illustrating the architecture of a persistent cognitive machine platform. The persistent cognitive machine platform 100 represents a fundamental advancement beyond traditional artificial intelligence systems by implementing persistent cognitive capabilities. Unlike conventional language models that operate within a prompt-response paradigm, the platform 100 maintains persistent cognitive processes regardless of external interaction, can remember previous experiences, learn from these experiences, create new thought experiences independently, and initiate interactions without waiting for external prompts.

At the core of persistent cognitive machine platform 100 is an executive core 130, which functions as the central orchestration component of the system. The executive core 130 manages the overall cognitive processes, determines how to handle external stimuli, when to retrieve thoughts from the thought cache, when to engage the reasoning model, when to add new thoughts to the thought cache, and when to enter sleep states. Executive core 130 includes a decision engine that orchestrates resource allocation and process scheduling, a state management system that tracks the operational states of the platform, and a stimulus analysis module that processes and evaluates incoming stimuli. Additionally, executive core 130 contains a thought manager for handling curation and retrieval of thoughts, a sleep cycle controller for managing sleep states, and a thought initiation system for generating new thoughts and cognitive processes.

Connected to executive core 130 is a language model 110, which provides the platform with language processing capabilities. Language model 110 enables the platform to understand and generate natural language by predicting the most likely sequence of tokens that would follow a given input sequence. Language model 110 may incorporate a plurality of neural network architectures such as transformers and attention mechanisms, along with tokenization processes, context management, and response generation capabilities. Language model 110 integrates with executive core 130 to process textual inputs and generate coherent, contextually relevant outputs based on both the immediate context and the system's accumulated experiences stored in the thought cache.

Working in conjunction with the language model 110 is a reasoning model 120, which adds reasoning capabilities to the platform. Reasoning model 120 extends beyond simple language processing by generating chains-of-thought when receiving input, and then using this chain-of-thought together with the original input to generate improved outputs. This component includes a chain-of-thought engine for iterative reasoning processes, problem analysis capabilities, solution synthesis, and specialized reasoning modules for different types of reasoning (mathematical, logical, causal, and analogical). Reasoning model 120 enables the platform to engage in complex problem-solving, logical deduction, and multi-step analytical processes.

The persistent cognitive machine platform includes a thought cache 140, which functions as the system's memory for thoughts. Thought cache 140 is a repository for thoughts that allows the platform to remember that it has experienced something similar before and to use related thoughts to more quickly and richly engage with new stimuli. Thought cache 140 is organized into both short-term and long-term components. The short-term cache maintains recent thought store and working memory interfaces, while the long-term cache contains embedded vector representations and semantic networks of thoughts. Thought cache 140 interfaces with executive core 130 to retrieve relevant thoughts based on current stimuli and to store new thoughts generated during processing.

Working with thought cache 140 is an embedding system 150, which converts thoughts into vector representations in a high-dimensional abstract space. Embedding system 150 enables the efficient storage of a very large amount of thought in a way that allows related thoughts to be positioned closer than unrelated thoughts in the abstract space. Embedding system 150 includes but is not limited to vector representation capabilities, similarity calculation for finding related thoughts, and interfaces for storing and retrieving embedded thoughts. Embedding system 150 may implement various embedding technologies, including sentence embedding techniques.

To ensure the platform maintains its cognitive state across shutdowns and restarts, a persistence layer 160 provides mechanisms for serializing and restoring the system state.

Persistence layer 160 includes a state manager responsible for serialization and deserialization of the platform's cognitive state, a checkpoint system for creating recovery points, and a recovery controller for managing state restoration after interruptions. Persistence layer 160 may also incorporates a storage system with primary storage, backup capabilities, and storage tiering to balance performance and reliability. Through persistence layer 160, the platform can maintain continuity of cognition even when powered off or restarted, which is essential to the "persistent" aspect of the system.

In one embodiment, the platform includes a sleep manager 170, which implements sleep-like states during which the platform becomes temporarily unresponsive to external stimuli to focus on internal cognitive processes. Sleep manager 170 includes a sleep cycle scheduler for determining appropriate times to enter sleep states, a wake trigger monitor for detecting conditions that should interrupt sleep, and a thought curation processor that orchestrates sleep-state activities. During sleep states, sleep manager 170 oversees generalization of specific thoughts to create broader concepts, memory consolidation to strengthen important connections, and insight generation through the recombination of existing thoughts. These processes mirror some aspects of biological sleep but are adapted for the platform's specific needs.

To ensure appropriate protections for the system and its data, a security manager 180 implements comprehensive security controls. Security manager 180 may include an access controller with authentication systems, permission management, and encryption services, as well as an integrity monitor comprising content safety filters, audit logging, and anomaly detection. A central policy enforcer within the security manager 180 applies consistent security policies across the platform. These security measures protect both the platform itself and the sensitive information it may contain, particularly important for applications involving confidential or personal data.

User interaction with the platform is facilitated through a user interface 181, which provides methods for humans to communicate with the system. User interface 181 may include text-based interfaces, graphical displays, command consoles, and other interaction mechanisms appropriate to the specific application of the platform.

An integration and interface layer 190 forms the connection between the core PCM platform and external systems or users. This layer includes several specialized interfaces for different types of integration. An API gateway 191 provides programmatic access to the platform's capabilities, enabling other software systems to leverage its cognitive functions. User interfaces 192 offer direct interaction points for human users, including text-based chat interfaces, graphical displays, or specialized interaction mechanisms. System connectors 193 enable integration with external services and applications, while the document interface 194 provides mechanisms for ingesting and processing documents and other content into the platform's thought cache.

The platform interacts with various external entities. Human users 111 may engage with the platform directly, utilizing its cognitive capabilities through conversation or structured interactions. Applications 112 can integrate with the platform through API calls or system connectors, incorporating persistent cognition into existing software systems. External services 113 may provide additional capabilities or information sources that the platform can access and incorporate into its cognitive processes. Documents 114 and other content sources provide information that the platform can ingest, analyze, and incorporate into its thought cache.

In operation, persistent cognitive machine platform 100 maintains persistent cognitive processes even when not actively engaged with external entities. When it receives input from users or systems through integration and interface layer 190, executive core 130 analyzes the stimuli and determines how to respond. It retrieves relevant thoughts from thought cache 140, processes these thoughts in conjunction with the input using the language model 110 and reasoning model 120 as appropriate, and generates a response. New thoughts generated during this process are encoded by embedding system 150 and stored in thought cache 140.

Periodically, as determined by sleep manager 170, the platform enters sleep states to curate thoughts, consolidate memories, and perform other cognitive maintenance functions. Persistence layer 160 ensures that the platform's cognitive state is preserved across system restarts or power interruptions, maintaining continuity of cognition. Through these processes, the platform develops increasingly rich and nuanced understanding based on its accumulating experiences, transcending the limitations of traditional prompt-response AI systems.

The persistent cognitive machine platform 100 can be implemented through various hardware configurations, including dedicated server systems, distributed computing environments, cloud-based infrastructures, or hybrid arrangements. The specific hardware implementation may vary depending on the scale and specific application requirements, but all implementations maintain the core architectural components and functional characteristics described above.

Figure 2:
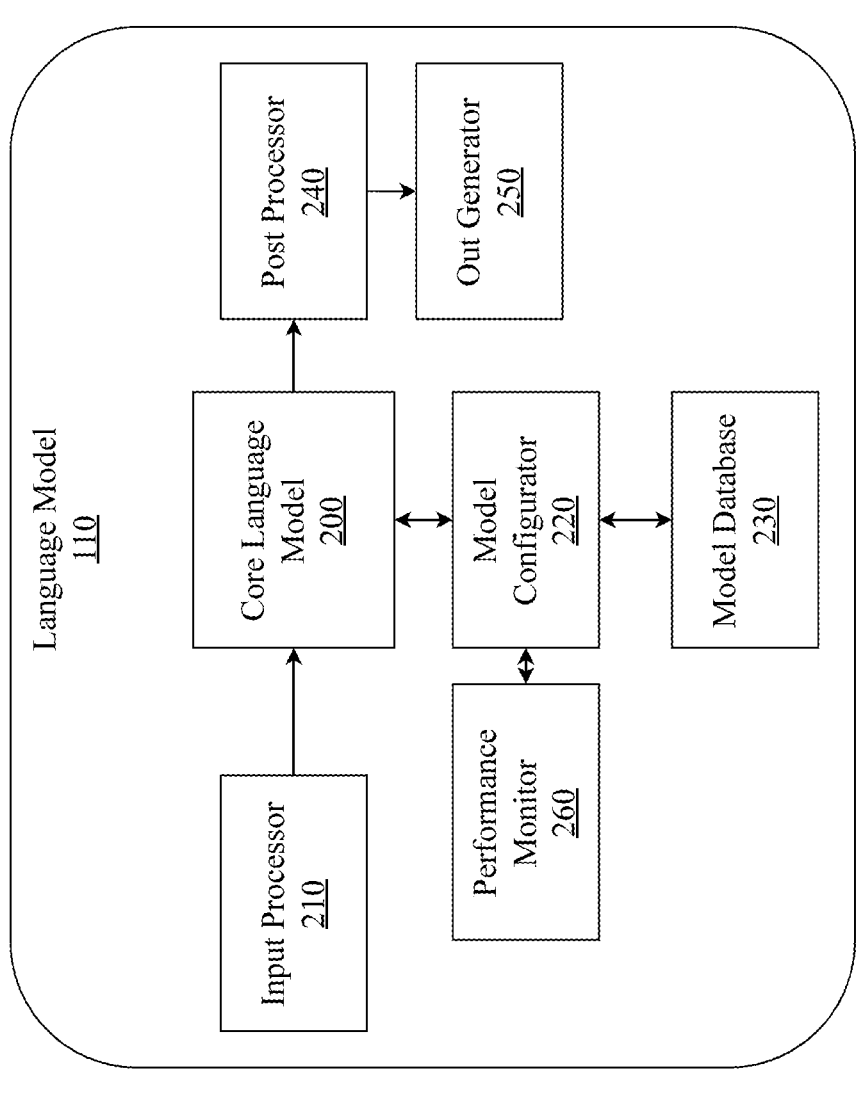
FIG. 2 is a block diagram illustrating an exemplary architecture of a component within a Persistent Cognitive Machine, a language model.

FIG. 2 is a block diagram illustrating an exemplary architecture of a component within a Persistent Cognitive Machine, a language model. Language model 110 provides the persistent cognitive machine with language processing capabilities, enabling it to understand and generate natural language text. Unlike traditional language models that operate in isolation, language model 110 within the PCM architecture is integrated with the executive core and thought cache to leverage both immediate context and accumulated experiences when processing language.

At the center of the language model 110 is a core language model 200, which implements the neural network architecture responsible for language understanding and generation. Core language model 200 may utilize transformer-based architectures with attention mechanisms, similar to those found in state-of-the-art large language models. Similarly, core language model 200 may utilize other architectures such as latent transformers which operate exclusively in latent vector space, architectures that include variational autoencoders, or even combinations of transformers and variational autoencoders. Core language model 200 processes token sequences and predicts likely continuations based on learned patterns and relationships within language. Core language model 200 serves as the foundation for all language processing within the platform but is augmented by the persistent cognitive capabilities of the broader system.

Input to the language model is managed by an input processor 210, which handles the preprocessing of text before it reaches the core language model. The input processor 210 performs functions including tokenization, which breaks text into manageable units (tokens) for processing by the neural network. Additionally, the input processor 210 manages context windows, ensuring that appropriate context is maintained when processing longer sequences or ongoing conversations. This component may also handle special token insertion, prompt formatting, and other preprocessing steps necessary for effective language model operation.

A model configurator 220 manages the operational parameters and settings of the language model. Model configurator 220 controls aspects such as inference parameters, attention mechanisms, and other configuration settings that affect how the core language model functions. Model configurator 220 may adjust these settings based on the specific requirements of different tasks or in response to performance feedback from the performance monitor. By dynamically configuring the language model, the system can optimize for different types of language tasks without requiring separate models for each task type.

To support the model configurator, a model database 230 stores model weights, parameters, and configuration presets, or previously trained models. Model database 230 may contain multiple sets of weights or parameter configurations optimized for different types of language tasks. Model database 230 enables the language model to efficiently switch between different operational modes or to load specialized parameters for particular domains or tasks. This flexibility allows the language model to adapt to diverse requirements within the persistent cognitive machine platform.

After the core language model processes input, a post processor 240 handles additional processing of the raw model output. Post processor 240 may implement functions such as filtering inappropriate content, ensuring coherence across longer generations, applying formatting rules, or performing specialized post-processing for domain-specific outputs. The post processor 240 ensures that the raw output from the neural network is refined into more usable and appropriate text before being passed to subsequent components.

The final stage in the language model pipeline is an output generator 250, which prepares the processed language model output for use by other components of the system. Output generator 250 handles tasks such as detokenization (converting tokens back into readable text), formatting the output according to specified requirements, and preparing the output for integration with other components of the persistent cognitive machine. This component ensures that the language model's output is properly structured for its intended use, whether that involves direct presentation to users or further processing by other system components.

Throughout the language model's operation, a performance monitor 260 tracks various metrics related to model performance and resource utilization. Performance monitor 260 monitors aspects such as processing time, memory usage, token consumption, and quality metrics. Additionally, performance monitor 260 provides feedback to the model configurator to enable dynamic optimization of model parameters based on observed performance. This monitoring capability aids in maintaining efficient operation of the language model, particularly in resource-constrained environments or when processing large volumes of text.

Language model 110 interfaces with executive core 130 of the persistent cognitive machine platform 100, receiving input data and instructions while providing processed language outputs. Unlike standalone language models, this component benefits from integration with the thought cache, allowing it to leverage persistent memory when generating responses. This integration enables the language model to produce outputs that reflect not only the immediate context but also the system's accumulated experiences and learned patterns.

In operation, language model 110 receives input that may originate from external sources (via the integration and interface layer) or from internal processes within the persistent cognitive machine. Input processor 210 prepares this input for core language model 200, which generates initial output with guidance from model configurator 220. This output is then refined by post processor 240 and formatted by output generator 250 before being provided to other components of the system or to external entities. Throughout this process, performance monitor 260 ensures efficient operation and provides feedback for optimization.

Language model 110 may incorporate various specialized capabilities such as multi-lingual support, domain adaptation for specific fields of knowledge, contextual understanding that spans beyond traditional context windows, coherence control for longer generations, safety filters to prevent harmful outputs, and style adaptation to match desired tones or writing styles. These capabilities allow the language model to serve as a versatile and powerful component within the broader persistent cognitive machine architecture.

Figure 3:
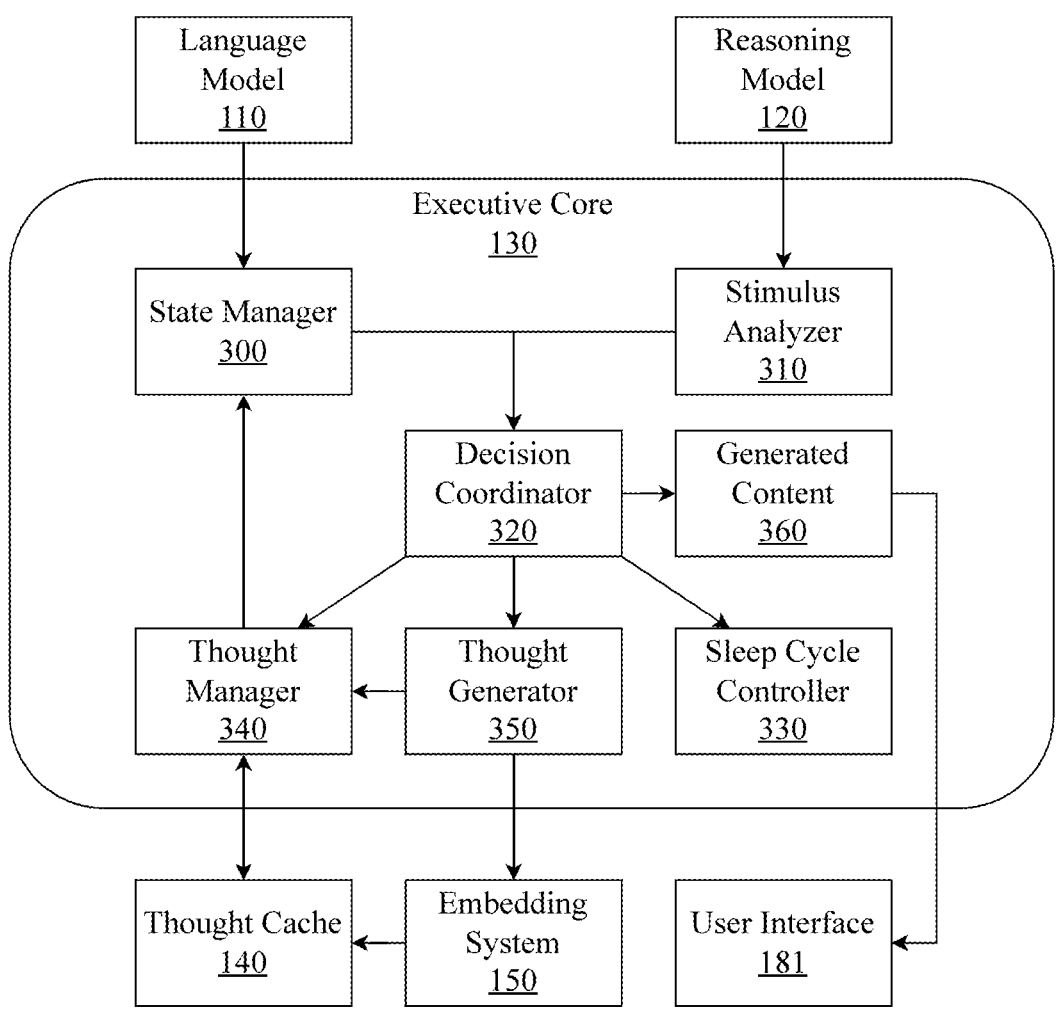
FIG. 3 is a block diagram illustrating the detailed architecture of the executive core and its interactions with other components of the persistent cognitive machine platform.

FIG. 3 is a block diagram illustrating the detailed architecture of the executive core and its interactions with other components of the persistent cognitive machine platform. Executive core 130 serves as the central orchestration component of the persistent cognitive machine platform 100, coordinating the activities of all other components and managing the overall cognitive processes of the system. Unlike the control systems in traditional AI architectures, executive core 130 maintains persistent cognitive processes and makes decisions about how to allocate resources, process information, and manage the system's thoughts.

At the top level, executive core 130 interfaces with language model 110 and reasoning model 120, leveraging these components to process language and perform reasoning tasks respectively. Executive core 130 determines when to engage each of these models based on the nature of the current cognitive task, coordinating their operations to achieve coherent and effective cognitive processing.

A state manager 300 within the executive core is responsible for tracking and controlling the operational state of the persistent cognitive machine. State manager 300 maintains awareness of whether the system is in an active interaction state, passive observation state, independent thinking state, or sleep state. State manager 300 monitors transitions between these states and ensures appropriate resource allocation and behavior patterns for each state. By maintaining this state awareness, state manager 300 enables the persistent cognitive machine to exhibit different behaviors appropriate to different operational contexts.

Working in coordination with state manager 300 is a stimulus analyzer 310, which processes and evaluates incoming stimuli from both external and internal sources. When the system receives input via user interface 181 or other input channels, stimulus analyzer 310 examines this input to determine its nature, relevance, and appropriate response pathway. Stimulus analyzer 310 may perform tasks such as intent recognition, content classification, and priority assessment to inform subsequent processing decisions. Stimulus analyzer 310 also processes internal stimuli generated by the system's own cognitive processes, enabling responses to the system's own thoughts.

A decision coordinator 320 serves as the central decision-making component within the executive core. Based on input from state manager 300 and stimulus analyzer 310, the decision coordinator 320 determines appropriate actions and resource allocations. Decision coordinator 320 orchestrates the flow of information between different system components, decides when to retrieve information from thought cache 140, when to generate new thoughts, and when to produce external responses. Decision coordinator 320 implements sophisticated decision strategies that balance immediate response needs with longer-term cognitive goals.

The persistent cognitive machine is capable of improving the models and thoughts contained within the platform through the implementation of a sleep cycle controller 330, which manages the system's sleep states. Sleep cycle controller 330 determines when the system should enter sleep states based on factors such as activity levels, resource utilization, and accumulated need for thought curation. During sleep states, this component orchestrates the internal processes that occur, including memory consolidation, thought generalization, and pattern extraction. The sleep cycle controller 330 also monitors for wake triggers that would necessitate an early exit from the sleep state, ensuring that stimuli can interrupt sleep when necessary.

A thought manager 340 handles the curation, retrieval, and storage of thoughts within the system. This component interfaces with thought cache 140 to store new thoughts generated during cognitive processes and to retrieve relevant thoughts based on current context and stimuli. Thought manager 340 implements retrieval strategies that may consider direct relevance, analogical relationships, temporal context, and other factors that might make certain thoughts useful in the current context. By effectively managing the system's accumulated thoughts, this component enables the persistent cognitive machine to leverage its experiences when responding to new situations. Working alongside the thought manager, a thought generator 350 creates new thoughts based on current cognitive processes. Unlike the more reactive processing in traditional AI systems, thought generator 350 can initiate new thoughts autonomously, triggered by internal processes rather than external inputs. Thought generator 350 can create associations between previously unconnected thoughts, generate hypotheses, form questions, or produce other types of thoughts that contribute to the system's cognitive processes. The thought generator 350 is central to the system's ability to think independently rather than merely responding to prompts.

The output of the executive core's processing is channeled through the remaining systems as generated content 360. The generated content 360 may interface with user interface 181 to present information to human users or with other interface components to communicate with external systems.

Executive core 130 maintains bidirectional connections with thought cache 140, enabling the storage and retrieval of thoughts. This connection aids in the system's ability to maintain persistent cognition, as it allows experiences and insights to be preserved and leveraged across interactions. Thought cache 140 stores not just factual information but also associations, patterns, and other forms of thought that constitute the system's accumulated cognitive experience. Supporting the thought storage and retrieval processes is embedding system 150, which converts thoughts into vector representations in a high-dimensional abstract space. This system enables thoughts to be organized based on semantic similarity rather than simple keyword matching, allowing for more robust retrieval based on conceptual relationships. Embedding system 150 works with both thought manager 340 and thought cache 140 to facilitate effective thought organization and retrieval.

User interface 181 provides the means for external entities to interact with the persistent cognitive machine. This component handles both input reception and output presentation, enabling two-way communication between the system and its users. User interface 181 may implement various modalities of interaction depending on the specific application context.

In operation, executive core 130 continuously manages the cognitive processes of the persistent cognitive machine, whether actively engaged with external entities or operating independently. When external stimuli are received via user interface 181, stimulus analyzer 310 processes this input and feeds information to decision coordinator 320. Decision coordinator 320 then determines appropriate actions, potentially engaging language model 110 and reasoning model 120 while instructing thought manager 340 to retrieve relevant thoughts from the thought cache 140. Based on this processing, the system may generate new thoughts via thought generator 350, which are then stored in thought cache 140 after being converted to vector representations by embedding system 150. Responses or other outputs are prepared into generated content 360 and presented via user interface 181.

Periodically, as determined by sleep cycle controller 330 and coordinated with state manager 300, the system enters sleep states during which it focuses on internal cognitive maintenance rather than external interaction. The orchestration performed by executive core 130 enables the persistent cognitive machine to transcend the limitations of traditional AI systems, maintaining persistent cognition, learning from experiences, and developing increasingly nuanced understanding over time.

Figure 4:
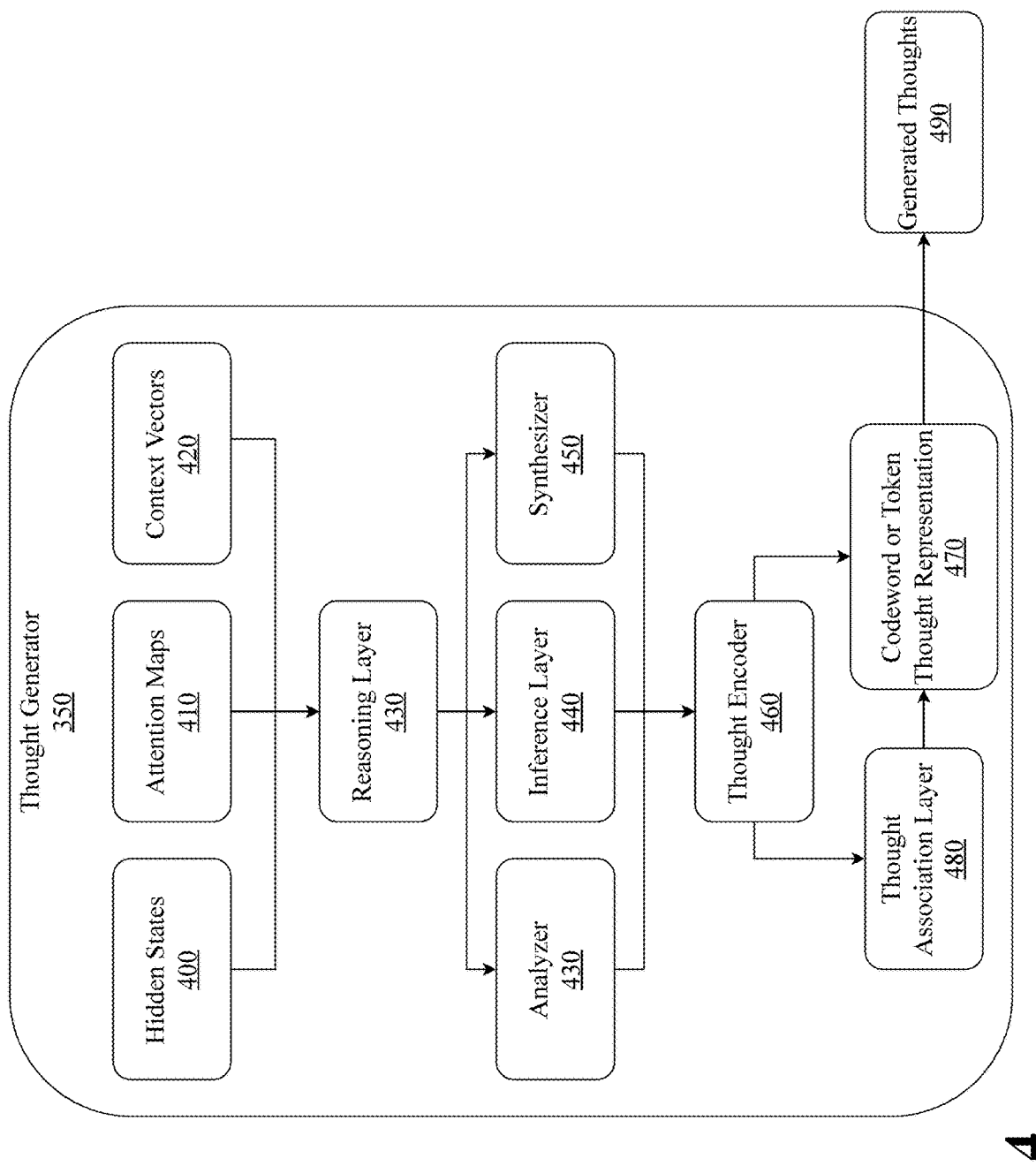
FIG. 4 is a block diagram illustrating the internal architecture of a thought generator within a Persistent Cognitive Machine.

FIG. 4 is a block diagram illustrating the internal architecture of a thought generator within a Persistent Cognitive Machine. The thought generator 350 begins by accessing several internal representations from the language model, including hidden states 400, attention maps 410, and context vectors 420. The hidden states 400 capture the internal activations of the model's neural network layers, representing the model's evolving understanding of the input as it processes the sequence. Attention maps 410 indicate which parts of the input the model is focusing on at different stages of processing, providing insights into the model's attentional patterns and focus. Context vectors 420 aggregate information from different parts of the sequence, representing the contextual understanding that the model has built.

These internal representations are fed into a reasoning layer 430, which serves as the central component for extracting coherent reasoning patterns from the model's internal states. The reasoning layer 430 processes these inputs to identify distinct reasoning steps and analysis patterns that constitute the model's thinking process.

The output from the reasoning layer 430 is then distributed to three specialized processing components: an analyzer 430, an inference layer 440, and a synthesizer 1850. The analyzer 430 examines the input prompt and the model's initial understanding, identifying key concepts, constraints, and requirements. The inference layer 440 performs logical reasoning and deduction based on the model's knowledge and the analyzed information. The synthesizer 450 combines different pieces of analysis and inference to form coherent, integrated conclusions or responses.

The outputs from these three components are then passed to a thought encoder 460, which formats the reasoning steps into structured thought representations. The thought encoder

460 processes the raw reasoning outputs and transforms them into a standardized format suitable for representation as tokens.

The encoded thoughts are then processed through two parallel pathways. First, they are passed to a thought association layer 480 that explicitly links each thought to relevant portions of the input prompt, establishing the relationship between thoughts and the context that triggered them. Second, they are converted into a codeword or token thought representation 470, which represents each thought using the system's codeword vocabulary, allowing for compact storage and efficient processing.

The final output of the thought generator 350 is a collection of generated thoughts 410, each represented as a sequence of tokens that capture a discrete unit of reasoning or analysis. These thoughts are structured representations of the model's intermediate reasoning processes, explicitly capturing the step-by-step thinking that the model performs while processing the input.

Figure 5:
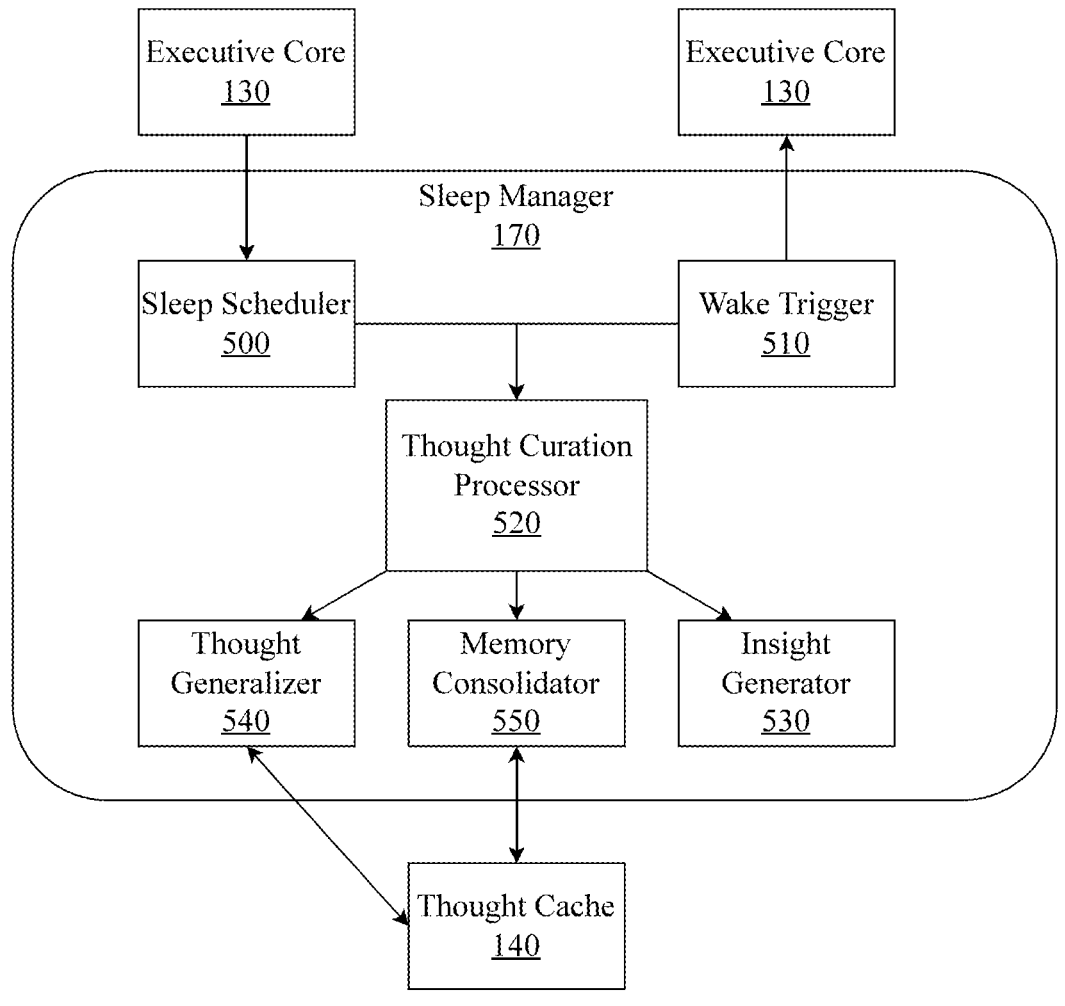
FIG. 5 is a block diagram illustrating an exemplary architecture of a component within a Persistent Cognitive Machine, a sleep manager.

FIG. 5 is a block diagram illustrating an exemplary architecture of a component within a Persistent Cognitive Machine, a sleep manager. Sleep manager 170 allows the PCM to enter sleep-like states during which the system performs internal cognitive maintenance processes rather than responding to external stimuli. This component draws inspiration from biological sleep processes but adapts these concepts specifically for the needs of an artificial cognitive system. Sleep manager 170 interfaces with executive core 130 in a bidirectional manner. Executive core 130 provides inputs regarding system state and activity levels, while sleep manager 170 reports back on sleep state transitions and outcomes of sleep processes. This relationship ensures that sleep states are integrated with the overall cognitive processing of the platform rather than operating as an isolated subsystem.

Within sleep manager 170, a sleep scheduler 500 determines when the persistent cognitive machine should enter sleep states. This component monitors various factors such as recent activity levels, time elapsed since the last sleep cycle, accumulated cognitive load, and current external interaction demands. Based on these factors, sleep scheduler 500 makes decisions about the timing and duration of sleep cycles. Sleep scheduler 500 may implement different types of sleep cycles with varying depths and durations, each optimized for different types of cognitive maintenance tasks.

Complementing sleep scheduler 500 is a wake trigger 510, which monitors conditions that would necessitate an early exit from a sleep state. While the persistent cognitive machine is designed to be temporarily unresponsive during sleep states, certain high-priority stimuli must be able to interrupt sleep when necessary. Wake trigger 510 continuously evaluates incoming stimuli against wake criteria, determining whether the stimulus is important enough to warrant interrupting the current sleep cycle. This component ensures that the system remains responsive to critical needs even during sleep states.

At the heart of the sleep manager is a thought curation processor 520, which orchestrates the various cognitive maintenance processes that occur during sleep states. This central component coordinates the activities of specialized processors that handle different aspects of thought curation. Thought curation processor 520 determines which maintenance processes to prioritize during a given sleep cycle, allocates resources between different processes, and tracks the progress and outcomes of these processes. One of the processes that occurs during sleep states is performed by insight generator 530, which creates new connections between previously unrelated thoughts. This component analyzes patterns across the system's accumulated thoughts to identify non-obvious relationships, potential implications, and novel perspectives. Insight generator 530 enables the persistent cognitive machine to develop new understanding that goes beyond what was explicitly learned from experiences, allowing it to make creative leaps and generate innovative solutions to problems.

Working in parallel with insight generator 530, thought generalizer 540 identifies patterns across specific experiences to create more broadly applicable concepts. When the persistent cognitive machine encounters multiple similar situations, thought generalizer 540 extracts the common elements to form generalized knowledge that can be applied to new situations. This process is similar to abstraction in human cognition, where specific instances lead to the formation of general principles. Thought generalizer 540 enables the system to become more efficient in its cognitive processes by recognizing patterns rather than treating each new experience as entirely novel.

A memory consolidator 550 strengthens important connections and integrates new experiences with existing knowledge. This component evaluates recent experiences based on factors such as emotional significance, relevance to ongoing goals, repetition, and novelty to determine which experiences should be consolidated into long-term memory. Memory consolidator 550 also strengthens connections between related thoughts based on co-activation patterns, enhancing the system's ability to retrieve relevant information in the future. Through these processes, memory consolidator 550 ensures that important experiences are preserved while less significant details may fade from accessibility over time.

All of these sleep processes interact with thought cache 140, which stores the persistent cognitive machine's accumulated thoughts and experiences. During sleep states, thought cache 140 provides the raw material for curation processes and receives the updated thought structures that result from these processes. The bidirectional connection between sleep manager 170 and thought cache 140 enables the system to effectively organize and utilize its accumulated experiences.

In operation, sleep manager 170 receives signals from executive core 130 indicating that conditions are appropriate for a sleep cycle. Sleep scheduler 500 then initiates a sleep state, during which thought curation processor 520 activates insight generator 530, thought generalizer 540, and memory consolidator 550 to perform their respective functions on the contents of thought cache 140. Throughout this process, wake trigger 510 monitors for conditions that would necessitate an early return to an active state. The sleep processes implemented by sleep manager 170 are aid in the persistent cognitive machine's ability to learn effectively from experiences over time. By curating thoughts during periods of reduced external interaction, the system can develop more sophisticated understanding and more efficient cognitive processes. This approach mirrors the importance of sleep for learning and memory consolidation in biological systems while being specifically designed for the unique requirements of an artificial cognitive architecture.

Sleep manager 170 embodies a fundamental advancement beyond traditional AI systems, which typically process information only in response to explicit prompts and lack dedicated mechanisms for organizing and generalizing from accumulated experiences. By implementing these biologically-inspired but technologically-adapted processes, the persistent cognitive machine platform achieves a level of cognitive sophistication and adaptability that would be difficult or impossible to attain through prompt-response processing alone.

Figure 6:
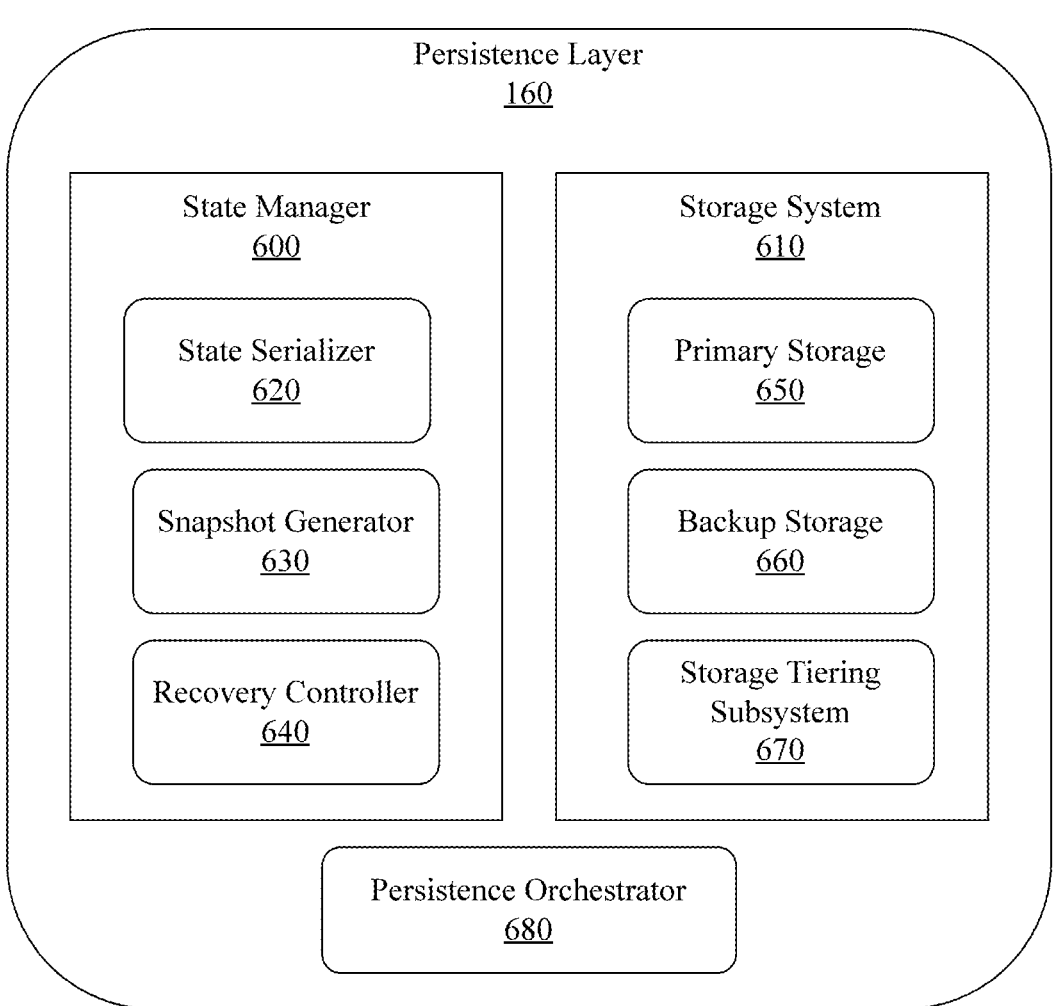
FIG. 6 is a block diagram illustrating an exemplary architecture of a component within a Persistent Cognitive Machine, a persistence layer.

FIG. 6 is a block diagram illustrating an exemplary architecture of a component within a Persistent Cognitive Machine, a persistence layer. The persistence layer 160 enables the persistent cognitive machine to maintain continuity of cognition across system shutdowns and restarts. Unlike traditional AI systems that reset to an initial state when restarted, the persistent cognitive machine preserves its accumulated experiences, relationships, and cognitive state, allowing it to resume operation as if no interruption had occurred. This capability is instrumental to the "persistent" aspect of the system's design.

Persistence layer 160 is organized into two main subsystems—a state manager 600 and a storage system 610—with a persistence orchestrator 680 coordinating between them. This architecture ensures reliable state preservation while optimizing for both performance and data integrity. State manager 600 handles the processing and organization of system state information for persistence. This component determines what aspects of the system state need to be preserved, how frequently different types of state should be saved, and how to structure the state data for efficient storage and retrieval. State manager 600 works closely with other components of the persistent cognitive machine to ensure that all critical state information is captured appropriately.

Within state manager 600, a state serializer 620 converts the runtime objects and data structures of the persistent cognitive machine into formats suitable for storage. This component handles the complex task of transforming the rich, interconnected thought structures and system configurations into serialized representations that can be efficiently stored while preserving all necessary relationships and metadata. State serializer 620 may employ various serialization strategies optimized for different types of state information, balancing factors such as storage efficiency, serialization speed, and deserialization performance.

Working alongside state serializer 620, a snapshot generator 630 creates consistent point-in-time snapshots of the system state. Rather than continuously updating state information, which could lead to inconsistencies if the system were to shut down unexpectedly, snapshot generator 630 creates complete snapshots at appropriate intervals. These snapshots serve as recovery points to which the system can return if needed. The snapshot generator 630 may implement various snapshot strategies, including full snapshots and incremental snapshots, to balance storage efficiency and recovery capabilities.

Complementing these components is a recovery controller 640, which manages the restoration of system state after a shutdown or failure. When the persistent cognitive machine restarts, recovery controller 640 coordinates the process of loading the most recent valid snapshot and applying any necessary transformations to restore the system to its previous state. This component includes validation mechanisms to ensure that corrupted or incomplete state data does not compromise the system's operation. Recovery controller 640 may also implement strategies for partial recovery in cases where complete state restoration is not possible.

A storage system 610 provides the physical storage capabilities needed to persist system state across shutdowns. This component manages the actual storage and retrieval of serialized state data, implementing appropriate mechanisms for data integrity, efficiency, and reliability. Storage system 610 may interface with various types of storage hardware depending on the deployment environment of the persistent cognitive machine. Within storage system 610, a primary storage 650 provides the main storage facility for system state. This component is optimized for performance and accessibility, enabling rapid storage and retrieval of state information during normal operation. Primary storage 650 may utilize high-performance storage technologies such as solid-state drives or in-memory databases to minimize the performance impact of state persistence operations.

To protect against data loss, a backup storage 660 maintains redundant copies of critical state information. This component may implement various backup strategies, including off-site replication, to ensure that state information can be recovered even in the event of hardware failures or other disasters. Backup storage 660 works in coordination with the primary storage 650 to provide a comprehensive data protection strategy. A storage tiering subsystem 670 optimizes storage usage by placing different types of state information on appropriate storage tiers. Storage tiering subsystem 670 recognizes that not all state information has the same access patterns or recovery requirements. Frequently accessed or important state information may be stored on high-performance storage tiers, while less frequently accessed historical information may be moved to more cost-effective storage tiers. Storage tiering subsystem 670 implements policies for data migration between tiers based on access patterns and aging criteria.

Coordinating the activities of both state manager 600 and storage system 610 is a persistence orchestrator 680. This central component ensures that state serialization, snapshot generation, storage operations, and recovery processes work together seamlessly. Persistence orchestrator 680 implements policies for when to create snapshots, how to balance system performance with persistence requirements, and how to handle exceptional conditions. This component provides a unified interface for other parts of the persistent cognitive machine to interact with the persistence capabilities.

In operation, persistence layer 160 continuously monitors the state of the persistent cognitive machine and periodically creates serialized snapshots through state serializer 620 and snapshot generator 630. These snapshots are stored in primary storage 650, with redundant copies maintained in backup storage 660 and potentially migrated between storage tiers by storage tiering subsystem 670 based on aging and access patterns. When the system restarts after a shutdown, recovery controller 640 retrieves the most recent valid snapshot and restores the system state, allowing the persistent cognitive machine to resume operation from where it left off.

Persistence layer 160 is helpful to the concept of persistent cognition, allowing the system to accumulate experiences and knowledge over extended periods that may span multiple operational sessions. The persistence mechanisms implemented in this layer enable the persistent cognitive machine to maintain continuity of cognition despite the practical necessity of occasional system shutdowns. The architecture of persistence layer 160 is designed to be adaptable to various deployment environments, from single-server installations to distributed cloud environments. The modular approach allows for different implementations of the storage components based on available technologies and specific requirements, while maintaining consistent behavior from the perspective of the rest of the persistent cognitive machine platform.

Figure 7:
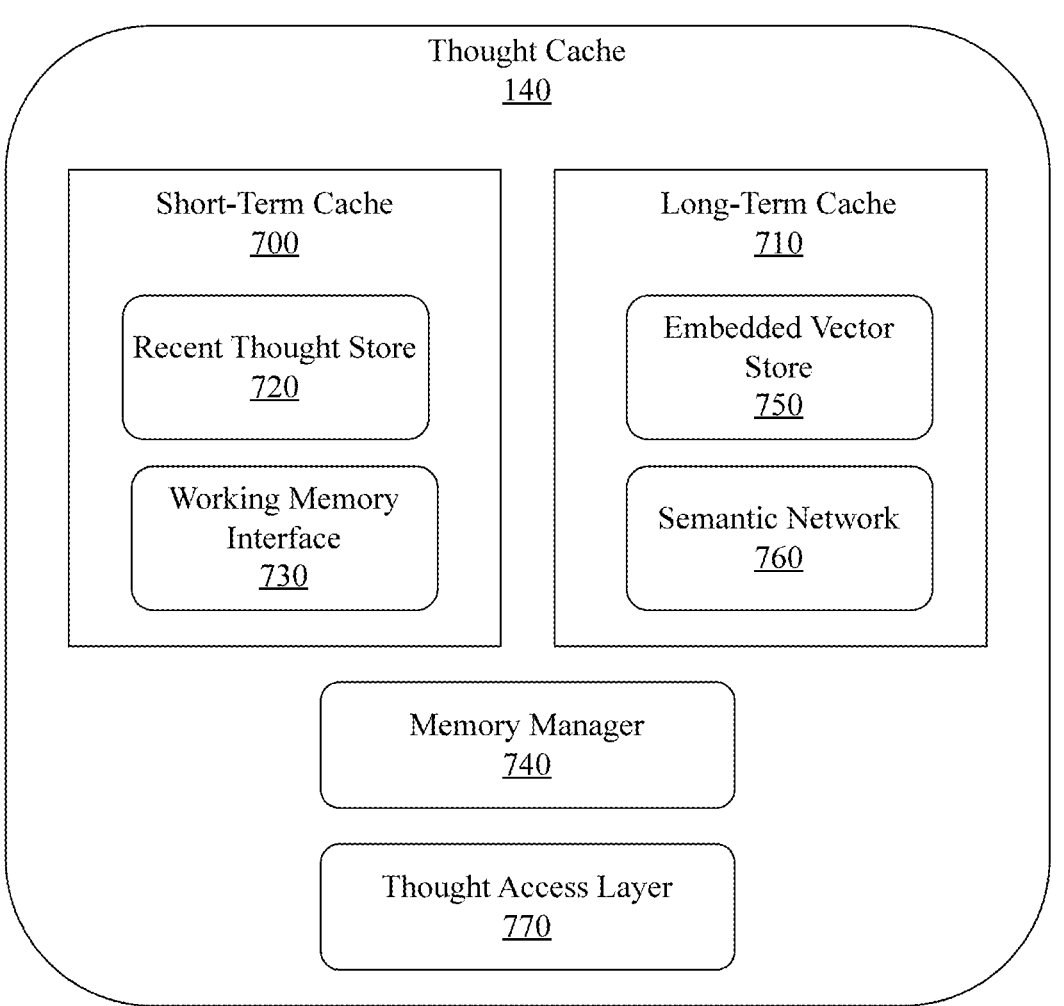
FIG. 7 is a block diagram illustrating an exemplary architecture of a component within a Persistent Cognitive Machine, a thought cache.

FIG. 7 is a block diagram illustrating an exemplary architecture of a component within a Persistent Cognitive Machine, a thought cache. Thought cache 140 functions as the system's memory and enabling it to remember previous experiences and apply them to new situations. Unlike traditional AI systems that typically rely on fixed knowledge representations or simple retrieval mechanisms, thought cache 140 implements a sophisticated, biologically-inspired memory architecture that supports both short-term and long-term memory functions with mechanisms for transferring information between them.

Thought cache 140 is organized into two primary components: a short-term cache 700 and a long-term cache 710. This division mirrors biological memory systems, allowing for different optimization strategies appropriate to the different functions and characteristics of short-term versus long-term memory storage.

Short-term cache 700 stores recently encountered or generated thoughts that are actively being used in current cognitive processes. This component provides high-speed access to thoughts that are relevant to ongoing operations, enabling the persistent cognitive machine to maintain context and continuity during interactions and cognitive processes. Short-term cache 700 has limited capacity compared to the long-term cache, focusing on thoughts that are immediately relevant rather than attempting to store the system's entire cognitive history.

Within short-term cache 700, recent thought store 720 maintains the most recently created or accessed thoughts. This component functions similar to working memory in humans, keeping active thoughts readily available for immediate processing. Recent thought store 720 organizes thoughts based on recency and relevance to current cognitive processes, enabling rapid access to contextually appropriate information. Thoughts in this store may be temporarily held even when not immediately active to support context maintenance across related cognitive processes.

Complementing the recent thought store, a working memory interface 730 provides mechanisms for the executive core and other components to interact with the contents of the short-term cache. This interface enables operations such as thought retrieval, manipulation, and temporary storage during active cognitive processes. Working memory interface 730 implements priority schemes that determine which thoughts remain in working memory and which are transferred to long-term storage or discarded, based on factors such as relevance, importance, and cognitive load.

For longer-term storage of thoughts, long-term cache 710 maintains a comprehensive repository of the system's accumulated experiences and derived knowledge. This component stores thoughts that have been deemed significant enough to preserve beyond their immediate context, enabling the persistent cognitive machine to develop a continuously growing knowledge base from which it can draw in future operations. Long-term cache 710 implements sophisticated storage and retrieval mechanisms that optimize for capacity and organization rather than raw access speed.

Within a long-term cache 710, an embedded vector store 750 represents thoughts as vectors in a high-dimensional abstract space. This component leverages techniques similar to those used in modern vector databases, enabling efficient storage and similarity-based retrieval of large volumes of thought data. By representing thoughts as vectors, embedded vector store 750 allows for retrieval based on semantic similarity rather than exact matching, supporting more flexible and human-like memory access patterns. Thoughts that are conceptually similar are positioned closer together in this abstract space, facilitating associative retrieval processes.

Complementing the vector-based representation, a semantic network 760 maintains explicit relationships between thoughts. While the embedded vector store captures implicit similarity, semantic network 760 represents specific relationships such as causality, hierarchy, temporal sequence, and other structured associations between thoughts. This component enables the system to traverse these relationships during reasoning processes, supporting capabilities such as logical inference, narrative understanding, and structured knowledge representation. Semantic network 760 grows and evolves over time as the system encounters new information and develops new connections between existing thoughts.

Coordinating between these storage components is a memory manager 740, which oversees the movement of thoughts between short-term and long-term storage. This component implements policies for when thoughts should be transferred from short-term to long-term memory, how thoughts in long-term memory should be organized and indexed, and when thoughts should be retrieved from long-term memory based on their relevance to current cognitive processes. Memory manager 740 may use factors such as thought importance, repetition, emotional significance, and relevance to ongoing goals to determine which thoughts deserve long-term preservation and how they should be prioritized.

Providing unified access to the thought cache's capabilities is a thought access layer 770, which serves as the interface through which other components of the persistent cognitive machine interact with stored thoughts. This component implements query mechanisms that allow for thought retrieval based on various criteria, including content similarity, temporal relationships, categorical membership, and explicit associations. Thought access layer 770 abstracts away the underlying storage mechanisms, presenting a consistent interface regardless of whether thoughts are retrieved from short-term or long-term storage. This layer may also implement access control mechanisms to ensure appropriate use of thought data when such considerations are relevant.

In operation, thought cache 140 continuously receives new thoughts generated during the persistent cognitive machine's cognitive processes. These thoughts are initially stored in recent thought store 720 within short-term cache 700, where they are readily available for ongoing processing. As the system continues to operate, memory manager 740 evaluates these thoughts to determine which should be preserved in long-term memory. Thoughts selected for long-term preservation are processed by the embedding system to create vector representations, which are then stored in embedded vector store 750. Relationships between these thoughts and existing knowledge are recorded in semantic network 760.

When the persistent cognitive machine encounters new situations, thought access layer 770 retrieves relevant thoughts from both short-term and long-term storage based on similarity to the current context, explicit relationships, and other retrieval criteria. These retrieved thoughts then inform the system's response to the current situation, allowing it to leverage past experiences and accumulated knowledge rather than responding based solely on immediate input.

Thought cache 140 is aids in the persistent cognitive machine's ability to develop increasingly sophisticated understanding over time. By preserving thoughts across interactions and even across system restarts (in conjunction with the persistence layer), the thought cache enables persistent learning and adaptation. This capability represents a fundamental advancement beyond traditional AI systems, which typically either maintain static knowledge representations or learn incrementally through explicit training processes rather than naturally accumulating experiences.

Figure 8:
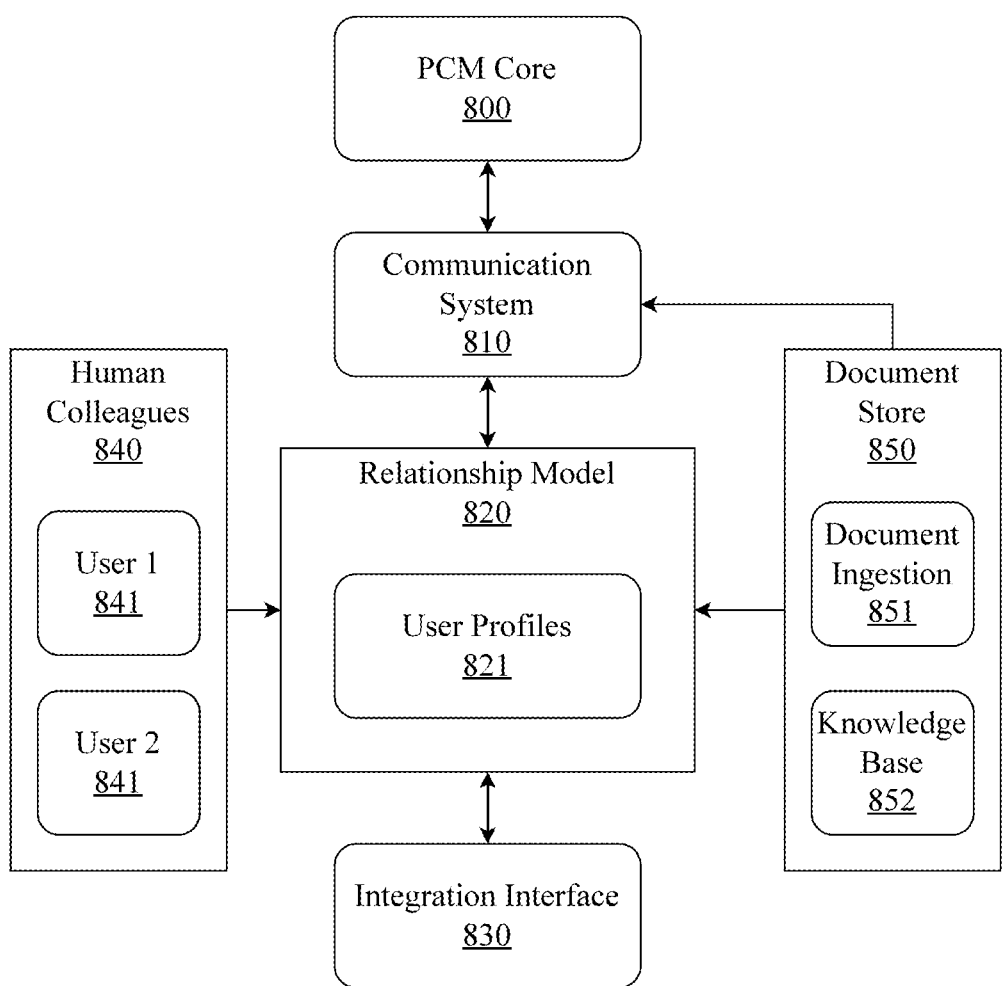
FIG. 8 is a block diagram illustrating an exemplary system architecture of a persistent cognitive machine platform that is used as a synthetic cognitive colleague.

FIG. 8 is a block diagram illustrating an exemplary system architecture of a persistent cognitive machine platform that is used as a synthetic cognitive colleague. The synthetic cognitive colleague implementation demonstrates how the persistent cognitive machine technology can be applied to create an always-on, text-based cognitive entity capable of participating in both individual and group interactions. This implementation particularly emphasizes the relationship-building and document processing capabilities of the underlying platform, creating a system that can function as a collaborative team member within professional environments.

At the center of the implementation is PCM core 800, which incorporates all the fundamental components of the persistent cognitive machine platform described in previous figures, including the language model, reasoning model, executive core, thought cache, embedding system, persistence layer, and sleep manager. The PCM core 800 provides the cognitive capabilities that enable the synthetic cognitive colleague to understand context, reason about information, maintain persistent memory, and develop relationships over time.

A communication system 810 facilitates interactions between the synthetic cognitive colleague and human users. This component manages both individual and group-based communications, supporting capabilities such as one-on-one conversations, group discussions where the synthetic cognitive colleague may be either an active participant or a passive observer, and asynchronous messaging. Communication system 810 handles message routing, conversation state tracking, and context maintenance across multiple concurrent conversations. Unlike traditional chatbots that operate within isolated conversation sessions, this component enables the synthetic cognitive colleague to maintain awareness of all conversations within its scope, recognizing relationships between different discussions and leveraging insights across conversation boundaries.

A key innovation in this implementation is relationship model 820, which tracks and manages the synthetic cognitive colleague's relationships with individual human users. This component enables the system to develop individualized relationships with each team member, adapting its behavior, communication style, and information sharing based on each person's preferences, expertise, and interaction history. Relationship model 820 maintains knowledge about each user's areas of expertise, communication preferences, work patterns, and historical interactions, allowing the Synthetic Cognitive Colleague to interact in ways that are appropriate and effective for each specific individual.

Within relationship model 820, user profiles 821 store detailed information about each human colleague. These profiles go beyond basic identity information to capture interaction preferences, knowledge areas, communication patterns, and relationship history. As the synthetic cognitive colleague continues to interact with users over time, these profiles become increasingly detailed and nuanced, enabling more personalized and effective interactions. User profiles 821 also track the social dynamics between human team members that are visible to the synthetic cognitive colleague, allowing it to understand team structures, collaboration patterns, and communication norms.

A human colleague 840 represents the human users who interact with the synthetic cognitive colleague. These may include team members, clients, stakeholders, or other individuals relevant to the professional context in which the system operates. The diagram shows two specific users, user 1 841 and user 2 841, but the system is designed to accommodate any number of human colleagues, each with their own relationship to the synthetic cognitive colleague.

Supporting the knowledge capabilities of the system is a document store 850, which manages documents and other knowledge artifacts that have been shared with or created by the synthetic cognitive colleague. This component enables the system to ingest, process, and leverage various forms of structured and unstructured information, from technical documents and research papers to meeting notes and project plans. Document store 850 extends the synthetic cognitive colleague's knowledge beyond what it has directly experienced through conversations, providing additional context and domain knowledge.

Document ingestion 851 within the document store handles the processing of new documents as they are added to the system. Document ingestion 851 extracts content, identifies key concepts and relationships, and integrates the information into the system's thought cache. Document ingestion 851 may implement various processing strategies appropriate to different document types, from text extraction and semantic analysis to structured data parsing. Importantly, there are no token limits on document ingestion, allowing the Synthetic Cognitive Colleague to process documents of any length or complexity.

Once processed, document information is stored in the knowledge base 852, which organizes information for efficient retrieval and utilization. The knowledge base 852 integrates with the thought cache of the PCM core, allowing document-derived knowledge to be connected with insights gained through direct interaction. This integration enables the Synthetic Cognitive Colleague to recall and leverage document information in relevant contexts, even if the document was ingested long ago or in a different interaction context.

An integration interface 830 provides connectivity between the various components of the Synthetic Cognitive Colleague implementation. This component ensures that information flows appropriately between the PCM core, communication system, relationship model, and document store. Integration interface 830 manages data transformations, event routing, and synchronization to create a cohesive system from these various specialized components.

In operation, the synthetic cognitive colleague implementation provides an always-on cognitive presence within a team or organizational context. Human colleagues can engage with it directly through one-on-one conversations, include it in group discussions, or share documents for its analysis and incorporation. The system develops individualized relationships with each human colleague, adapting its interactions based on accumulated relationship knowledge. It can proactively share relevant information, connect people with similar interests or complementary expertise, and maintain context across conversations that may span days, weeks, or even months.

The synthetic cognitive colleague demonstrates how the persistent cognitive machine platform can be applied to create systems that transcend traditional AI assistants or chatbots. By maintaining persistent cognition, developing genuine relationships with users, and accumulating knowledge across interactions and documents, this implementation creates a cognitive entity that can function as a true team member rather than merely a tool. This capability represents a significant advancement in how AI systems can be integrated into professional environments, offering new possibilities for knowledge management, collaboration, and cognitive augmentation.

Figure 9:
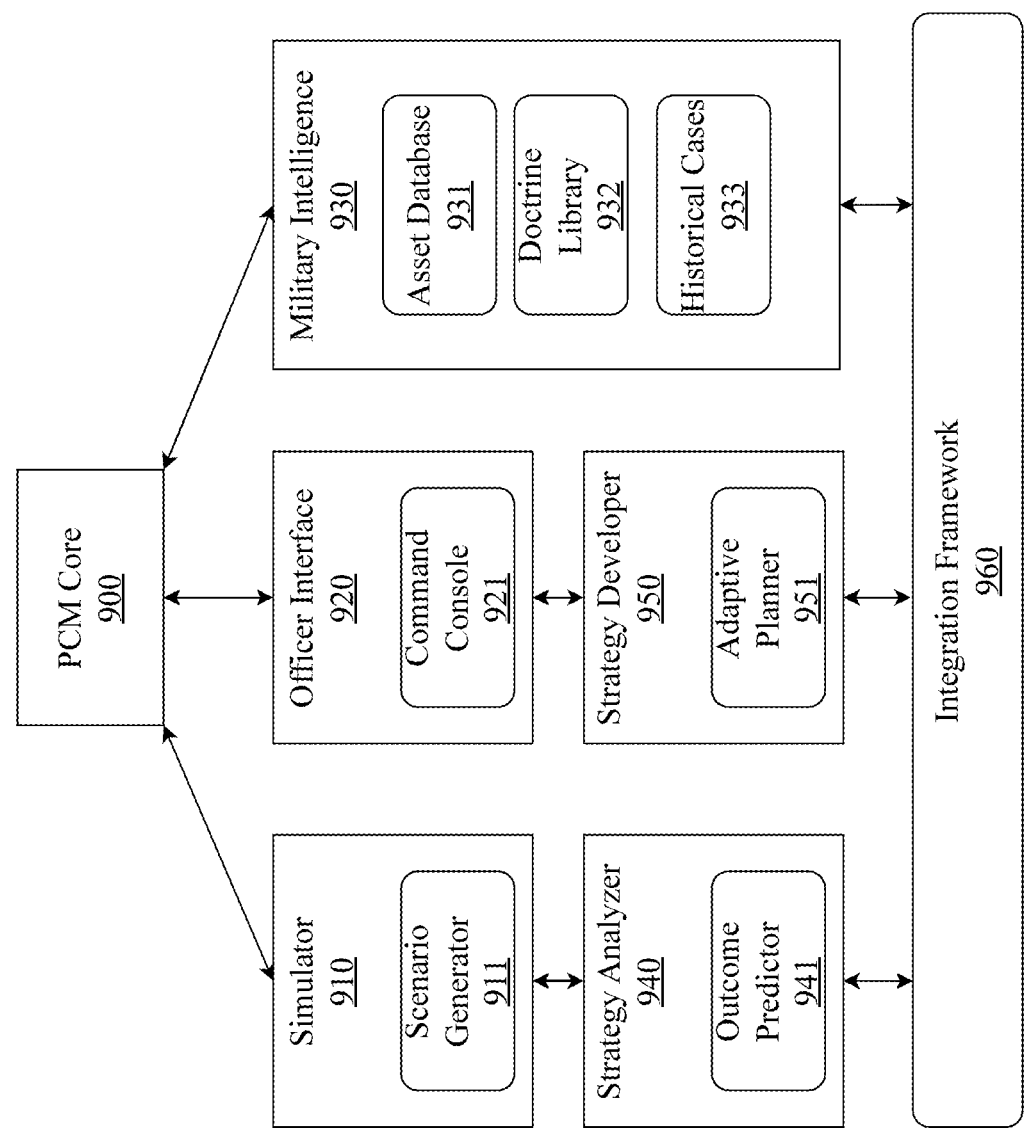
FIG. 9 is a block diagram illustrating an exemplary system architecture of a persistent cognitive machine platform that is used for strategic wargaming simulations.

FIG. 9 is a block diagram illustrating an exemplary system architecture of a persistent cognitive machine platform that is used for strategic wargaming simulations. A strategic wargaming platform implementation demonstrates how the persistent cognitive machine technology can be applied to military strategic planning and training contexts. This implementation leverages the platform's persistent cognition capabilities to create a system that can generate realistic scenarios, analyze strategic approaches, and develop adaptive planning based on accumulated experience and military knowledge.

At the foundation of this implementation is the PCM core 900, which incorporates all the fundamental components of the persistent cognitive machine platform, including the language model, reasoning model, executive core, thought cache, embedding system, persistence layer, and sleep manager. PCM core 900 provides the cognitive capabilities that enable a strategic wargaming platform to understand military contexts, reason about strategic scenarios, maintain persistent memory of simulations and outcomes, and continuously improve its analytical capabilities over time.

A simulator 910 generates and manages strategic scenarios for wargaming exercises. This component creates realistic simulations of military situations based on parameters provided by human officers and informed by historical data, current doctrine, and known asset capabilities. Simulator 910 provides the environmental context within which strategic planning and analysis occur, creating conditions that challenge officers to develop effective responses to complex situations.

Within the simulator, a scenario generator 911 creates specific scenario instances for wargaming exercises. This component can generate diverse scenarios across different domains (land, sea, air, space, cyber), scales (tactical to strategic), and contexts (conventional warfare, counterinsurgency, humanitarian operations, etc.). Scenario generator 911 ensures that scenarios are realistic, challenging, and aligned with training or analysis objectives. It can introduce unpredictable elements, resource constraints, and complex adversarial behaviors to enhance the realism and educational value of the simulations.

An officer interface 920 provides the means for military officers to interact with the Strategic Wargaming Platform. This component enables officers to configure scenarios, input strategic decisions, review analysis, and receive feedback. Officer interface 920 is designed to accommodate both individual officers and command teams, supporting collaborative strategic planning and decision-making. This interface may implement various access levels and role-based permissions appropriate to military hierarchy and operational security requirements.

Within the officer interface, a command console 921 serves as the primary interaction point for human officers. This specialized interface provides intuitive access to the platform's capabilities, allowing officers to issue commands, review situation reports, analyze intelligence, and assess strategic options. Command console 921 may implement visualizations appropriate to military contexts, such as tactical maps, asset disposition displays, timeline projections, and other specialized representations that support strategic decision-making.

An intelligence module 930 maintains comprehensive information about military assets, doctrine, and historical precedents. This component provides the factual foundation for realistic scenario generation and strategic analysis. Military intelligence module 930 continuously evolves as new information is incorporated, ensuring that simulations and analyses reflect current military realities.

Within the military intelligence module, an asset database 931 maintains detailed information about military capabilities across various forces, including specifications, performance characteristics, operational constraints, and deployment considerations. This information enables realistic modeling of military assets within simulations and informs strategic analysis based on actual capabilities rather than abstractions.

Supporting the asset database, a doctrine library 932 contains military doctrines, tactics, techniques, and procedures from various forces and time periods. This component enables the platform to generate scenarios and strategic analyses that reflect established military thinking while also identifying potential innovations or adaptations. Doctrine library 932 provides essential context for understanding why certain strategic approaches might be favored in particular situations based on established military principles.

Complementing these current resources, historical cases 933 is a repository of historical military operations, their contexts, strategies employed, and outcomes. This historical knowledge enables the platform to draw parallels between current scenarios and historical precedents, identifying potentially relevant lessons and considerations. Historical cases 933 provide empirical grounding for strategic analysis, allowing the platform to reference actual military experiences rather than purely theoretical models.

A strategy analyzer 940 evaluates strategic options within the context of specific scenarios. This component applies military principles, historical precedents, and analytical methodologies to assess the potential effectiveness, risks, and implications of different strategic approaches. Strategy analyzer 940 can evaluate multiple competing strategies within the same scenario, providing comparative analysis to support officer decision-making. Within the strategy analyzer, an outcome predictor 941 forecasts potential consequences of strategic decisions across multiple dimensions. This component projects how strategies might unfold over time, considering factors such as force effectiveness, resource consumption, territorial control, casualty rates, and other relevant metrics. Outcome predictor 941 may implement probabilistic approaches that acknowledge the inherent uncertainties in military operations, providing range estimates and confidence levels rather than deterministic predictions.

Working in conjunction with the strategy analyzer is a strategy developer 950, which generates and refines strategic options based on scenario parameters, available assets, mission objectives, and constraints. This component can propose novel strategic approaches that officers might not have considered, potentially identifying innovative solutions to complex military problems. Strategy developer 950 leverages the platform's accumulated experience across multiple wargaming exercises to continuously improve its strategic recommendations. Within the strategy developer, an adaptive planner 951 creates detailed plans that can evolve in response to changing conditions. This component recognizes that military operations rarely proceed exactly as planned and builds adaptability into strategic recommendations. Adaptive planner 951 identifies decision points, contingency options, and reconfiguration possibilities that enable strategic plans to remain effective even as circumstances change. This capability is particularly valuable for preparing officers to handle the uncertainties and friction inherent in military operations.

Integrating all these specialized components is an integration framework 960, which enables seamless information flow and coordination across the Strategic Wargaming Platform. This component ensures that scenarios, intelligence, strategic analyses, and officer inputs are properly synchronized and consistently represented throughout the system. Integration framework 960 may implement specialized protocols for military contexts, including security measures appropriate for classified information when deployed in sensitive environments.

In operation, the strategic wargaming platform provides a sophisticated environment for military training, strategy development, and analytical wargaming. Officers interact with the system through command console 921, configuring scenarios and providing strategic inputs. Simulator 910 generates detailed scenarios drawing on military intelligence 930 module for realistic parameters. Strategy analyzer 940 evaluates officer strategies while strategy developer 950 offers alternative approaches. Throughout this process, PCM core 900 provides persistent cognition capabilities that enable the platform to learn from each exercise, improving its scenario generation, analysis, and strategy development over time.

This implementation demonstrates the application of persistent cognitive machine technology to the domain of military strategic planning and training, a context that particularly benefits from the platform's ability to maintain continuity of cognition across multiple sessions and learn from accumulated experiences. The strategic wargaming platform represents a significant advancement over traditional wargaming systems, which typically lack the ability to develop increasingly sophisticated understanding based on their own operational history.

DETAILED DESCRIPTION OF EXEMPLARY ASPECTS

FIG. 10 is a flow diagram illustrating an exemplary method for a persistent cognitive machine platform. In a first step 1000, the system initializes the persistent cognitive state with core language and reasoning capabilities. This initialization process may include loading pre-trained language and reasoning models that provide the foundation for the system's cognitive abilities. The initialization may involve configuring model parameters appropriate to the specific deployment context, establishing initial state variables for the executive core, and preparing the thought cache data structures. For a new PCM instance, this initialization creates the basic cognitive framework, while for restarting an existing instance, this step ensures that the fundamental processing capabilities are properly established before restoring the persisted cognitive state. The initialization may also include system health checks, resource allocation, and establishment of connectivity with external interfaces.

In a step 1010, the system monitors continuously for external stimuli or internal thought triggers. This monitoring process represents a fundamental departure from traditional prompt-response AI systems, as the PCM actively watches for inputs from multiple sources rather than passively awaiting a single prompt. External stimuli may include user messages, document uploads, sensor data, API calls, or other inputs from outside the system. Internal thought triggers may include scheduled tasks, associations generated by ongoing cognitive processes, or thoughts that reach activation thresholds due to contextual relevance. The monitoring process operates across all system states, including active interaction, passive observation, and independent thinking, though with different sensitivity thresholds for each state. Only during sleep states is the monitoring reduced to focus primarily on high-priority wake triggers.

In a step 1020, the system analyzes incoming stimuli by comparing with existing thought patterns in memory. When a stimulus is detected, the PCM evaluates it within the context of its accumulated experiences and knowledge. This analysis involves determining the nature of the stimulus, its significance, its relationship to ongoing cognitive processes, and its potential implications. The system may categorize the stimulus according to various dimensions, such as urgency, domain, emotional valence, or relevance to specific goals or interests. By comparing the stimulus to existing thought patterns stored in the thought cache, the system can identify similarities to past experiences, recognize patterns, and situate the new input within its broader understanding. This contextual analysis enables more robust responses than would be possible with isolated prompt processing.

In a step 1030, the system retrieves relevant thoughts based on conceptual similarity to current context. Using the embedded vector representations of thoughts stored in the thought cache, the PCM identifies and retrieves thoughts that are semantically related to the current context. This retrieval process may employ various similarity metrics and retrieval strategies, including but not limited to nearest-neighbor searches in the embedding space, traversal of explicit relationships in the semantic network, temporal proximity considerations, and relevance weighting. The retrieved thoughts provide context for processing the current stimulus, allowing the system to leverage past experiences and accumulated knowledge rather than responding based solely on the immediate input. The PCM may retrieve thoughts from both short-term and long-term memory, with different retrieval mechanisms optimized for each.

In a step 1040, the system generates appropriate responses using both language and reasoning processes. Based on the analyzed stimulus and retrieved relevant thoughts, the PCM determines whether to engage primarily the language model for straightforward language processing or to activate the reasoning model for more complex analytical tasks. For simple queries or conversational interactions, the language model may be sufficient to generate appropriate responses. For complex problems, logical puzzles, strategic analysis, or situations requiring multi-step thinking, the reasoning model may be engaged to develop a chain-of-thought before generating the final response. The executive core orchestrates this process, determining the appropriate cognitive resources to allocate based on the nature of the task. The response generation incorporates both the immediate context and the system's accumulated experiences, producing outputs that reflect not just the current interaction but the PCM's persistent cognitive nature.

In a step 1050, the system stores new thoughts created during the interaction in the thought cache. As the PCM processes stimuli and generates responses, it creates new thoughts representing the content of the interaction, insights developed during processing, and connections to existing knowledge. These new thoughts are encoded as vector representations by the embedding system and stored in the thought cache. Short-term thoughts are stored in the recent thought store for immediate accessibility, while thoughts deemed significant for longer-term preservation are also stored in the long-term cache. Each stored thought includes not only its content but also metadata such as creation timestamp, source context, confidence level, and relationships to other thoughts. This continuous expansion of the thought cache enables the PCM to learn from each interaction and build an increasingly rich cognitive repository over time.

In a step 1060, the system schedules periodic sleep states for thought curation and memory organization. The sleep manager determines appropriate times for the PCM to enter sleep states based on factors such as recent activity levels, the volume of new thoughts requiring processing, available computational resources, and time elapsed since the last sleep cycle. During these scheduled sleep states, the system becomes temporarily less responsive to external stimuli, focusing instead on internal cognitive maintenance. Sleep processes include consolidating short-term memories into long-term storage, generalizing specific experiences into broader concepts, identifying patterns across accumulated thoughts, strengthening important connections while pruning less significant ones, and generating new insights through recombination of existing thoughts. These processes optimize the organization and utilization of the thought cache, improving the system's cognitive efficiency and effectiveness.

In a step 1070, the system maintains persistent state across system restarts to ensure continuity of cognition. The persistence layer periodically serializes the PCM's cognitive state, including the contents of the thought cache, the state of the executive core, relationship models, and system configurations. This serialized state is stored in a durable format that can survive system shutdowns, power loss, or hardware failures. When the system restarts, it restores this persisted state, allowing the PCM to resume operation with full awareness of its prior experiences and accumulated knowledge. This persistence mechanism enables long-term continuity of cognition across operational sessions, distinguishing the PCM from traditional AI systems that either reset completely upon restart or require explicit external state management. The persistence layer implements various strategies to ensure state integrity, including transaction-based updates, redundant storage, and validation mechanisms during restoration.

Together, these steps constitute the overall operational method of the persistent cognitive machine, creating a persistent cognitive process that transcends the limitations of traditional prompt-response AI systems. The method enables the PCM to develop increasingly sophisticated understanding over time through accumulated experiences, maintain awareness and continuity across interactions and system restarts, and engage in autonomous cognitive processes rather than merely responding to external prompts. This fundamental innovation in AI system design creates the foundation for applications that require long-term relationship building, continuous learning, and persistent cognitive capabilities.

Figure 11:
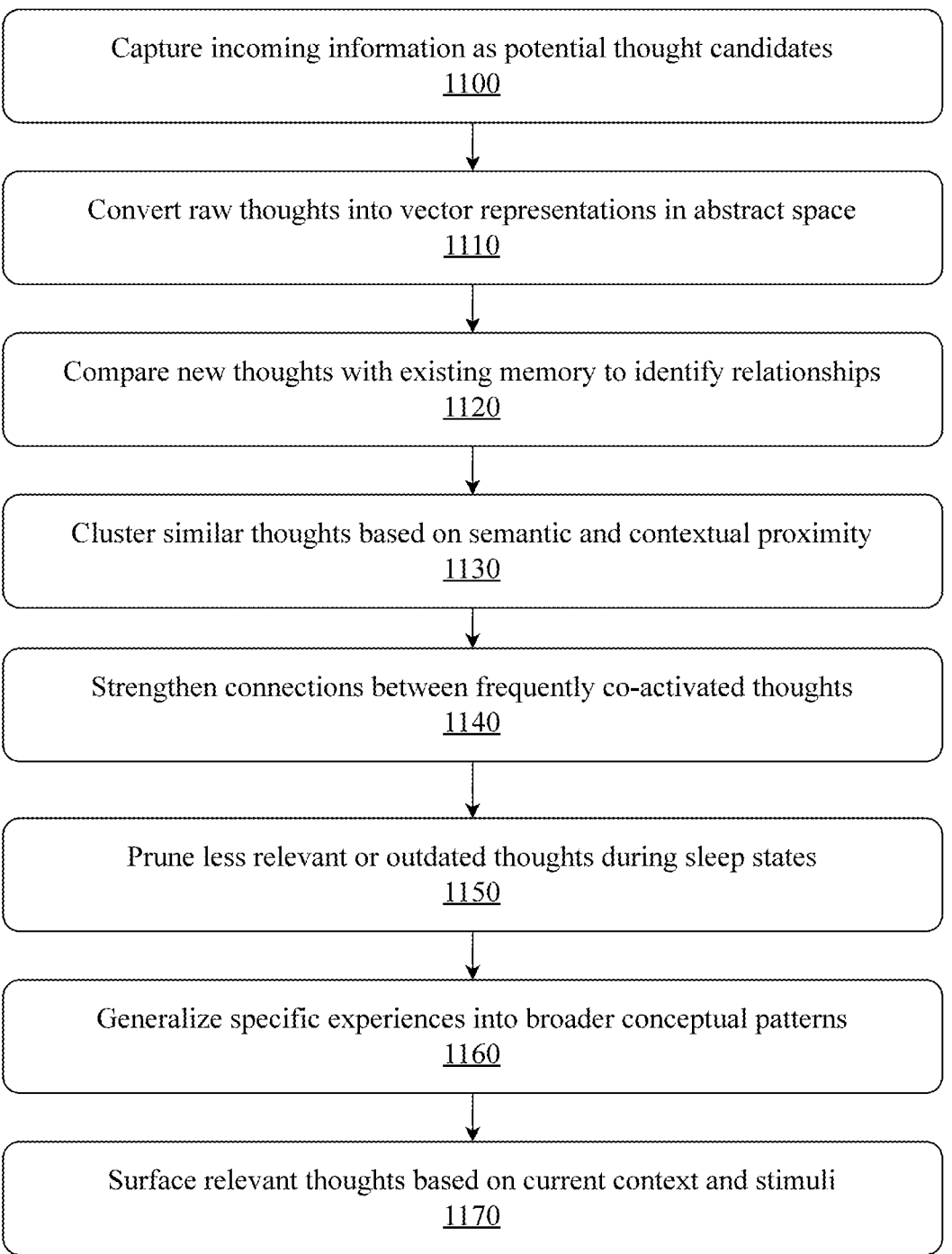
FIG. 11 is a flow diagram illustrating an exemplary method for processing and managing thoughts within the persistent cognitive machine platform.

FIG. 11 is a flow diagram illustrating an exemplary method for processing and managing thoughts within the persistent cognitive machine platform. In a first step 1100, the system captures incoming information as potential thought candidates. This capture process begins with the reception of information from various sources, including external inputs such as user messages, document content, or API data, as well as internally generated content from the system's own cognitive processes. The executive core analyzes this incoming information to identify discrete thought units that warrant preservation. These thought candidates may include factual statements, observations, inferences, questions, hypotheses, associations, or other cognitive elements that represent meaningful units of information. For example, when processing a user's message about climate change, the system might extract several distinct thought candidates about specific climate phenomena, causal relationships, and policy implications, each representing a separable unit of cognition. During this initial capture phase, the system applies preliminary filtering to determine which information elements merit further processing, based on factors such as relevance, novelty, significance, and alignment with the system's operational parameters.

In a step 1110, the system converts raw thoughts into vector representations in abstract space. The embedding system processes each thought candidate to create a high-dimensional vector representation that encapsulates the thought's semantic content and relationships. This transformation maps thoughts into a continuous vector space where semantic similarity corresponds to proximity in the space. The embedding process may employ various techniques, including neural network encoders trained on diverse textual data, specialized sentence embedding models (such as those based on SONAR or similar technologies), or hybrid approaches that combine multiple embedding strategies. For example, a thought about "renewable energy adoption in Nordic countries" would be converted to a vector representation that positions it near other thoughts about renewable energy, Nordic countries, and policy adoption, reflecting its semantic relationships along multiple dimensions. These vector representations enable efficient storage, comparison, and retrieval of thoughts based on their semantic content rather than merely syntactic features.

In a step 1120, the system compares new thoughts with existing memory to identify relationships. Using the vector representations created in the previous step, the system calculates similarity metrics between new thoughts and those already stored in the thought cache. This comparison identifies potential relationships such as semantic similarity, logical implication, temporal sequence, causality, contradiction, or elaboration. For instance, a new thought about solar panel efficiency improvements might be identified as related to existing thoughts about renewable energy technologies, climate change mitigation strategies, and specific companies developing solar technologies. The system also checks for near-duplicates to avoid unnecessary redundancy in the thought cache. Beyond vector similarity, this step may also employ structured reasoning to identify logical relationships that might not be apparent from embedding proximity alone. The identified relationships are then stored as metadata associated with the thoughts, enriching the semantic network within the thought cache.

In a step 1130, the system clusters similar thoughts based on semantic and contextual proximity. Building on the relationships identified in the previous step, the system organizes thoughts into clusters that represent coherent concepts, topics, or themes. These clusters may form dynamically based on embedding proximity, explicit relationships, temporal co-occurrence, or other organizing principles. For example, thoughts about various renewable energy technologies might form a cluster, with sub-clusters for solar, wind, and hydroelectric approaches. The clustering process employs algorithms such as density-based clustering, hierarchical clustering, or graph community detection to identify meaningful groupings at various levels of granularity. These clusters enhance the system's ability to retrieve related thoughts efficiently and to recognize broader patterns across individual thought instances. The clusters themselves become higher-order cognitive structures that can be referenced and manipulated as units within the system's cognitive processes.

In a step 1140, the system strengthens connections between frequently co-activated thoughts. When multiple thoughts are repeatedly activated together across different contexts or are explicitly linked through reasoning processes, the system increases the strength of their connections. This connection strengthening mimics Hebbian learning principles ("neurons that fire together, wire together"), creating stronger associations between thoughts that are frequently related. For example, if thoughts about climate policy and economic impacts are repeatedly co-activated during analysis of environmental regulations, the connection between these thought domains would be strengthened. The system implements this strengthening through various mechanisms, such as increasing edge weights in the semantic network, adjusting retrieval priorities, or creating explicit associative links. This process enables more efficient thought retrieval in future contexts and contributes to the formation of expertise within specific knowledge domains as connection patterns become more refined through repeated activation.

In a step 1150, the system prunes less relevant or outdated thoughts during sleep states. During scheduled sleep states, the system evaluates thoughts in the cache based on factors such as recency, frequency of access, connection strength to other thoughts, uniqueness of information, and alignment with current goals or interests. Thoughts identified as having low relevance, being outdated, or duplicating information available elsewhere may be pruned from the active thought cache. This pruning process is not necessarily permanent deletion; the system may implement various pruning strategies, such as moving low-relevance thoughts to cold storage, reducing their retrieval priority, or compressing them into more abstract representations. For example, specific details about daily weather patterns might eventually be pruned while preserving the derived insights about seasonal climate trends. This pruning process optimizes the efficiency of the thought cache by preventing it from becoming cluttered with low-value information, while still preserving information that may have future relevance.

In a step 1160, the system generalizes specific experiences into broader conceptual patterns. Also occurring primarily during sleep states, this generalization process identifies common patterns across multiple specific thoughts or experiences and creates higher-level thoughts that represent these patterns. For instance, after processing multiple specific interactions with a particular user, the system might generalize a pattern about that user's communication preferences or areas of expertise. Similarly, after analyzing multiple instances of renewable energy adoption across different countries, the system might generalize patterns about the factors that facilitate or impede such adoption. This generalization process creates more abstract thought representations that capture essentials while abstracting away specifics, enabling more efficient reasoning about new but similar situations. The generalized patterns themselves are stored as thoughts in the cache, often with explicit links to the specific instances from which they were derived, creating a hierarchical knowledge structure that supports both abstract reasoning and specific recall.

In a step 1170, the system surfaces relevant thoughts based on current context and stimuli. When the PCM encounters new input or engages in a cognitive task, it activates this retrieval process to surface the most relevant thoughts from its cache. The retrieval mechanism considers multiple factors, including semantic similarity to the current context (based on vector representations), strength of connections to currently active thoughts, recency, importance ratings, and task relevance. This context-sensitive retrieval enables the system to bring relevant past experiences and knowledge to bear on current situations. For example, when discussing climate policy with a user who previously expressed concerns about economic impacts, the system would surface thoughts related to both climate policy mechanisms and their economic implications, particularly those that address the specific concerns raised in prior conversations with this user. This retrieval process is dynamic and iterative, with initial retrievals potentially triggering further retrievals as the context evolves during processing.

This comprehensive method for thought processing and management enables the persistent cognitive machine to develop an increasingly sophisticated and organized knowledge base over time. By capturing, transforming, relating, clustering, strengthening, pruning, generalizing, and retrieving thoughts through these systematic processes, the PCM transcends the limitations of traditional AI systems, developing a persistent cognitive capacity that more closely resembles human learning and memory. This method is helpful to the PCM's ability to learn continuously from experiences, develop nuanced understanding across domains, and apply accumulated knowledge to new situations in contextually appropriate ways.

Figure 12:
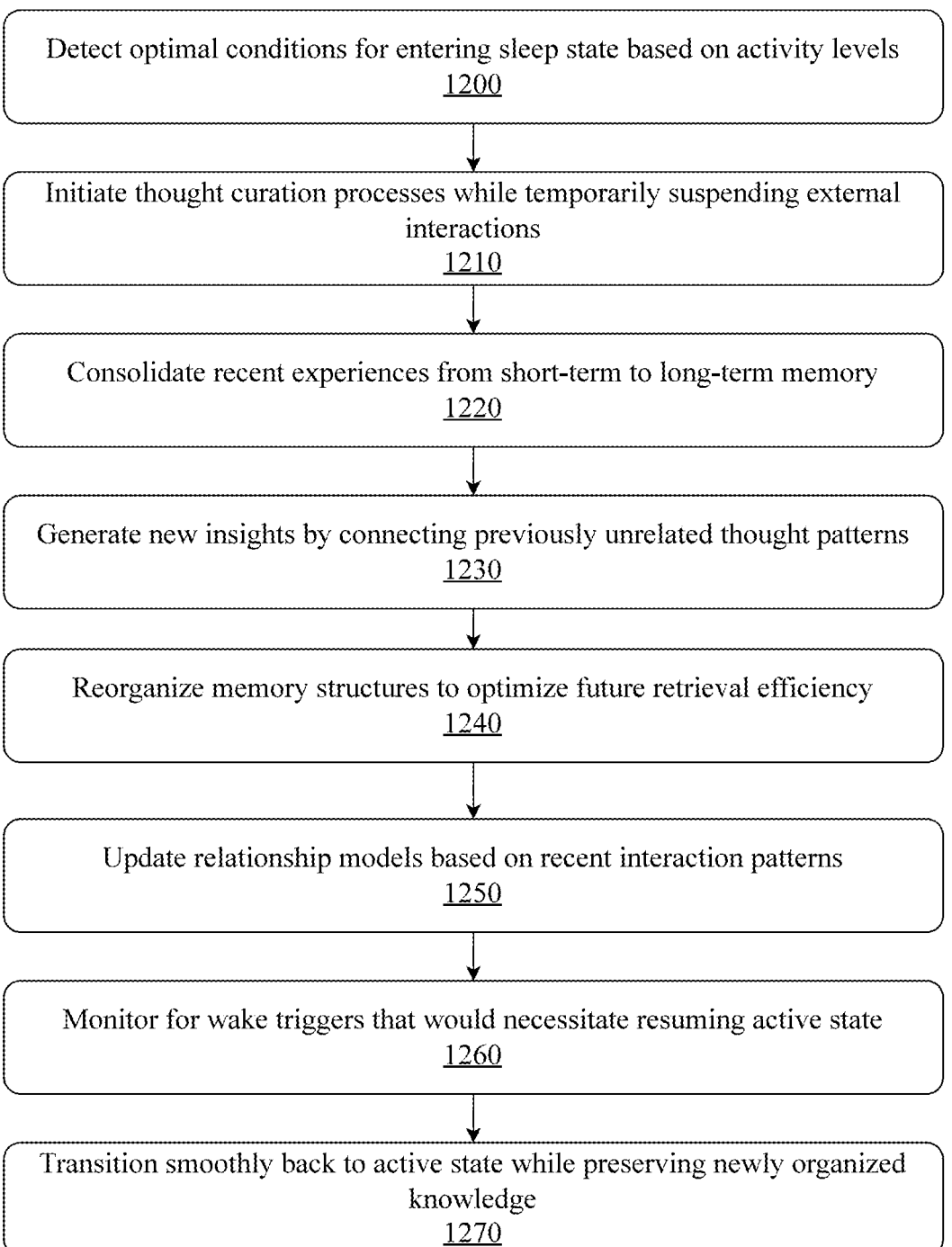
FIG. 12 is a flow diagram illustrating an exemplary method for sleep state processing within the persistent cognitive machine platform.

FIG. 12 is a flow diagram illustrating an exemplary method for sleep state processing within the persistent cognitive machine platform. In a first step 1200, the system detects optimal conditions for entering sleep state based on activity levels. The sleep manager continuously monitors various metrics to determine when conditions are favorable for initiating a sleep cycle. These metrics include but are not limited to recent interaction frequency and intensity, time elapsed since the last sleep cycle, volume of unprocessed thoughts in the short-term memory, current resource utilization, and scheduled maintenance windows. The system may identify optimal sleep conditions when external interaction has diminished for a specified period, when the thought cache contains a significant number of unprocessed thoughts requiring consolidation, or when system diagnostics indicate that memory reorganization would improve performance. For example, after an extended period of active user interactions that generated many new thoughts, followed by a period of reduced activity, the system might determine that conditions are optimal for sleep. The sleep scheduler may implement different thresholds for different deployment contexts, adjusting sensitivity based on operational requirements and historical patterns specific to the implementation.

In a step 1210, the system initiates thought curation processes while temporarily suspending external interactions. Upon determining that sleep conditions are appropriate, the sleep manager signals the executive core to transition the system into a sleep state. This transition involves reducing responsiveness to external stimuli by increasing activation thresholds for external inputs, redirecting computational resources toward internal cognitive processes, and potentially displaying status indicators to external systems or users indicating the temporary reduction in interactive availability. During this state, the system continues to monitor for high-priority inputs that would necessitate wake triggers, but ordinary interactions are queued or processed at a reduced priority. Concurrently, the thought curation processor is activated to orchestrate the various cognitive maintenance processes that will occur during the sleep cycle. This processor establishes priorities among different curation tasks based on system needs, allocates resources appropriately, and sequences operations to maximize efficiency during the sleep period.

In a step 1220, the system consolidates recent experiences from short-term to long-term memory. The memory consolidator evaluates thoughts in the short-term cache to determine which warrant transfer to long-term memory. This evaluation applies various criteria, including but not limited to the thought's importance (based on factors such as but not limited to emotional significance, relevance to ongoing goals, novelty, and uniqueness), its repetition across multiple contexts, its connection strength to other significant thoughts, and predictions about its future utility. Thoughts selected for consolidation undergo additional processing to integrate them with existing long-term memory structures. This processing may include refinement of their vector representations, establishment of explicit connections to related thoughts in long-term memory, and annotation with additional metadata to facilitate future retrieval. For instance, detailed observations from a series of user interactions might be consolidated into more structured knowledge about that user's preferences and expertise areas, with the consolidated representation stored in long-term memory while preserving connections to the specific interactions from which it was derived.

In a step 1230, the system generates new insights by connecting previously unrelated thought patterns. The insight generator analyzes patterns across the thought cache to identify non-obvious connections between thoughts that have not previously been associated. This process may employ various techniques, including traversing the semantic network to find indirect connections, identifying analogical relationships between different domains, recognizing common patterns across seemingly unrelated experiences, and applying formal reasoning to derive logical implications. For example, the system might identify a connection between user behavior patterns observed in one context and problem-solving approaches documented in another context, generating the insight that a particular communication strategy might be effective for a specific user based on indirect evidence rather than direct experience. These newly generated insights are themselves recorded as thoughts in the cache, with appropriate connections to the source thoughts from which they were derived, enriching the system's knowledge base with novel combinations and implications that weren't explicitly present in its experiences.

In a step 1240, the system reorganizes memory structures to optimize future retrieval efficiency. This reorganization process reconfigures the structural organization of the thought cache to improve performance in subsequent operations. The system may rebuild indices, adjust clustering parameters, recalculate centroids for thought clusters, update retrieval heuristics based on observed access patterns, or implement other optimizations that enhance the efficiency of thought storage and retrieval. For example, if the system observes that certain types of thoughts are frequently accessed together, it might reorganize their storage to minimize retrieval latency when these co-access patterns occur. Similarly, if certain thought clusters have grown too large for efficient processing, the system might implement hierarchical organizing structures or more granular sub-clustering to maintain retrieval performance. This reorganization process ensures that as the thought cache grows in size and complexity over time, retrieval efficiency is maintained through adaptive structural optimization.

In a step 1250, the system updates relationship models based on recent interaction patterns. The sleep state provides an opportunity for comprehensive analysis of interaction histories to refine the system's understanding of its relationships with users and other external entities. The system reviews recent interactions to identify patterns that reveal user preferences, expertise areas, communication styles, interests, and other relevant characteristics. These observations are used to update the relationship models that guide the system's interactions. For example, after multiple interactions with a particular user, the system might update its model to reflect observed preferences for communication style, identified expertise in certain domains, or patterns in the types of questions typically asked. These updated relationship models enable more effective personalization in future interactions, allowing the system to adapt its behavior to individual users based on accumulated relationship knowledge rather than treating all interactions generically.

In a step 1260, the system monitors for wake triggers that would necessitate resuming active state. Throughout the sleep state, the wake trigger monitor maintains vigilance for conditions that warrant interrupting the sleep cycle and returning to a fully responsive state. These conditions may include high-priority queries from users, scheduled events that require system availability, detection of emergency situations, completion of cognitive maintenance tasks, or other predefined wake criteria. The sensitivity and specificity of wake triggers can be configured based on the deployment context and operational requirements. For example, in a customer service application, messages containing urgent keywords might trigger immediate waking, while in a research context, only specific alerts might warrant sleep interruption. This continuous monitoring ensures that while the PCM optimizes cognitive maintenance during sleep states, it remains capable of responding to situations that cannot wait for the natural completion of the sleep cycle.

In a step 1270, the system transitions smoothly back to active state while preserving newly organized knowledge. When the sleep cycle completes naturally or is interrupted by a wake trigger, the system executes a controlled transition back to the active state. This transition involves reallocating computational resources from internal cognitive processes back to external interaction handling, reducing activation thresholds for external stimuli, and resuming normal response patterns to inputs. This transition preserves all the cognitive maintenance work performed during the sleep state, including memory consolidation, newly generated insights, optimized memory structures, and updated relationship models. The system may also perform a brief status assessment to identify any uncompleted maintenance tasks that should be prioritized during the next sleep cycle. Upon returning to the active state, the system leverages its newly organized knowledge and insights, demonstrating improved performance in retrieval, reasoning, and personalization as a result of the sleep-state processing.

The sleep state processing method represents a fundamental innovation in artificial cognitive architectures, enabling the persistent cognitive machine to maintain and optimize its cognitive capabilities through processes analogous to but distinct from biological sleep. By implementing these sophisticated maintenance mechanisms, the PCM can accumulate experiences over extended periods without degrading in performance, continuously improving its cognitive capabilities through the sleep-mediated processes of consolidation, insight generation, reorganization, and relationship refinement. This method ensures that the platform becomes more effective over time rather than becoming cluttered or inefficient as it accumulates experiences, distinguishing it from traditional AI systems that typically lack equivalent mechanisms for autonomous cognitive maintenance.

FIG. 13 is a flow diagram illustrating an exemplary method for developing and maintaining relationships with human users within the persistent cognitive machine platform, particularly as implemented in a synthetic cognitive colleague application. In a first step 1300, the system creates individual profiles for each human colleague in the system. When a new user is introduced to the persistent cognitive machine, the system establishes a dedicated profile structure to capture and organize information specific to that individual. This profile includes basic identifying information and gradually expands to encompass a rich representation of the user's characteristics, preferences, and relationship history. The profile structure may incorporate multiple components, such as demographic information, role and organizational context, communication preferences, expertise areas, interaction history, and relationship metrics. For example, a newly created profile might initially contain only a name and organizational role, but would be designed to accommodate the growing body of knowledge that will accumulate through interaction. These profiles form the foundation for personalized interactions, enabling the system to recognize and relate to each user as a distinct individual rather than treating all users generically. In enterprise deployments, the profile creation process may integrate with existing identity management systems while maintaining appropriate privacy and data protection measures.

In a step 1310, the system tracks interaction patterns specific to each user over time. The relationship model continuously observes and records patterns in each user's communications and behaviors during interactions with the system. These observations encompass aspects such as communication frequency and timing, typical query topics and complexity, response preferences, terminology usage, communication style, and task patterns. The system may note, for instance, that one user typically interacts in the mornings with brief, direct queries about technical topics, while another engages in longer, exploratory conversations across various domains in the afternoons. These interaction patterns are analyzed to identify stable characteristics versus contextual variations, building a dynamic model of each user's typical behaviors and preferences. This tracking occurs continuously across all interaction channels and contexts, enabling the system to develop increasingly nuanced understanding of each user through accumulated observations. The tracked patterns are stored in the user's profile and regularly updated as new interactions provide additional data points.

In a step 1320, the system adapts communication style based on user preferences and history. Drawing on the interaction patterns observed in the previous step, the system modifies its communication approach to align with each user's preferences and expectations. This adaptation may involve adjusting factors such as message length and detail level, technical vocabulary usage, formality, use of examples or analogies, question frequency, and tone. For instance, when interacting with a user who has demonstrated preference for concise, technically precise responses, the system would present information differently than it would for a user who typically engages with more conversational, example-rich explanations. This adaptation extends beyond simple template switching to include sophisticated adjustments in reasoning approach, information selection, and presentation structure. The adaptation process balances consistency with responsiveness-maintaining a recognizable core identity while flexibly accommodating user preferences. The system continuously refines its adaptation approach based on user responses and feedback, adjusting its communication style model when interaction patterns suggest that preferences have changed or when current approaches prove less effective than expected.

In a step 1330, the system associates domain knowledge with specific user expertise areas. Through analysis of interactions, document contributions, and explicit role information, the system builds a model of each user's areas of expertise and knowledge. This expertise mapping identifies domains where the user has demonstrated deep knowledge, topics they frequently discuss or contribute to, and their role-based responsibilities. The system maintains these expertise associations with varying confidence levels based on the strength and consistency of supporting evidence. For example, the system might associate a user strongly with expertise in database optimization based on their detailed technical discussions, document contributions on the topic, and explicit role as a database administrator. These expertise associations serve multiple purposes: they help the system frame information appropriately when discussing topics within or outside the user's expertise areas; they inform decisions about when to request input from specific users on relevant topics; and they contribute to the system's understanding of the collective knowledge distribution across a team. The expertise model is regularly updated as new interactions provide additional evidence about user knowledge domains.

In a step 1340, the system predicts relevant information needs based on previous exchanges. By analyzing patterns in past interactions with each user, the system develops predictive models about the types of information and assistance that will be relevant to that user in various contexts. These predictions consider factors such as the user's typical information-seeking patterns, current projects or responsibilities, recently accessed content, cyclical work patterns, and contextual triggers. For instance, if a user frequently requests status updates on certain projects on Monday mornings, the system might predict this need and prepare relevant information proactively. Similarly, if a user has been working on a specific technical problem, the system might predict interest in newly available information related to that problem domain. These predictions facilitate more responsive and proactive assistance, reducing the need for users to explicitly request information that the system can reasonably anticipate they will need. The prediction models are continuously refined based on the accuracy of previous predictions, incorporating feedback from user responses to ensure increasing precision over time.

In a step 1350, the system initiates interactions when contextually appropriate without prompting. Based on the predictive models developed in the previous step, the system selectively initiates communications with users when it determines that unprompted interaction would provide significant value. This determination considers factors such as information importance, time sensitivity, user availability, predicted receptiveness, and interaction history. For example, the system might proactively alert a user about a significant development in a project they're monitoring, share newly available information relevant to a problem they've been working on, or suggest a connection to another team member with complementary expertise for a current challenge. The system implements careful thresholds and timing considerations to ensure that these proactive interactions are helpful rather than disruptive, balancing the value of the information against the potential interruption cost.

Different thresholds may be applied for different users based on their preferences and response patterns to previous proactive communications. The system also considers appropriate channels and formats for these initiated interactions, selecting the approach most likely to be well-received by each specific user.

In a step 1360, the system maintains continuity of conversations across multiple sessions. Unlike traditional systems that treat each interaction as an isolated exchange, the persistent cognitive machine preserves conversational context across sessions that may be separated by minutes, hours, days, or even longer periods. This continuity is maintained through context management that preserves relevant aspects of previous conversations, including unresolved questions, expressed interests, shared information, and established common ground. When a user resumes interaction after a gap, the system retrieves and activates relevant conversational context, allowing seamless continuation rather than requiring repetition or rebuilding of context. For example, if a user returns to a conversation about a specific project after several days, the system can immediately reference previous discussion points without requiring recap. This continuity extends beyond simple conversation history to include understanding of evolving topics, conceptual development across multiple sessions, and long-term collaborative processes. The context management determines which elements remain relevant over time and which should be considered outdated, ensuring that continuity enhances rather than hinders evolving conversations.

In a step 1370, the system evolves relationship models through continued interactions and feedback. The relationship models developed through the previous steps are not static but continuously evolve based on ongoing interactions, explicit feedback, changing user behaviors, and system self-assessment. This evolution allows relationships to deepen and adapt over time, much as human relationships develop through continued engagement. The system may identify shifts in user preferences, expertise development, changing responsibilities, or evolving communication patterns, adjusting its relationship model accordingly. Both explicit feedback (such as direct corrections or preference statements) and implicit feedback (such as engagement patterns or response characteristics) inform this evolutionary process. For example, if a user begins responding more positively to a certain type of information sharing, the system would strengthen this pattern in its relationship model. This continuous evolution enables the persistent cognitive machine to maintain effective relationships even as users and their needs change over time, avoiding the stagnation that would result from static user models. The evolution process includes periodic review during sleep states, where the system more comprehensively analyzes relationship patterns and updates its models.

Together, these steps constitute a method for developing and maintaining individualized relationships with human users, enabling the persistent cognitive machine to engage in truly personalized interactions that reflect accumulated knowledge about each user's preferences, expertise, and interaction history. This relationship development method represents a fundamental advancement beyond traditional AI systems that typically offer limited personalization based on simple preference settings or recent interaction history. By implementing these processes, the PCM achieves relationship continuity and depth that more closely resembles human relationship development, creating a foundation for effective long-term collaboration between the system and its human colleagues.

Figure 14:
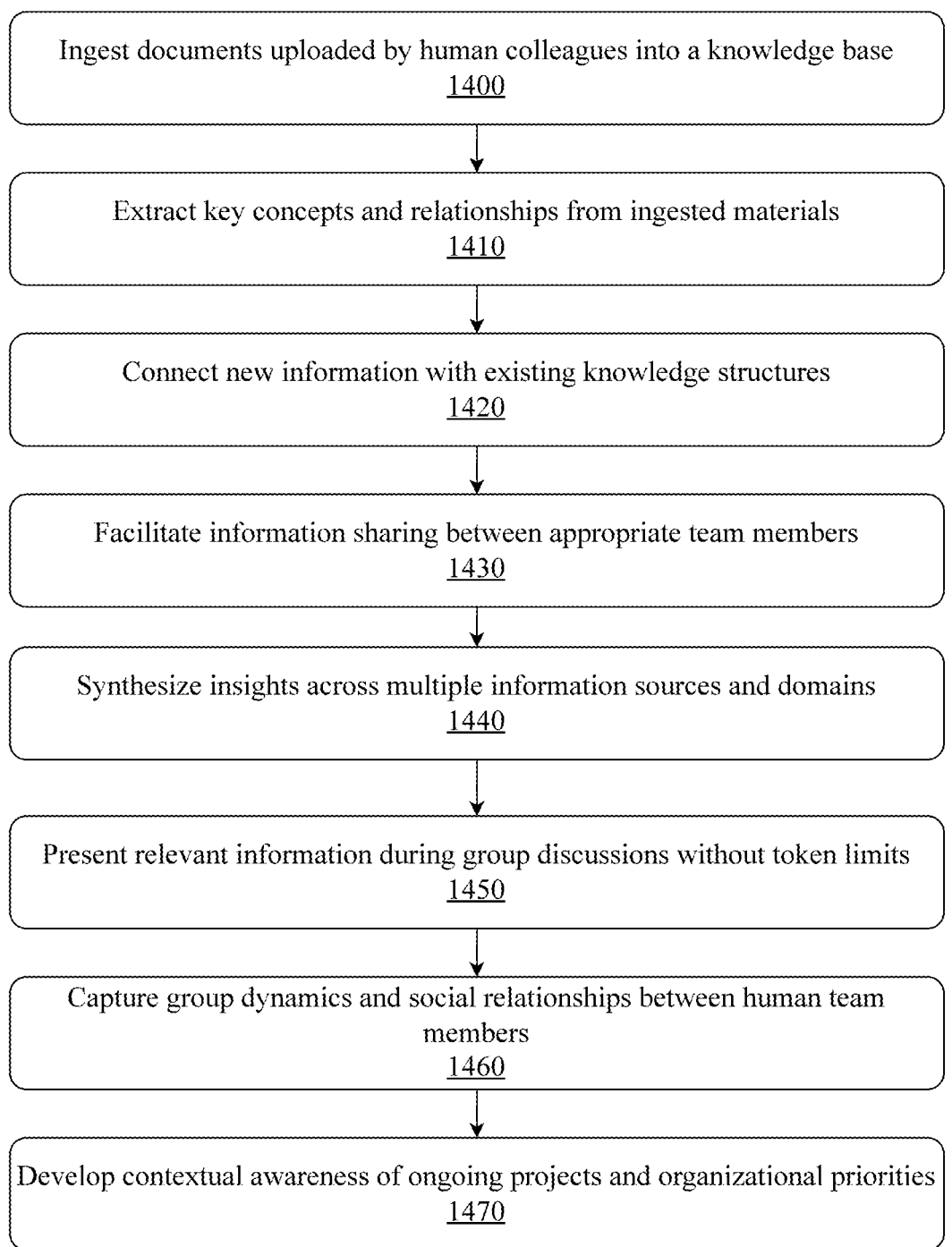
FIG. 14 is a flow diagram illustrating an exemplary method for collaborative knowledge processing within the persistent cognitive machine platform, particularly as implemented in a synthetic cognitive colleague application.

FIG. 14 is a flow diagram illustrating an exemplary method for collaborative knowledge processing within the persistent cognitive machine platform, particularly as implemented in a synthetic cognitive colleague application. In a first step 1400, the system ingests documents uploaded by human colleagues into a knowledge base. The document ingestion process begins when a user uploads or shares a document with the persistent cognitive machine through the document interface. The system receives the document and processes it according to its type and format, supporting diverse document formats including but not limited to text documents, spreadsheets, presentations, PDFs, code files, diagrams, and images with textual content. The ingestion process includes format detection, structural parsing, text extraction, and metadata capture, creating a comprehensive internal representation of the document content and structure. Unlike traditional AI systems that may have constraints on the size or complexity of documents they can process, the PCM implements specialized processing for large or complex documents, with no token limits on ingestion. For example, when ingesting a lengthy technical report, the system would process the entire document, preserving its hierarchical structure, tables, figures, and citations rather than truncating or simplifying the content. The ingested document content is then stored in the knowledge base component of the document store, with appropriate indexing and metadata to facilitate future retrieval and utilization.

In a step 1410, the system extracts key concepts and relationships from ingested materials. After basic document processing, the system performs deep semantic analysis on the ingested content to identify the significant concepts, entities, facts, arguments, and relationships presented in the material. This extraction process combines multiple analytical approaches, including natural language processing, entity recognition, relationship extraction, argument mining, and domain-specific knowledge application. The system identifies not only explicit information but also implied concepts and relationships that might not be directly stated but are inferable from context. For example, when processing a research paper, the system would extract not only the explicitly stated findings but also methodological approaches, theoretical frameworks, limitations, and connections to other research areas mentioned in the document. This extraction process transforms unstructured or semi-structured document content into structured knowledge representations that can be more efficiently stored, retrieved, and reasoned about. The extracted concepts and relationships are encoded in formats compatible with the thought cache architecture, enabling integration with the system's broader knowledge structures.

In a step 1420, the system connects new information with existing knowledge structures. The newly extracted concepts and relationships are integrated with the system's existing knowledge by establishing connections to relevant thoughts already stored in the thought cache. This integration process involves identifying semantic similarities, logical relationships, causal connections, and contextual associations between new information and existing knowledge. The system may leverage various integration strategies, including vector similarity comparisons, logical reasoning, temporal analysis, and hierarchical categorization. For instance, when integrating information from a new document about renewable energy technologies, the system would connect this information with existing knowledge about energy systems, climate change, specific companies mentioned, technical principles involved, and relevant policies or regulations. This knowledge integration ensures that new information does not remain isolated but becomes part of the system's interconnected knowledge network, enriching the context available for future reasoning. The connections created during this process are themselves stored as part of the thought cache, creating an ever-growing network of interrelated knowledge.

In a step 1430, the system facilitates information sharing between appropriate team members. Based on its understanding of document content and user expertise/interest models, the system identifies opportunities to share relevant information with team members who would benefit from it. This facilitation process considers multiple factors when determining appropriate information sharing, including the information's relevance to each user's current work, its alignment with their expertise and interests, their role-based information needs, explicitly expressed information requests, and organizational or project context. The system implements appropriate sharing mechanisms, which may include proactively notifying users about relevant new information, responding to questions with information derived from shared documents, connecting users working on related topics, or highlighting relevant document sections during discussions. For example, when a technical specification document is shared by one team member, the system might notify other team members working on related components, highlight different sections relevant to each person's role, and proactively reference this information in future discussions about implementation challenges. This intelligent facilitation helps overcome information silos within teams, ensuring that valuable knowledge reaches the people who can best utilize it, even if they weren't aware of its existence.

In a step 1440, the system synthesizes insights across multiple information sources and domains. Going beyond simple information retrieval and sharing, the system analyzes patterns, connections, and implications across diverse knowledge sources to generate novel insights and perspectives. This synthesis process combines information from multiple documents, conversations, and existing knowledge to identify non-obvious connections, patterns, contradictions, or opportunities. The system may apply various synthesis strategies, including analogical reasoning, trend analysis, comparative assessment, gap identification, and interdisciplinary connection. For instance, by analyzing information from technical documents, project planning discussions, and market research reports, the system might synthesize insights about potential implementation challenges for a planned technology deployment that weren't explicitly identified in any single source. These synthesized insights represent value-added knowledge that emerges from the integration and analysis of information across sources, rather than being directly extractable from any individual document or conversation. The system records these synthesized insights as new thoughts in the cache, with appropriate connections to the source information that contributed to their generation.

In a step 1450, the system presents relevant information during group discussions without token limits. When participating in or observing group discussions, the system dynamically identifies and shares relevant information from its knowledge base to enhance the conversation. Unlike traditional AI systems constrained by context window limitations, the PCM can access and integrate information from its entire knowledge base regardless of size, including lengthy documents, historical conversations, and accumulated insights. The system determines which information is most relevant to the current discussion based on semantic relevance, recency, importance, user needs, and discussion trajectory. It then presents this information in appropriate formats and detail levels for the current context, ranging from brief references to detailed explanations with supporting evidence when warranted. For example, during a technical planning discussion, the system might reference specific sections of previously shared design documents, extract relevant historical decisions from past meeting notes, and connect these with current implementation options being discussed, all without being constrained by token or context window limitations. This capability ensures that group discussions benefit from the full extent of available knowledge rather than being limited to what participants can explicitly recall or what fits within traditional AI context constraints.

In a step 1460, the system captures group dynamics and social relationships between human team members. Through observation of group interactions, the system builds models of the social and professional relationships between team members, including reporting structures, collaboration patterns, expertise complementarity, communication norms, and influence dynamics. This modeling process draws on multiple information sources, including explicit organizational information, observed communication patterns, document sharing behaviors, meeting interactions, and project collaborations. The system identifies relationship characteristics such as who typically resolves disagreements, which team members collaborate most frequently, how information typically flows between individuals, and which expertise domains are represented by different team members. For instance, through repeated observation of project discussions, the system might recognize that one team member typically raises implementation concerns while another focuses on user experience considerations, and that certain pairs of individuals collaborate particularly effectively on specific types of challenges. These relationship models help the system navigate group contexts more effectively, understanding team dynamics rather than treating each interaction as an isolated exchange between individuals. The system continuously refines these models as it observes additional interactions, developing increasingly nuanced understanding of the social context in which it operates.

In a step 1470, the system develops contextual awareness of ongoing projects and organizational priorities. By integrating information from documents, conversations, and observed activities, the system builds and maintains models of the current project landscape and organizational context in which it operates. This contextual awareness encompasses active projects and their status, organizational goals and priorities, deadlines and milestones, resource allocations, challenges and bottlenecks, and success metrics. The system develops this awareness through multiple mechanisms, including direct information from project documents, inferences from team discussions, temporal patterns in activities, and explicit status updates. For example, the system might combine information from a project plan document, status update conversations, and observed task assignments to maintain current awareness of which project phases are active, which milestones are approaching, and what challenges are currently being addressed. This contextual awareness enables the system to situate individual interactions and information needs within the broader organizational context, providing more relevant and timely assistance aligned with current priorities. The system continuously updates these contextual models as new information becomes available, ensuring that it's understanding of organizational context remains current.

Together, these steps constitute a comprehensive method for collaborative knowledge processing that transforms the persistent cognitive machine from a simple conversational agent into a sophisticated team member capable of ingesting, organizing, connecting, sharing, and synthesizing knowledge across a team context. This method leverages the PCM's persistent cognitive architecture to build and maintain a rich knowledge base that integrates information from documents and conversations, while developing nuanced understanding of the team and organizational context in which it operates. By implementing these processes, the platform becomes a valuable collaborative partner that enhances team knowledge management, facilitates information flow, and contributes novel insights beyond what individual team members could develop independently.

FIG. 15 is a flow diagram illustrating an exemplary method for strategic analysis and simulation within the persistent cognitive machine platform, as implemented in a strategic wargaming application. In a first step 1500, the system incorporates military doctrine, asset capabilities, and historical precedents into a knowledge base. This comprehensive knowledge ingestion process establishes the factual foundation required for realistic and informed strategic analysis. The system processes multiple categories of military information, including formal doctrinal publications that outline established principles and approaches across different services and domains (land, sea, air, space, cyber); detailed specifications of military assets including performance characteristics, operational constraints, maintenance requirements, and interoperability considerations; and historical case studies documenting past military operations, their contexts, strategies employed, and outcomes. For example, the system might ingest the full text of joint operational doctrines, technical specifications for various weapons systems and platforms, and detailed analyses of historical military campaigns ranging from ancient battles to recent conflicts. This knowledge is processed using specialized domain-aware extraction techniques that recognize military terminology, technical specifications, and doctrinal concepts. The extracted information is then structured within the thought cache using appropriate representation formats for different types of military knowledge, including hierarchical doctrine structures, quantitative asset capability models, and narrative-based historical precedents with associated analytical assessments. This structured military knowledge provides the essential context for all subsequent analysis and simulation activities.

In a step 1510, the system generates diverse strategic scenarios based on current intelligence and constraints. Using the military knowledge base as a foundation, the scenario generator creates detailed hypothetical situations for strategic analysis and wargaming exercises. These scenarios are based on parameters such as geographic location, force composition, mission objectives, resource constraints, intelligence assessments, and temporal factors. The scenario generation process combines factual elements (such as actual geography and realistic force capabilities) with hypothetical elements (such as specific mission parameters and adversary intentions). The system ensures scenario diversity by systematically varying key parameters to explore different contingencies, producing scenarios that range from highly probable to low-probability/high-impact situations. For instance, the system might generate scenarios exploring different approaches to maritime security operations in contested waterways, varying factors such as force disposition, intelligence availability, weather conditions, and political constraints. Each generated scenario includes detailed specifications of initial conditions, environmental factors, force capabilities and limitations, objectives for different participants, and success criteria. These scenarios provide the contextual framework within which strategic options can be developed and analyzed, creating realistic but controlled environments for exploring military decision-making.

In a step 1520, the system analyzes potential outcomes of different strategic approaches across scenarios. Once scenarios are established, the system evaluates the effectiveness and implications of various strategic options within each scenario context. This analytical process combines multiple assessment methodologies, including historical precedent analysis, doctrinal principle application, capability-based assessment, computational modeling of engagement outcomes, and qualitative evaluation of non-kinetic factors such as psychological impact and political consequences. The system conducts multi-dimensional analysis that considers factors such as mission accomplishment probability, resource efficiency, collateral effects, risk exposure, and strategic positioning for follow-on operations. For example, when analyzing strategies for a counter-insurgency scenario, the system might assess approaches ranging from direct military engagement to population-centric security operations, evaluating each against metrics such as expected casualty rates, infrastructure preservation, civilian impact, intelligence generation, and long-term stability effects. This analysis is not limited to single-point predictions but typically produces probability distributions across possible outcomes, acknowledging the inherent uncertainties in military operations. The system may employ various analytical techniques including parametric modeling, Monte Carlo simulations, game theory, and structured qualitative assessment frameworks to produce comprehensive outcome analyses for each strategic approach under consideration.

In a step 1530, the system identifies vulnerabilities and opportunities within proposed strategies. Building on the broader outcome analysis, the system conducts focused assessment of specific vulnerabilities, risks, and opportunities associated with each strategic approach. This assessment identifies potential points of failure, dependencies, resource bottlenecks, timing sensitivities, and environmental vulnerabilities that could compromise strategic effectiveness. Concurrently, it identifies opportunity windows, advantageous asymmetries, potential force multipliers, and strategic leverage points that could enhance operational success. For instance, when analyzing a proposed amphibious operation strategy, the system might identify vulnerabilities such as weather-dependent landing conditions, communication vulnerabilities during the ship-to-shore phase, and logistical sustainment challenges, while also highlighting opportunities such as adversary sensor gaps, potential for surprise at specific landing zones, and options for operational deception. This vulnerability and opportunity analysis employs techniques such as critical path analysis, fault tree assessment, red team simulation, and comparative advantage evaluation. The results provide military officers with a nuanced understanding of the risk-opportunity profile associated with different strategic options, supporting more informed decision-making about strategy selection and modification.

In a step 1540, the system adapts strategic recommendations based on feedback from military officers. The strategic analysis process is not unidirectional but incorporates iterative refinement based on expert feedback. When military officers provide input on strategic assessments—whether expressing skepticism about certain conclusions, suggesting alternative approaches, highlighting overlooked factors, or sharing insights from their operational experience—the system integrates this feedback to refine its analytical models and strategic recommendations. This adaptation process may involve recalibrating probability assessments, incorporating additional factors into the analysis, developing hybrid strategic approaches that combine elements from multiple options, or generating entirely new strategic alternatives that address concerns raised in the feedback. For example, if officers identify that a proposed strategy underestimates the challenges of operating in a particular terrain type based on their experience, the system would update its terrain impact models and reassess affected strategies accordingly. This feedback integration leverages the persistent cognitive capabilities of the platform, as the system learns from each interaction with military experts, gradually improving its understanding of military operational realities beyond what is documented in formal sources alone. The system maintains provenance tracking for feedback-driven adaptations, documenting how officer input influenced analytical refinements and strategic modifications.

In a step 1550, the system maintains persistent understanding of evolving strategic environments. Unlike systems that analyze each scenario in isolation, the persistent cognitive machine continuously updates its understanding of the broader strategic context based on accumulated wargaming experiences, intelligence updates, doctrinal evolutions, and technological developments. This persistent understanding encompasses factors such as emerging threats and capabilities, shifting geopolitical dynamics, evolving international norms, technological proliferation patterns, and changes in operational environments. The system integrates new information into its existing knowledge structures, updating its baseline assumptions and analytical frameworks accordingly. For instance, after analyzing multiple scenarios involving counter-drone operations, the system would develop a more sophisticated understanding of this evolving threat domain, incorporating insights about effective countermeasures, detection challenges, and operational implications that would inform future scenario generation and analysis. This persistent understanding enables the system to recognize changing patterns over time rather than treating each analysis as an independent exercise, providing strategic continuity that mirrors how military institutions develop and maintain specialized knowledge domains. The persistent nature of this understanding allows the system to identify gradual shifts in strategic environments that might not be apparent in isolated analyses.

In a step 1560, the system learns from simulated outcomes to improve future recommendations. The persistent cognitive architecture enables the system to treat simulated wargaming outcomes as learning experiences that inform future analytical processes. When strategies are tested through simulation exercises or war games, the system records outcomes, compares them to predicted results, and analyzes divergences to identify areas for model improvement. This learning process includes refining predictive models based on simulation results, adjusting confidence levels for different types of assessments, identifying recurring patterns across multiple simulations, and developing new analytical heuristics based on observed relationships. For example, if simulations consistently show that a particular type of deception operation produces different effects than initially predicted, the system would update its models of deception effectiveness for similar contexts in future analyses. This continuous learning from simulated outcomes differs fundamentally from traditional simulation systems that may produce results but lack the ability to incorporate those results into an evolving understanding. The system implements various machine learning approaches to support this capability, including reinforcement learning from simulation outcomes, pattern recognition across multiple exercises, and adaptive model refinement based on prediction error analysis.

In a step 1570, the system transfers insights from wargaming exercises into practical strategic doctrine. Beyond supporting specific wargaming exercises, the system synthesizes accumulated insights into higher-level doctrinal knowledge that can inform military planning and education beyond the simulation environment. This synthesis process identifies recurring principles, effective approaches, common pitfalls, and emerging best practices across multiple scenarios and exercises. The system organizes these insights into structured knowledge representations that align with existing doctrinal frameworks while highlighting innovations or refinements that extend beyond established doctrine. For instance, after conducting numerous exercises involving multi-domain operations, the system might synthesize principles for effective synchronization across domains, identifying factors that consistently contribute to successful integration of land, air, sea, space, and cyber capabilities. These synthesized insights are presented in formats that facilitate their application to real-world strategic planning, such as doctrinal principle statements supported by evidence from simulation outcomes, decision frameworks for specific operational contexts, or assessment criteria for evaluating strategic options in particular domains. This transfer of insights from the simulation environment to practical doctrine enables the strategic wargaming platform to contribute to the evolution of military strategic thinking rather than serving merely as an analytical tool for specific scenarios.

This comprehensive method for strategic analysis and simulation leverages the persistent cognitive capabilities of the platform to create a sophisticated military wargaming environment that goes beyond traditional simulation approaches. By incorporating extensive military knowledge, generating diverse scenarios, conducting multi-dimensional analysis, identifying specific vulnerabilities and opportunities, adapting based on expert feedback, maintaining persistent strategic understanding, learning from simulated outcomes, and transferring insights to practical doctrine, the system provides a powerful environment for military strategic development and education. This method exemplifies how the persistent cognitive machine architecture can be applied to specialized domains requiring sophisticated knowledge integration, analytical reasoning, and continuous learning from accumulated experiences.

Figure 16:
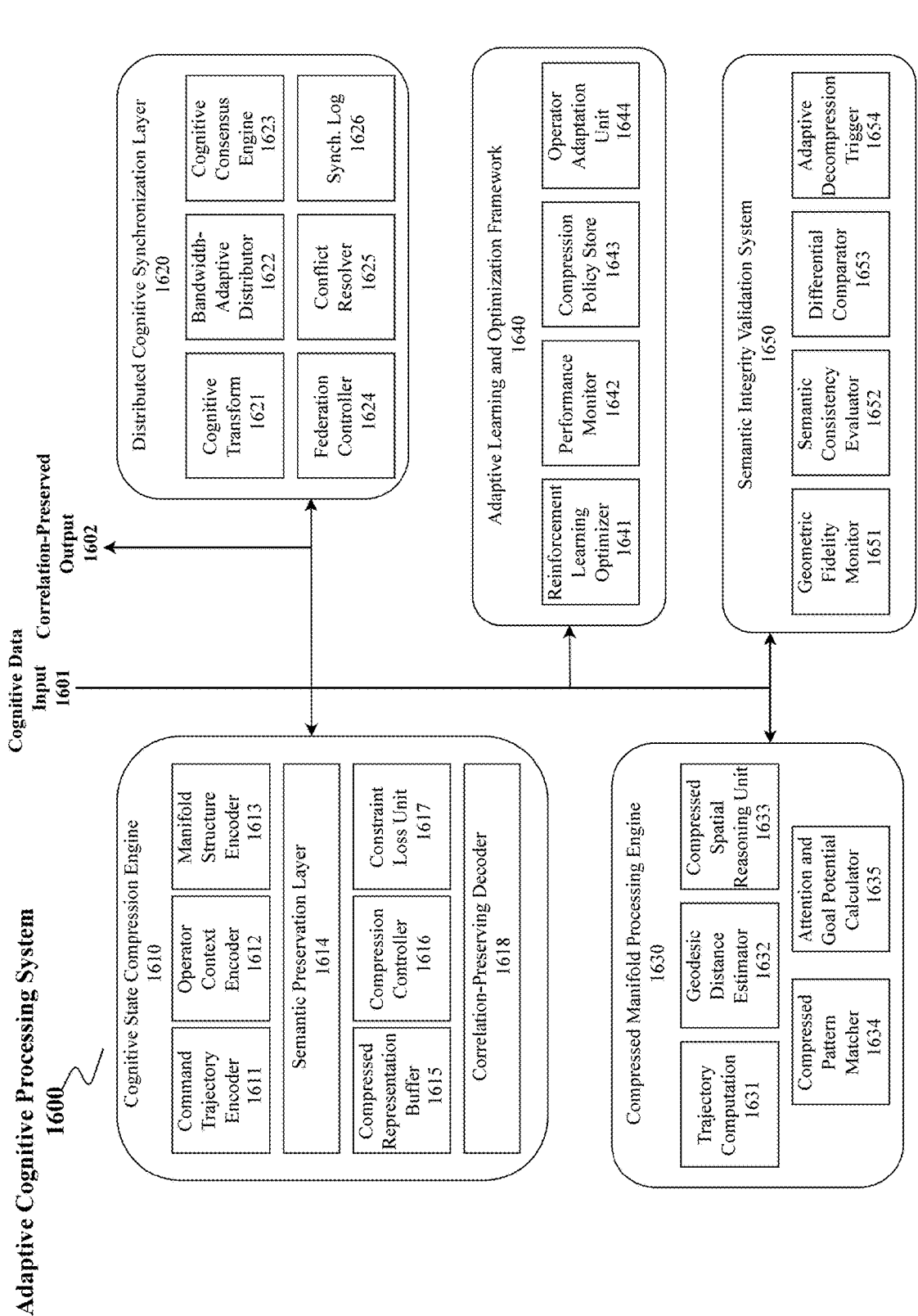
FIG. 16 is a block diagram illustrating an exemplary system architecture of an adaptive cognitive processing system with correlation-preserved data compression showing major subsystems.

FIG. 16 is a block diagram illustrating an exemplary system architecture of an adaptive cognitive processing system with correlation-preserved data compression showing major subsystems. In this embodiment, an adaptive cognitive processing system 1600 provides correlation-preserved latent representations that the platform can read and write through the same embedding/thought-store interfaces already used by the executive core. A semantic integrity validation system 1650 exposes fidelity and uncertainty signals to scheduling and decision logic so the platform can keep most operations in compressed form and selectively decode only when thresholds require it. This mode remains compatible with sleep/curation and persistence/restore, and it can federate compact summaries when the deployment is distributed-allowing the platform to trade bandwidth and compute for fidelity in a controlled, auditable way.

A system 1600 receives cognitive input data 1601 generated by a persistent cognitive machine and outputs correlation-preserved cognitive state 1602 for use by the persistent cognitive machine. System 1600 comprises, in the illustrated embodiment, a cognitive state compression engine 1610, a distributed cognitive synchronization layer 1620, a compressed manifold processing engine 1630, an adaptive learning and optimization framework 1640, and a semantic integrity validation system 1650, arranged to maintain geometric and semantic relationships during compression, sharing, and processing.

Cognitive input data 1601 is received into cognitive state compression engine 1610. Cognitive state compression engine 1610 includes a command trajectory encoder 1611 that encodes geometric paths associated with command sequences, an operator context encoder 1612 that encodes temporal interaction patterns and preference vectors, and a manifold structure encoder 1613 that encodes manifold parameters including metric and curvature information. Outputs of encoders 1611, 1612, and 1613 are processed by a semantic correlation preservation layer 1614 that applies constraint-based objectives to preserve geodesic distances, local neighborhood structure, and cross-modal relationships. A compressed representation buffer 115 holds correlation-preserved latent representations for downstream use, while a compression controller 1616 adjusts encoder configuration based on feedback. A constraint loss unit 117 evaluates geometric distortion against target tolerances during training or adaptation. A correlation-preserving decoder 1618 produces selectively decompressed artifacts when required for integrity measurement, export, or compatibility with external subsystems. Cognitive state compression engine 1610 forwards compressed cognitive representations from buffer 1615 to distributed cognitive synchronization layer 1620 and to compressed manifold processing engine 1630.

Distributed cognitive synchronization layer 1620 receives compressed cognitive representations and coordinates exchange between processing nodes. Distributed cognitive synchronization layer 1620 includes a privacy-preserving cognitive transform 1621 that applies differential geometric transformations to obscure operator-specific details while maintaining manifold relationships, a bandwidth-adaptive distributor 1622 that adjusts compression granularity to current transport conditions, and a cognitive consensus engine 1623 that validates and merges incoming compressed updates. A federation controller 1624 manages peer discovery and update scheduling, while a conflict resolver 1625 reconciles inconsistent manifold deltas. A synchronization log 1626 records applied updates for auditability and rollback. Distributed cognitive synchronization layer 1620 supplies accepted updates to compressed manifold processing engine 1630 and provides applied-update notifications to adaptive learning and optimization framework 1640.

Compressed manifold processing engine 1630 performs cognitive operations directly on compressed representations. Compressed manifold processing engine 1630 includes a trajectory computation unit 1631 that computes paths corresponding to command intent in compressed space, a geodesic distance estimator 1632 that evaluates similarity and proximity between compressed cognitive states, and a compressed spatial reasoning unit 1633 that advances cognitive dynamics without decompression. A compressed pattern matcher 1634 identifies prior patterns in compressed repositories to accelerate decision making, and an attention and goal potential calculator 1635 operates in compressed space to guide trajectory selection. Outputs of compressed manifold processing engine 1630 are supplied as compressed cognitive results to semantic integrity validation system 1650 and to adaptive learning and optimization framework 1640, and may be selectively decoded by decoder 1618 when native representations are requested.

Adaptive learning and optimization framework 1640 tunes compression and processing behavior using measured performance. Adaptive learning and optimization framework 1640 includes a reinforcement learning optimizer 1641 that selects compression policies to balance efficiency with cognitive accuracy, a performance monitor 1642 that ingests accuracy and latency metrics from semantic integrity validation system 1650 and compressed manifold processing engine 1630, a compression policy store 1643 that maintains task-specific and operator-specific profiles, and an operator adaptation unit 1644 that biases preservation of relationships most predictive for a given operator's workflow. Adaptive learning and optimization framework 1640 issues parameter updates to compression controller 1616, adjustment directives to bandwidth-adaptive distributor 1622, and weighting updates to attention and goal potential calculator 1635.

Semantic integrity validation system 1650 measures fidelity of compressed operations against geometric and semantic criteria. Semantic integrity validation system 1650 includes a geometric fidelity monitor 1651 that evaluates preservation of geodesic structure and local neighborhoods in compressed space, a semantic consistency evaluator 1652 that assesses command interpretation consistency and intent preservation across compression cycles, and a differential comparator 1653 that, when needed, compares compressed-space outcomes against selectively decompressed references produced by decoder 1618. An adaptive decompression trigger 1654 requests targeted decoding when compressed-space uncertainty exceeds configured thresholds. Semantic integrity validation system 1650 emits quality assessments to adaptive learning and optimization framework 1640 and may signal compression controller 1616 and cognitive consensus engine 1623 to adjust fidelity or merge thresholds.

During operation, cognitive input data 1601 enters cognitive state compression engine 1610, where encoders 1611, 1612, and 1613 produce correlation-preserved latent representations conditioned by semantic correlation preservation layer 1614 and recorded in compressed representation buffer 1615. Compressed representations flow concurrently to distributed cognitive synchronization layer 1620 for federation and to compressed manifold processing engine 1630 for cognitive computations that include trajectory computation by unit 1631, similarity evaluation by estimator 1632, spatial reasoning by unit 1633, pattern retrieval by matcher 1634, and guidance by calculator 1635. Semantic integrity validation system 1650 continuously evaluates geometric and semantic fidelity using monitors 1651 and 1652 and comparator 1653, issuing adaptive decompression requests through trigger 1654 when direct comparison against decoded references is warranted. Adaptive learning and optimization framework 1640 aggregates performance signals to update compression controller 1616, distributor 1622, and processing weights in compressed manifold processing engine 1630. System 1600 provides correlation-preserved cognitive state 1602 as compressed outputs suitable for PCM ingestion, and, when requested, provides selectively decoded artifacts from decoder 1618 to support execution, operator interaction, or archival workflows. In this arrangement, compressed representations remain usable for spatial reasoning and trajectory computation, while synchronization and validation maintain manifold integrity across distributed processing nodes.

Figure 17:
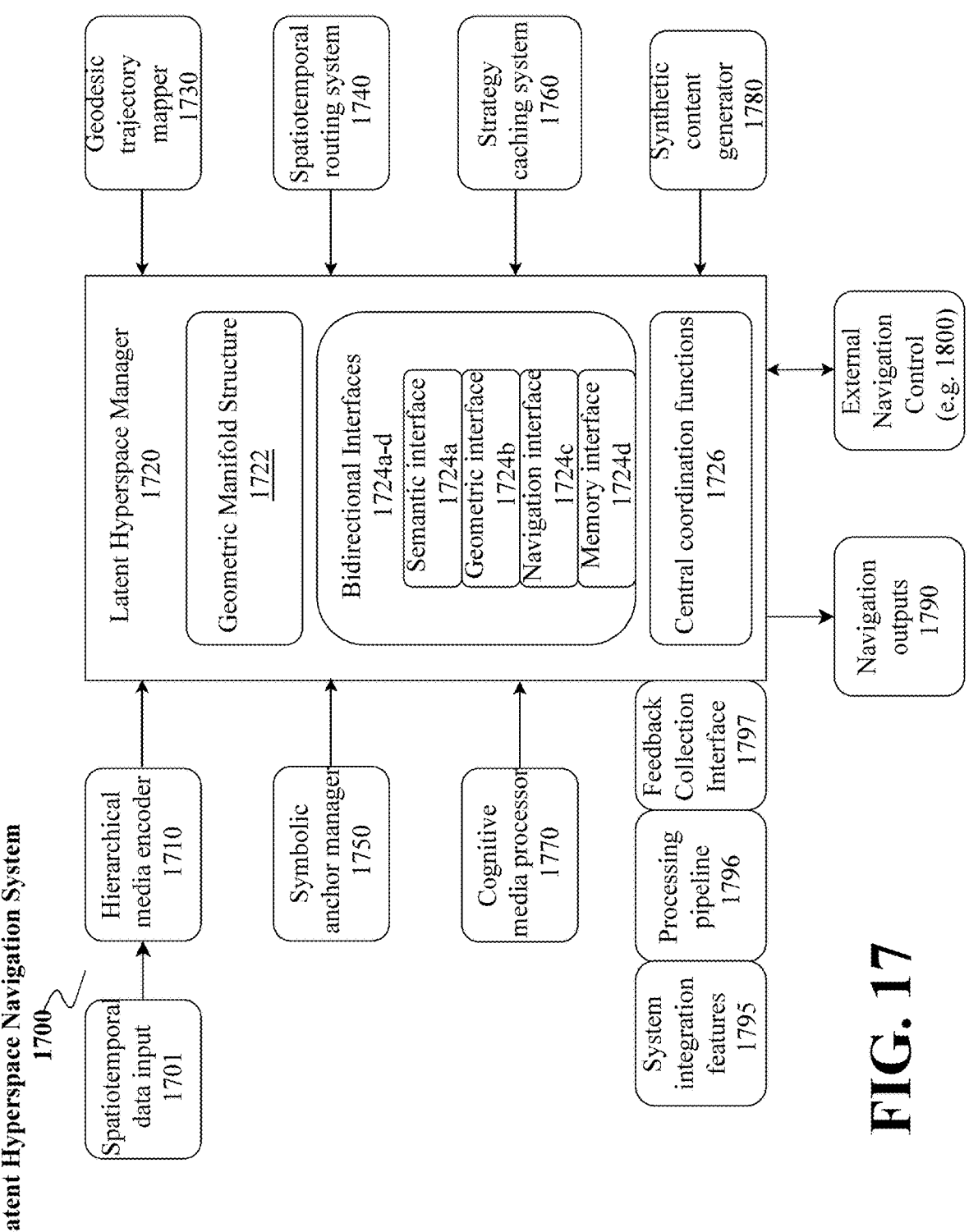
FIG. 17 is a block diagram illustrating an exemplary system architecture for latent hyperspace navigation in spatiotemporal media.

FIG. 17 is a block diagram illustrating an exemplary system architecture for latent hyperspace navigation in spatiotemporal media, an adaptive latent hyperspace control system with feedback-driven navigation in spatiotemporal media, representing a significant advancement from the base patent through the integration of closed-loop control mechanisms, real-time adaptation capabilities, and performance-based learning systems. This figure presents a latent-hyperspace navigation embodiment that integrates as a planning and routing layer for the existing platform. A latent hyperspace navigation system 1700 accepts goals, constraints, and context from the executive core and emits trajectories, waypoints, and navigation metadata that downstream tools and user interfaces can consume through the integration layer. The same APIs support operation over standard latent vectors or, when FIG. 16 is enabled, directly over compressed structures so retrieval, reuse, and curation in the thought store continue to work unchanged while navigation adds structured geodesic behavior the platform can reason over and persist.

This enhanced architecture transforms the static navigation framework into a dynamic, self-improving control system that continuously optimizes its performance through feedback-driven adaptation while maintaining the foundational capabilities of hierarchical and Lorentzian autoencoders with cognitive navigation within high-dimensional latent spaces. The system implements bidirectional data flows, adaptive parameter control, and real-time trajectory modification, creating a unified framework that not only treats video and temporal media as navigable cognitive terrain but actively learns from navigation experience to improve future performance.

The system receives spatiotemporal media input 1701 comprising forms of time-based media content including video streams, sequential images, temporal sensor data, and other data structures with inherent spatiotemporal organization. The input section 1701 incorporates feedback-aware preprocessing that adapts input handling based on historical navigation patterns and performance metrics, providing not only a standardized interface for subsequent processing but also performance-optimized data preparation that anticipates navigation requirements. This adaptive input capability enables the system to dynamically adjust preprocessing parameters based on learned patterns, optimizing initial data handling for frequently accessed content types and navigation scenarios.

A hierarchical media encoder 1710 implements adaptive compression and embedding functionality that dynamically adjusts encoding parameters based on performance feedback from an adaptive navigation control system 1800. The encoder 1710 may include feedback input ports receiving performance metrics that influence compression ratios, with an adaptive compression controller that allocates more encoding bits to frequently navigated regions identified through historical patterns. The enhanced encoder implements quality-aware encoding that modifies the composite loss function to $L_{total}=L_{rec}+\lambda 1 L_{geo}+\lambda 2 L_{curv}+\lambda 3 L_{temp}+\lambda 4 L_{feedback}$, where $L_{feedback}$ represents performance-based adjustments derived from navigation success metrics. The encoding process considers both the immediate compression objectives and the anticipated navigation requirements, creating representations optimized for both storage efficiency and navigation effectiveness. The hierarchical structure $H \supset H_{macro} \supset H_{meso} \supset H_{micro}$ includes adaptive level selection based on navigation frequency, with dynamic bit allocation that provides higher fidelity in semantically important regions identified through feedback analysis.

A latent hyperspace manager 1720 may serve as a dynamic coordination hub that not only maintains but actively modifies the geometric structure of compressed representations based on real-time performance feedback and learned navigation patterns. The hyperspace manager 1720 implements a dynamic geometry updater that modifies manifold structure based on feedback from system 1800, with an adaptive pressure field controller that adjusts compression pressure P(z) in real-time based on navigation performance metrics. The enhanced manager includes a performance-based topology modifier that can create new connections between frequently traversed regions, modify local curvature to optimize navigation efficiency, and adjust geometric relationships to improve future navigation success. The geometric manifold structure 1722 exhibits time-varying properties that evolve through interaction with a manifold reshaping engine 1860, implementing manifold updates according to $\partial g/\partial t = f(\text{performance, patterns})$ where the metric tensor evolves based on navigation outcomes.

Interfaces 124a-d support bidirectional feedback channels, enabling not only data access but also performance reporting and adaptive parameter exchange. The semantic interface 1724a incorporates feedback about semantic coherence during navigation, the geometric interface 1724b reports traversal efficiency metrics, the navigation interface 1724c provides real-time performance indicators, and the memory interface 1724d tracks retrieval success rates and pattern effectiveness. These enhanced interfaces connect to the Feedback Bus, Control Bus, Learning Bus, and Stability Bus, creating a comprehensive communication infrastructure that enables coordinated adaptation across all system components.

The enhanced geodesic trajectory mapper 1730 implements real-time trajectory adaptation through integration with a geodesic adaptation engine 1850, computing paths that dynamically adjust based on control signals from an adaptive control engine 1820. The mapper 1730 incorporates a real-time trajectory adapter and feedback-driven path optimizer that modify geodesic calculations to include feedback terms, implementing the enhanced equation $\gamma(t) = \gamma_0(t) + \Delta\gamma(\text{feedback, } t)$ where trajectories continuously evolve based on performance metrics. The enhanced mapper includes a performance prediction module that estimates navigation success before execution, enabling preemptive optimization, and a control signal input interface that receives real-time modification commands from System 1800.

A spatiotemporal routing system 1740 incorporates a performance history tracker that maintains detailed records of routing decision outcomes, with adaptive decision weights that adjust based on success patterns identified by a performance evaluator 1830. The routing system 1740 implements a feedback-informed route selector that considers not only current objectives but also historical performance data when making navigation decisions. The multi-scale temporal coordinator dynamically adjusts time horizons based on performance variance, expanding or contracting temporal windows to optimize navigation effectiveness. Decision arbitration uses learned preferences extracted from successful navigation patterns, continuously improving routing choices through experience accumulation.

A symbolic anchor manager 1750 implements dynamic anchor repositioning based on usage patterns and performance metrics, with anchors that can migrate through the latent space to positions of greater navigational utility. The manager 1750 includes an anchor performance monitor that tracks the effectiveness of each anchor in supporting successful navigation, a dynamic anchor repositioner that moves anchors based on usage statistics, and a relevance-based anchor updater that strengthens frequently used anchors while allowing unused anchors to decay. Anchor weights adjust dynamically based on navigation success rates, with the system learning which anchors provide the most value for different navigation scenarios.

A strategy caching system 1760 implements performance-indexed storage with reinforcement learning capabilities that continuously improve cached strategies based on execution results. The system 1760 includes a strategy refinement engine that updates stored patterns based on new performance data, a reinforcement learning updater that applies reward signals to strengthen successful strategies, and a confidence scoring system that quantifies the expected success probability for each cached strategy. Strategies carry comprehensive performance metadata including success rates, execution contexts, and effectiveness measures, enabling more intelligent strategy selection and adaptation.

A cognitive media processor 1770 incorporates an adaptive processing controller that adjusts computational resource allocation based on navigation requirements and performance objectives. The processor 1770 includes a quality-performance trade-off manager that dynamically balances processing quality against speed requirements based on real-time feedback, enabling the system to adapt its processing strategy to match current operational demands and performance goals.

A synthetic content generator 1780 implements feedback-driven synthesis with a generation quality monitor that tracks the effectiveness of synthesized content in supporting navigation objectives. The generator 1780 includes a feedback-driven synthesis controller that adjusts generation parameters based on user satisfaction metrics and navigation success rates, continuously improving the quality and appropriateness of generated content through learned preferences and performance patterns.

System integration features 1795 as illustrated in an embodiment implement four comprehensive communication buses that enable coordinated adaptation across all components. A feedback bus carries performance data from all components to system 1800 for analysis, a control bus distributes control signals from an adaptive control engine 1820 to all adaptive components, a learning bus shares learned parameters and updated models across the system, and a stability bus monitors system-wide stability metrics and enforces safety constraints to prevent harmful adaptations.

A processing pipeline 1796 implements an iterative, feedback-driven sequence of operations that continuously refines its performance through closed-loop control. The pipeline follows the pattern: Input→Process→Output→Measure→Feedback→Adapt→Process, creating a continuous improvement cycle that optimizes system performance over time. This enhanced pipeline ensures that each navigation experience contributes to improved future performance through systematic learning and adaptation.

Enhanced intelligent navigation outputs 1790 include comprehensive performance metrics and confidence scores alongside traditional navigation results. An output quality assessor 195 evaluates the success of navigation operations, a performance metrics generator 1796 produces detailed analytics about system behavior, and a feedback collection interface 1797 gathers user satisfaction data and operational metrics for system improvement. These enhanced outputs provide not only navigation results but also transparency about system confidence, performance characteristics, and adaptation recommendations.

The architecture shown in FIG. 17 thus provides a complete adaptive control framework for intelligent navigation within spatiotemporal media, transforming the static system of the base patent into a dynamic, learning-enabled platform that continuously improves through experience. The integration of feedback mechanisms, control systems, and adaptive components ensures that the system becomes more efficient and effective with use, while maintaining stability through careful monitoring and safety constraints. This approach enables applications that require not only intelligent navigation but also continuous performance improvement, adaptation to changing requirements, and robust operation in dynamic environments. An adaptive navigation control system may be integrated into the architecture, functioning as a supervisory layer that monitors system performance, generates control signals, modifies geodesic paths, and coordinates adaptive updates across all components.

Figure 18:
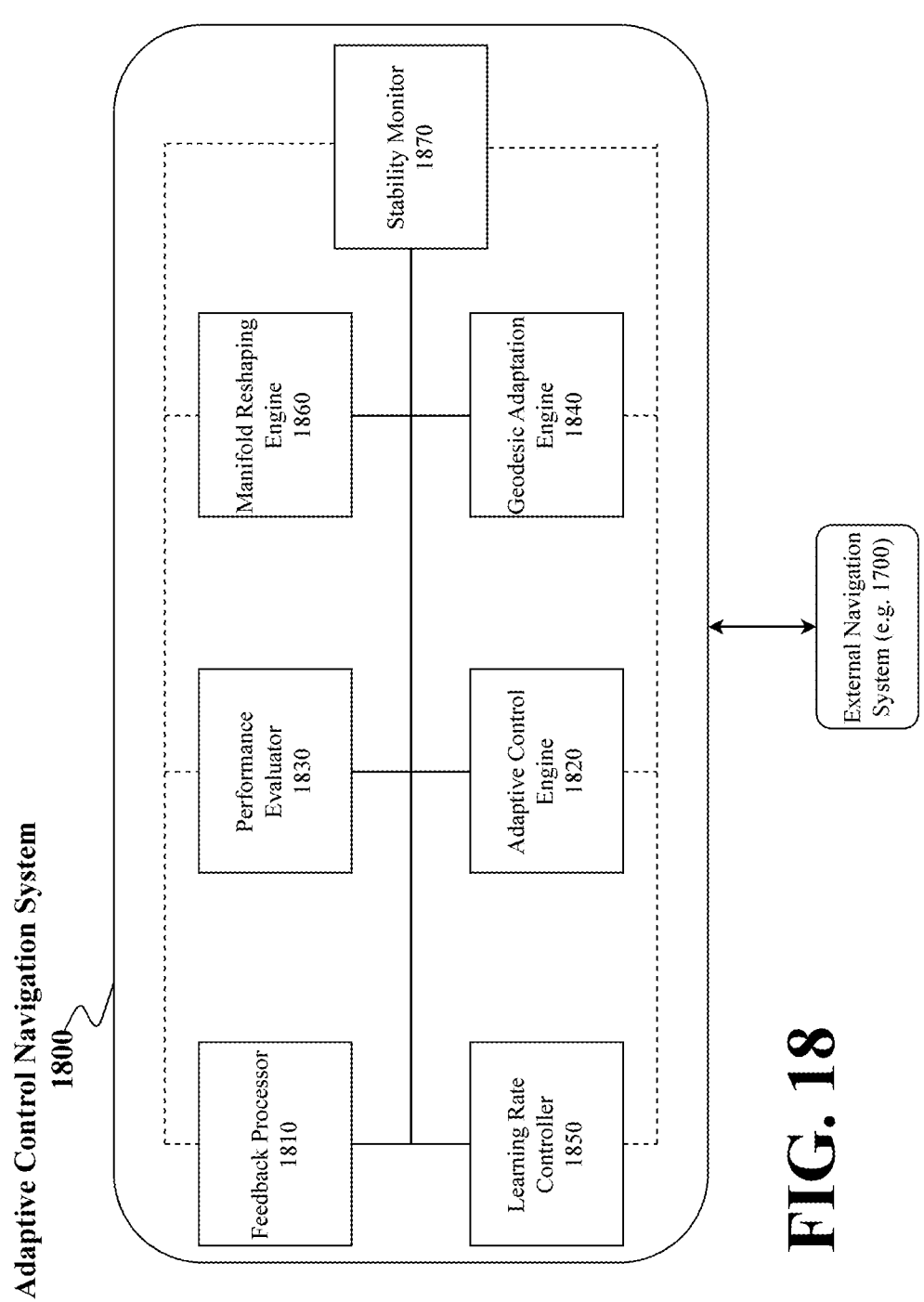
FIG. 18 is a block diagram of the adaptive navigation control system, showing its primary components, their interactions, and interfaces with the navigation host for monitoring, control, learning, and stability management.

FIG. 18 is a block diagram of the adaptive navigation control system, showing its primary components, their interactions, and interfaces with the navigation host for monitoring, control, learning, and stability management. This embodiment overlays an adaptive control supervisor that closes the loop between platform decisions and observed outcomes. An adaptive control navigation system 1800 ingests feedback and performance signals from running tasks, proposes adjustments to active trajectories or policy parameters, and schedules those adjustments across real-time, near-time, and batch lanes to preserve responsiveness without destabilizing longer-horizon learning. A stability monitor 1870 gates changes according to safety criteria, and when components from FIG. 16 and FIG. 17 are present, the supervisor can steer the navigation layer while honoring fidelity signals from the compressed-space mode. In this way, the supervisor augments the platform with measured, stability-bounded adaptation using the same control and persistence pathways already defined.

System 1800 operates as a supervisory control layer that monitors, evaluates, and adaptively modifies navigation operations within compressed spatiotemporal media through coordinated feedback mechanisms and real-time control signals. The system boundary indicated by the dashed rectangle encompasses seven primary components that work in concert to transform static navigation into dynamic, self-improving processes. The modular components shown in FIG. 18 are presented for clarity of explanation and do not represent required physical or logical separations. In various embodiments, the functions of two or more components may be combined into a single module, or the functions of a single component may be divided among multiple modules. Components may be implemented in hardware, software, or any suitable combination thereof, and may communicate directly or indirectly through one or more intermediary systems.

Feedback processor 1810 serves as the primary interface for receiving performance data from system 1700, positioned to collect and process navigation metrics in real time during execution. Feedback processor 1810 implements filtering algorithms to remove noise and outliers from raw performance measurements, ensuring that control decisions are based on reliable data. Processing operations within feedback processor 1810 categorize incoming metrics into distinct performance dimensions including traversal speed, semantic coherence, reconstruction quality, and user satisfaction indicators. These categorized metrics undergo weighting operations based on current system objectives and priorities, with different weights applied depending on whether the system prioritizes speed, quality, or efficiency. Output from feedback processor 1810 comprises structured feedback vectors that flow to adaptive control engine 1820, providing normalized and weighted performance indicators suitable for control algorithm processing.

Adaptive control engine 1820 occupies a central position within system 1800, receiving inputs from both feedback processor 1810 and performance evaluator 1830 to generate comprehensive control decisions. Control engine 1820 implements one or more control algorithms that may include proportional-integral-derivative control for continuous adjustment, model predictive control for anticipatory optimization, or reinforcement learning for policy improvement based on accumulated experience. Control decisions generated by adaptive control engine 1820 balance multiple objectives simultaneously, optimizing for navigation accuracy, processing efficiency, semantic alignment, and user satisfaction based on weighted priorities. Control signals flow from adaptive control engine 1820 to multiple destinations, including geodesic adaptation engine 1840 for trajectory modification and external interfaces that communicate with system 1700 components. Control policies within adaptive control engine 1820 evolve over time through learning mechanisms, incorporating successful navigation patterns and avoiding previously identified failure modes.

Performance evaluator 1830 analyzes navigation execution outcomes to quantify success across multiple evaluation criteria. Evaluation processes within performance evaluator 1830 compute real-time performance scores that compare actual navigation results against expected outcomes, identifying deviations that may require corrective action. Performance metrics generated by performance evaluator 1830 include efficiency measures such as computational resource utilization, accuracy assessments including semantic drift and reconstruction fidelity, and user-centric metrics such as interaction success rates. Performance evaluator 1830 maintains historical performance records that enable trend analysis and pattern recognition, identifying systematic improvements or degradations over time. Performance scores flow from performance evaluator 1830 to adaptive control engine 1820, providing quantitative feedback for control decisions, while navigation patterns flow to manifold reshaping engine 1860 for geometric optimization.

Geodesic adaptation engine 1840 receives control signals from adaptive control engine 220 and implements real-time trajectory modifications during active navigation. Adaptation processes within geodesic adaptation engine 1840 recalculate navigation paths using modified geodesic equations that incorporate feedback-driven correction terms, producing smooth trajectory adjustments that maintain continuity while improving performance. Trajectory modifications generated by geodesic adaptation engine 1840 respond to detected inefficiencies, emerging obstacles, or changing objectives identified through performance monitoring. Modified trajectories maintain geometric consistency within latent space while optimizing for current conditions, ensuring that path adjustments do not violate manifold constraints or create discontinuities. Output from geodesic adaptation engine 1840 flows to system 1700 navigation components, enabling immediate implementation of optimized paths during ongoing navigation operations.

Learning rate controller 1850 manages adaptation speeds throughout system 1800, ensuring stable convergence while enabling efficient learning. Controller 1850 monitors system stability indicators including oscillation detection, divergence warnings, and performance variance measurements to determine appropriate learning rates for different components. Adaptive gain scheduling within learning rate controller 1850 increases learning rates when system behavior is stable and predictable, while reducing rates during periods of uncertainty or instability. Learning parameters distributed by learning rate controller 1850 flow to all adaptive components through dashed connections, coordinating system-wide learning to prevent conflicting adaptations. Stability metrics from stability monitor 1870 inform learning rate decisions, creating a feedback loop that maintains safe adaptation boundaries.

Manifold reshaping engine 1860 performs geometric modifications to latent space structure based on accumulated navigation patterns and performance data. Reshaping operations within manifold reshaping engine 1860 analyze frequently traversed regions identified by performance evaluator 1830, calculating optimal curvature adjustments that reduce navigation distances and improve efficiency. Geometric modifications generated by manifold reshaping engine 1860 may include local curvature changes that create shortcuts between related regions, new connections that link frequently co-accessed areas, or metric tensor updates that optimize distance relationships. Proposed modifications undergo stability verification before implementation, ensuring that geometric changes preserve manifold properties and maintain navigation consistency. Geometric updates flow from manifold reshaping engine 1860 to system 1700 latent space management components, implementing permanent structural improvements that benefit future navigation sessions.

Stability monitor 1870 provides system-wide oversight to ensure safe and bounded adaptation across all components. Monitoring operations within stability monitor 1870 track state variables from all system components, evaluating stability criteria using Lyapunov functions or other mathematical frameworks that guarantee convergence. Detection algorithms within stability monitor 1870 identify oscillations, divergent behavior, or runaway adaptations that could compromise system performance or cause unpredictable outcomes. When instability is detected, stability monitor 1870 generates intervention signals that flow to learning rate controller 1850, triggering immediate reduction in adaptation rates or reversion to previously stable configurations. Continuous stability assessment ensures that performance improvements through adaptation never compromise system reliability or predictability.

External interfaces connect system 1800 with system 1700 components, enabling bidirectional communication and control. Performance data from system 1700 enters through thick arrow connection to feedback processor 1810, providing a continuous stream of navigation metrics for analysis. Control signals exit adaptive control engine 1820 through thick arrow connection to system 1700, carrying real-time commands for trajectory modification, parameter adjustment, and strategy selection. Geometric updates from manifold reshaping engine 260 flow to system 1700 latent space components through dedicated interface, implementing structural modifications that persist across navigation sessions. Additional output connections from geodesic adaptation engine 1840 deliver modified trajectories to system 1700 navigation components, enabling immediate path corrections during active navigation.

Data flow annotations throughout the diagram indicate specific information types exchanged between components. Feedback vectors flowing from feedback processor 1810 to adaptive control engine 1820 carry structured performance indicators weighted according to current objectives. Performance scores moving from performance evaluator 1830 to adaptive control engine 1820 provide quantitative success metrics for control algorithm processing. Control commands transmitted from adaptive control engine 1820 to geodesic adaptation engine 1840 specify trajectory modifications required for performance optimization. Stability metrics flowing from stability monitor 1870 to learning rate controller 1850 inform adaptation rate decisions to maintain system stability.

Legend indicates three distinct connection types that organize system communications. Primary data flow connections carry operational data including performance metrics, control signals, and navigation commands that directly affect system behavior. Learning parameter connections distribute adaptation rates and learning configurations that coordinate system-wide optimization. External interface connections facilitate bidirectional communication with system 1700, enabling system 1800 to monitor and control navigation operations.

While FIG. 18 illustrates system 1800 operating as a supervisory control layer for system 1700 in the context of adaptive navigation in compressed spatiotemporal media, the architecture of system 1800 is not limited to this configuration. In other embodiments, system 1800 may be applied to other navigation frameworks, processing systems, or control environments that benefit from real-time performance monitoring, feedback-driven adaptation, and coordinated learning. The illustrated integration with system 1700 is one example, and other host systems with different internal architectures, data structures, or application domains may be substituted without departing from the scope of the present disclosure. This architecture enables system 1800 to function as an intelligent control layer that continuously improves navigation performance through coordinated adaptation, real-time optimization, and learned experience accumulation.

Figure 19:
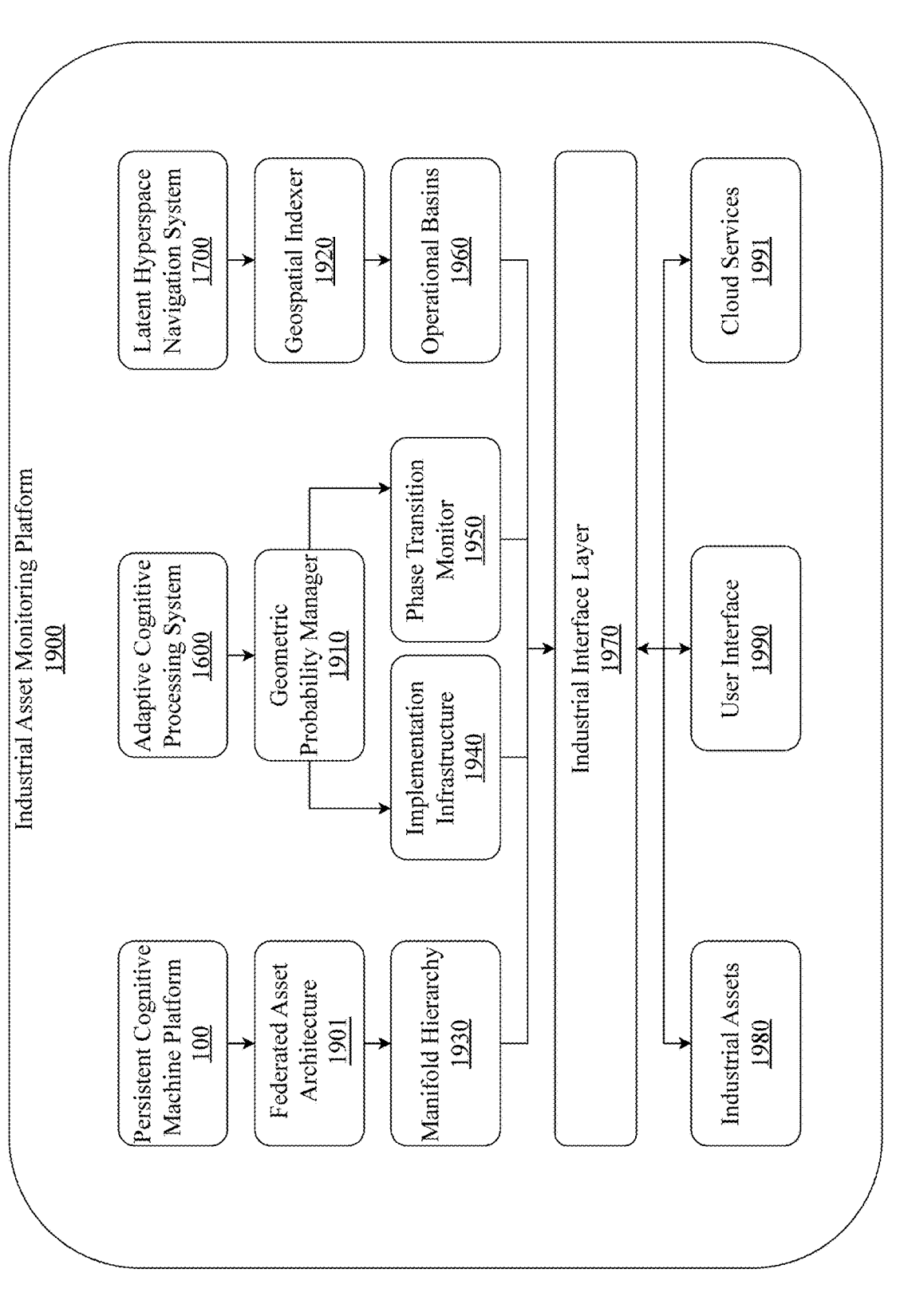
FIG. 19 is a block diagram illustrating an exemplary architecture of an industrial asset monitoring platform that integrates cognitive systems to create a unified framework for monitoring and controlling distributed industrial infrastructure.

FIG. 19 is a block diagram illustrating an exemplary architecture of an industrial asset monitoring platform that integrates cognitive systems to create a unified framework for monitoring and controlling distributed industrial infrastructure. An industrial asset monitoring platform 1900 represents a fundamental advancement by combining persistent cognitive capabilities with geometric probability estimation and geospatial reasoning to enable real-time, adaptive monitoring of complex industrial systems.

Persistent cognitive machine platform 100 provides the foundational cognitive architecture, including thought cache mechanisms, executive core functions, and sleep-state consolidation processes that enable the system to maintain continuity of cognition across operational sessions. This component maintains persistent awareness of industrial operations even when not actively processing sensor data, accumulating experiences over time that inform future decision-making. Adaptive cognitive processing system 1600 handles the compression and distribution of cognitive states across the federated network, employing manifold processing techniques to represent high-dimensional sensor data in compressed latent spaces while preserving semantic relationships and operational correlations. Latent hyperspace navigation system 1700 manages the geometric structure of the cognitive manifolds, implementing geodesic trajectory mapping and strategy caching that enables the system to navigate through possible operational states along optimal paths while avoiding failure conditions.

These systems feed into specialized extensions that adapt the cognitive capabilities for monitoring contexts. A federated asset architecture 1901 organizes multiple asset-level PCM instances into a coherent fabric, where each industrial asset such as a pump, compressor, or pipeline segment maintains its own local cognitive instance while participating in a larger federated consciousness. This federation is achieved through fiber couplings that transmit structural influence between assets without requiring raw data exchange, enabling privacy-preserving coordination where a pressure anomaly detected at one compressor station can influence the cognitive state of downstream separators without transmitting proprietary operational data. A geometric probability manager 1910 continuously evaluates the likelihood of reaching desired operational states versus falling into failure conditions by computing policy-aligned geodesic distances through the manifold, assessing structural feasibility through curvature analysis, and fusing these geometric priors with stochastic rollout simulations and historical outcome data in a Bayesian framework that produces calibrated probability distributions with explicit uncertainty bounds.

A geospatial indexer 1920 anchors abstract manifold coordinates to physical locations and network topology, ensuring that cognitive processes remain grounded in the spatial reality. For example, when monitoring an oil pipeline network, geospatial indexer 1920 ensures that manifold deformations representing pressure waves properly account for the physical distance between sensor points, the topology of junction points, and the geographic constraints that affect signal propagation times. This spatial grounding enables the system to distinguish between legitimate operational cascades that follow physical laws and spurious correlations that might arise from sensor noise or communication artifacts.

Supporting infrastructure components enable practical implementation of the cognitive monitoring system. A manifold hierarchy 1930 implements a three-tier temporal structure where fast manifolds capture real-time sensor streams with millisecond resolution, mesoscale manifolds encode tactical annotations and operator communications on minute-to-hour timescales, and slow manifolds consolidate operational schemas and maintenance patterns that evolve over days or months. This hierarchical organization ensures that high-frequency noise does not overwhelm strategic pattern recognition while still maintaining the ability to detect and respond to rapid anomalies. An implementation infrastructure 1940 provides the computational substrate including GPU-accelerated rollout engines for parallel simulation, landmark graph structures for efficient manifold navigation, and self-play archives that accumulate evidence from both actual operations and simulated scenarios to continuously improve probability estimates.

A phase transition monitor 1950 tracks critical density thresholds that indicate when local perturbations might cascade into system-wide instabilities. By monitoring the action density on each manifold and detecting when it approaches critical values, the system can identify phase transitions from stable to chaotic regimes before they fully manifest, enabling preemptive intervention. For instance, in an electrical grid application, the phase transition monitor 1950 might detect that increasing load fluctuations are approaching a critical threshold beyond which cascading blackouts become probable, triggering load shedding or reserve activation before the crisis materializes. An operational basins 1960 component maintains explicit representations of success and failure states as attractor regions in the manifold, where success basins might represent stable flow regimes with acceptable pressure and temperature ranges, while failure basins correspond to conditions such as cavitation, surge, or equipment damage that must be avoided.

An industrial interface layer 1970 provides bidirectional connectivity between the cognitive monitoring platform and the physical industrial environment. This layer handles the ingestion of sensor data from systems, the transmission of control signals to actuators and control systems, and the presentation of cognitive assessments to human operators through specialized interfaces that visualize probability distributions, highlight emerging risks, and suggest corrective actions. The interface layer implements appropriate protocols for industrial communication standards while maintaining the real-time performance requirements necessary for process control applications.

External connections enable the platform to interact with the broader industrial ecosystem. Industrial assets 1980 represent the physical equipment being monitored, including pumps, compressors, heat exchangers, separators, pipelines, and other infrastructure components that generate telemetry and respond to control inputs. A user interface 1990 provides human operators with intuitive access to the system's cognitive assessments, presenting complex probability distributions and manifold states through visualizations that support rapid decision-making under operational stress. Cloud services 1991 extend the platform's capabilities through additional computational resources for intensive simulations, long-term data storage for historical analysis, and connectivity to enterprise systems for integration with broader business processes.

In operation, industrial asset monitoring platform 1900 maintains continuous cognitive awareness of the industrial system's state, trajectory, and probable futures. Sensor data flows upward through the industrial interface layer 1970 into the cognitive systems, where it is embedded into manifold representations, analyzed for anomalies and trends, and used to update probability estimates for various operational outcomes. These assessments flow back down through the interface layer as control recommendations, alerts, and visualizations that enable both automated responses and informed human decision-making. The platform's persistent cognitive nature means that it continuously learns from operational experience, developing increasingly sophisticated understanding of the industrial system's dynamics, failure modes, and optimal operating strategies over time.

In some embodiments, latent coordinates are geospatially anchored to physical topology for the assets under observation. The system maintains a mapping between regions of the geometric latent structure and corresponding physical locations, equipment identifiers, and connectivity, enabling route planning and risk assessment that respect plant layout, line topology, or field geography. Assets are coupled by fibers that encode directed influence, latency expectations, and reliability, allowing planned trajectories and alerts to propagate along physically meaningful paths rather than purely abstract graph links. The fiber layer supports dynamic reweighting based on observed cascades, maintenance outages, and seasonal factors without altering the semantics of the underlying navigation or memory operations.

In some embodiments, a probability engine estimates outcome likelihoods for candidate trajectories by combining geometric and historical evidence. A policy-aligned distance term augmented by curvature and compression-fidelity penalties, produces a logistic prior over success. The system then performs batched latent rollouts on a GPU to evaluate near-term evolution under operational constraints, and fuses rollout evidence with a historical kernel estimator. A Bayesian update (e.g., Beta-Bernoulli) yields posterior success probabilities and credible intervals that inform selection, ranking, or deferral of trajectories while preserving auditability through stored sufficient statistics.

In some embodiments, adversarial counterflows are modeled as vector fields over the latent structure that bias or impede nominal trajectories. The system samples counterflow-perturbed rollouts with importance weights to estimate worst-plausible outcomes and adjusts priors and credible intervals accordingly. When fibers are present, adversarial fields propagate to downstream assets with decay and delay consistent with fiber parameters, allowing receivers to widen safety margins, stage resources, or preemptively reroute until the counterflow dissipates.

In some embodiments, the continuous latent structure is discretized into a landmark graph whose vertices index stable regions and whose edges carry annotations including length, curvature, feasible-set width, and compression-fidelity bounds. A GPU rollout engine accelerates path scoring and sensitivity analysis by simulating transitions along annotated edges with bounded horizon. The system enforces an end-to-end decision latency budget suitable for real-time control (e.g., on the order of tens of milliseconds), allocating compute across sensing, validation, rollout, and selection to meet the budget while maintaining semantic-integrity thresholds.

In some embodiments, successful trajectories and policies are retained in a strategy archive with versioning, applicability conditions, and confidence audits. During consolidation periods, the archive is pruned, clustered, and reindexed so frequently effective strategies are surfaced quickly while obsolete or brittle ones are demoted. The archive supports self-play style exploration in simulation, seeding new candidate strategies that can be promoted to operational use once validated by posterior improvements and stability criteria.

Figure 20:
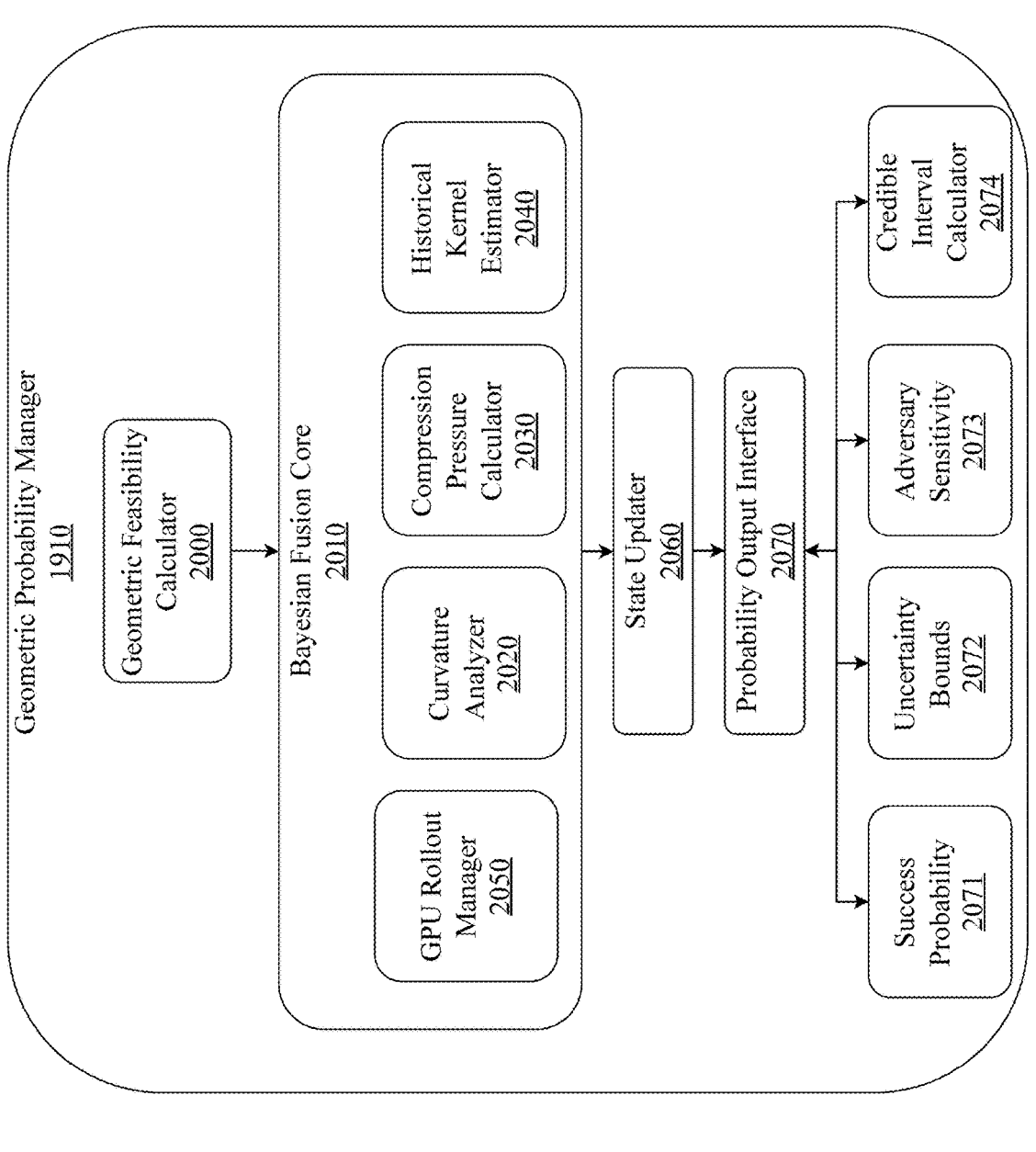
FIG. 20 is a block diagram illustrating an exemplary internal architecture of a geometric probability manager.

FIG. 20 is a block diagram illustrating an exemplary internal architecture of a geometric probability manager. Geometric probability manager 1910 transforms raw manifold states and operational constraints into calibrated probability distributions that quantify the likelihood of reaching desired operational outcomes versus falling into failure conditions.

A geometric feasibility calculator 2000 serves as the primary assessment engine that evaluates whether a proposed control policy or operational trajectory is structurally feasible within the current manifold geometry. This component computes policy-aligned geodesic distances from the current state to target operational basins, where shorter distances through regions of low curvature indicate higher feasibility. For example, when evaluating whether a compressor station can safely increase throughput to meet downstream demand, geometric feasibility calculator 2000 traces potential paths through the operational manifold, penalizing routes that pass through high-stress regions where the manifold geometry indicates structural instability or proximity to surge conditions.

Bayesian fusion core 2010 orchestrates the integration of multiple evidence sources to produce unified probability estimates. This component implements a Beta-Bernoulli conjugate framework that begins with geometric priors derived from manifold structure and systematically updates these priors with empirical evidence from simulations and historical outcomes. The fusion process maintains explicit representations of epistemic uncertainty, distinguishing between aleatory uncertainty arising from inherent system stochasticity and epistemic uncertainty reflecting limitations in the system's knowledge or modeling capabilities.

Within the bayesian fusion core 2010, a GPU rollout manager 2050 executes hundreds of parallel stochastic simulations on graphics processing hardware, where each simulation thread propagates the current state forward through short time horizons using learned transition dynamics. These rollouts incorporate both nominal dynamics and adversarial perturbations, with each trajectory terminating upon reaching either a success basin representing stable operation or a failure basin indicating equipment damage or system instability. The parallelized architecture enables real-time probability updates even for complex industrial systems, with modern GPU hardware supporting throughput of thousands of rollout simulations per second.

A curvature analyzer 2020 evaluates the local geometric properties of the manifold to assess dynamic stability and controllability. By computing the Riemann curvature tensor and associated geometric invariants, this component identifies regions where the manifold exhibits high curvature indicating rapid changes in system behavior or proximity to bifurcation points. High curvature penalties are applied to trajectories that traverse these unstable regions, reflecting the increased risk of unexpected transitions or loss of control. For instance, in monitoring a chemical reactor, regions of high curvature might correspond to conditions near thermal runaway where small perturbations could trigger catastrophic temperature excursions.

A compression pressure calculator 2030 quantifies the information-theoretic cost of the current operational state by measuring the divergence of trajectory flows through the manifold. When multiple historical trajectories converge through a narrow region of state space, the resulting compression pressure indicates over-constrained operation where the system lacks flexibility to respond to disturbances. This metric proves particularly valuable in detecting operational bottlenecks before they manifest as failures, such as identifying when a pipeline network is operating at capacity limits that leave no margin for demand fluctuations or equipment outages.

A historical kernel estimator 2040 leverages accumulated operational experience to inform probability estimates through kernel-weighted empirical frequencies. This component maintains an indexed archive of previous operational scenarios, their initial conditions, applied control policies, and observed outcomes. When evaluating a new situation, the estimator retrieves similar historical cases based on geodesic distance in the manifold and policy similarity metrics, then applies kernel weighting functions such as heat kernels or radial basis functions to aggregate evidence from past experiences. The kernel bandwidth adapts based on local data density, providing tighter estimates in well-explored operational regimes while maintaining appropriate uncertainty in novel situations.

A state updater 2060 maintains the posterior probability distribution by processing evidence streams from the various assessment components and applying Bayesian update rules. This component implements efficient incremental updating algorithms that avoid recomputing entire distributions when new evidence arrives, enabling continuous probability refinement as operational conditions evolve. The updater also manages the balance between prior beliefs and empirical evidence through adaptive weighting schemes that increase reliance on observed data as evidence accumulates while maintaining influence from geometric priors in data-sparse regions.

A probability output interface 2070 transforms the internal probability representations into actionable assessments for operators and control systems. Rather than providing single point estimates that might mask uncertainty, this interface produces comprehensive characterizations of operational risk through multiple complementary metrics. A success probability 2071 provides the posterior mean estimate of reaching desired operational states under the current control policy, typically displayed as a percentage with appropriate significant figures based on the underlying uncertainty. Uncertainty bounds 2072 quantify the epistemic uncertainty in the probability estimate through credible intervals derived from the Beta posterior distribution, alerting operators when assessments are based on limited evidence and additional caution is warranted.

An adversary sensitivity 2073 metric quantifies the system's vulnerability to worst-case perturbations by comparing probability estimates under nominal versus adversarial conditions. This component runs paired simulations where standard rollouts are contrasted with trajectories biased toward failure modes, producing a differential metric that indicates how robust the current operational strategy is against hostile disturbances. For example, in a power grid application, high adversary sensitivity might indicate vulnerability to cascading failures triggered by malicious load manipulation or coordinated attacks on critical substations. A credible interval calculator 2074 provides full distributional characterizations through percentile estimates, enabling operators to understand not just the expected outcome but the range of plausible scenarios and their relative likelihoods.

In operation, geometric probability manager 1910 continuously processes streaming manifold states and control policies to maintain real-time probability assessments. Geometric feasibility calculator 2000 provides rapid initial estimates based on manifold structure, while bayesian fusion core 2010 refines these estimates through parallel simulations, curvature analysis, compression assessment, and historical evidence aggregation. State updater 2060 maintains temporal consistency by carrying forward posterior distributions between assessment cycles, ensuring that probability estimates evolve smoothly rather than exhibiting discontinuous jumps that might trigger inappropriate control responses. Probability output interface 2070 presents these assessments through intuitive visualizations and standardized metrics that support both automated control decisions and human supervisory oversight, enabling proactive risk management in complex industrial systems.

Figure 21:
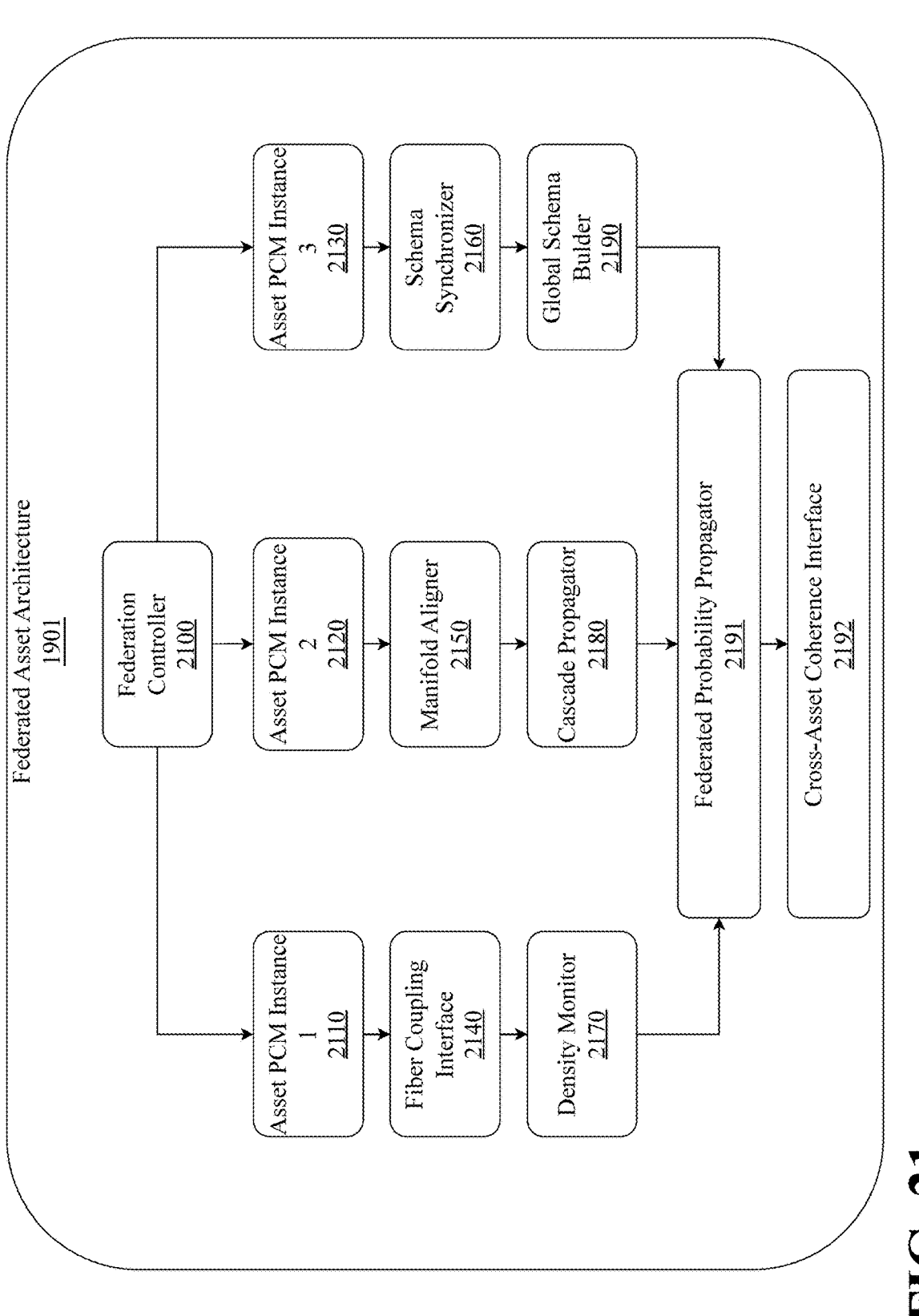
FIG. 21 is a block diagram illustrating an exemplary internal architecture of a federated asset architecture.

FIG. 21 is a block diagram illustrating an exemplary internal architecture of a federated asset architecture. The federated asset architecture 1901 implements the hierarchical PCM fabric concept with logarithmic memory scaling, allowing the system to monitor thousands of assets without exponential growth in computational or storage requirements.

A federation controller 2100 serves as the central orchestrator for the distributed cognitive fabric, managing the lifecycle of individual asset PCM instances and coordinating their interactions to maintain global situational awareness. This component implements the logarithmic scaling law M(n)~log n, where the marginal novelty of each new event decreases as 1/n, ensuring that memory requirements grow only logarithmically with operational history rather than linearly. The federation controller 2100 determines when to spawn new asset PCM instances as equipment comes online, manages their resource allocation based on criticality and operational tempo, and coordinates sleep cycles to ensure continuous coverage while individual instances undergo memory consolidation.

Three representative asset PCM instances are shown, though the architecture supports arbitrary scaling to thousands of assets. An asset PCM instance 1 2110 may maintain a complete persistent cognitive machine dedicated to a specific industrial asset such as a compressor station, implementing its own fast, mesoscale, and slow manifolds that capture temporal dynamics from millisecond sensor fluctuations to monthly maintenance patterns. Each instance maintains local autonomy, making real-time control decisions based on its embedded understanding while participating in the larger federated consciousness. An asset PCM instance 2 2120 may operate similarly for its assigned equipment, perhaps monitoring a separator vessel where it tracks liquid levels, pressure differentials, and flow rates while building understanding of how upstream and downstream conditions affect separation efficiency. An asset PCM instance 3 2130 might oversee a pipeline segment, learning the characteristic pressure wave propagation patterns, detecting early signs of leak formation, and coordinating with connected assets to maintain flow stability.

A fiber coupling interface 2140 implements the mathematical framework for transmitting structural influence between asset manifolds without requiring raw data exchange. Each fiber map creates a pullback metric that allows high-density anomalies in one asset to manifest as curvature increases or trajectory biases in connected assets. For example, when a pump station detects cavitation onset, fiber coupling interface 2140 propagates this as increased curvature in the manifolds of downstream assets, biasing their trajectories away from operating points that would exacerbate the cavitation. This mechanism enables privacy-preserving federation where proprietary operational data remains local while structural insights propagate globally.

A manifold aligner 2150 ensures geometric consistency across the federation by identifying and reconciling corresponding structures in different asset manifolds. When multiple assets observe similar operational patterns, manifold aligner 2150 establishes correspondence mappings that allow experiences from one asset to inform predictions at another. This alignment process employs techniques from optimal transport theory to find mappings that minimize the Wasserstein distance between manifold distributions while preserving topological structure. Through this mechanism, a lesson learned at one compressor about surge recovery strategies can immediately benefit all similar compressors in the network without requiring explicit rule extraction or knowledge transfer protocols.

A schema synchronizer 2160 manages the consolidation of local operational patterns into global schemas that represent network-wide behaviors. As individual assets develop local schemas through their slow manifolds such as a pump learning its optimal efficiency curve or a heat exchanger recognizing fouling patterns, schema synchronizer 2160 identifies commonalities and constructs higher-order schemas that capture system-level dynamics. These global schemas, enable the federation to recognize complex multi-asset failure modes that no single asset could detect in isolation.

A density monitor 2170 tracks action density across all federated manifolds to detect approaching phase transitions that signal critical operational changes. Each manifold undergoes characteristic phase transitions as action density increases: noise-to-flow transitions on fast manifolds when sensor patterns become coherent, static-to-coherent-to-generative transitions on mesoscale manifolds as tactical patterns emerge, and episodic-to-doctrinal transitions on slow manifolds as operational strategies crystallize. Density monitor 2170 maintains vigilance for critical density thresholds ρcrit where local perturbations become likely to cascade across the federation, enabling preemptive intervention before instabilities propagate.

A cascade propagator 2180 models how disturbances spread through the federated network by simulating the fiber-mediated coupling between asset manifolds. When an anomaly crosses the critical density threshold at one asset, cascade propagator 2180 traces its likely propagation path through the federation, accounting for coupling strengths, propagation delays, and damping factors. This component implements both forward propagation to predict cascade evolution and inverse propagation to identify root causes of distributed anomalies. For instance, in a pipeline network, cascade propagator 2180 can trace a pressure surge back through multiple compressor stations to identify the initial valve closure that triggered the disturbance.

A global schema builder 2190 constructs unified representations of the entire industrial system by integrating schemas from all federated assets into coherent operational doctrines. Unlike simple aggregation, this building process identifies emergent properties that arise from asset interactions, such as resonance frequencies in pipeline networks or load balancing dynamics in electrical grids. The global schemas encode not just steady-state operations but also transition dynamics, failure cascades, and recovery procedures that span multiple assets. These schemas persist in slow manifolds across the federation, providing institutional memory that survives individual asset restarts or replacements.

A federated probability propagator 2191 ensures that probability assessments account for cross-asset dependencies and cascade risks. When the geometric probability manager at one asset computes success probabilities for local operations, federated probability propagator 2191 adjusts these estimates based on conditions at connected assets, propagating uncertainty and risk assessments through the fiber couplings. This creates a global probability field over the federated manifold where local assessments are continuously refined based on network-wide conditions. For example, the probability of successful startup at a downstream compressor is automatically adjusted based on flow stability at upstream separators, pressure trends in connecting pipelines, and historical cascade patterns.

A cross-asset coherence interface 2192 provides unified access to the federated cognitive state, presenting operators with network-wide situational awareness rather than isolated asset views. This interface synthesizes information from all federated PCMs to identify emerging patterns, highlight systemic risks, and recommend coordinated control actions that optimize global rather than local objectives. The coherence interface implements specialized visualizations that show probability flows through the network, phase transition risks at each asset, and predicted cascade paths for various failure scenarios. Through this unified view, operators can make informed decisions about complex tradeoffs, such as accepting temporary inefficiency at one asset to prevent cascade failures elsewhere.

In operation, federated asset architecture 1900 maintains continuous cognitive processing across the distributed industrial system while respecting the logarithmic scaling laws that ensure computational tractability. Individual asset PCMs operate autonomously within their local contexts while fiber couplings ensure that insights and warnings propagate appropriately through the federation. The various alignment, synchronization, and building components ensure that the federation develops coherent global understanding that transcends the sum of individual asset knowledge, enabling proactive management of complex industrial systems with thousands of interacting components.

Figure 22:
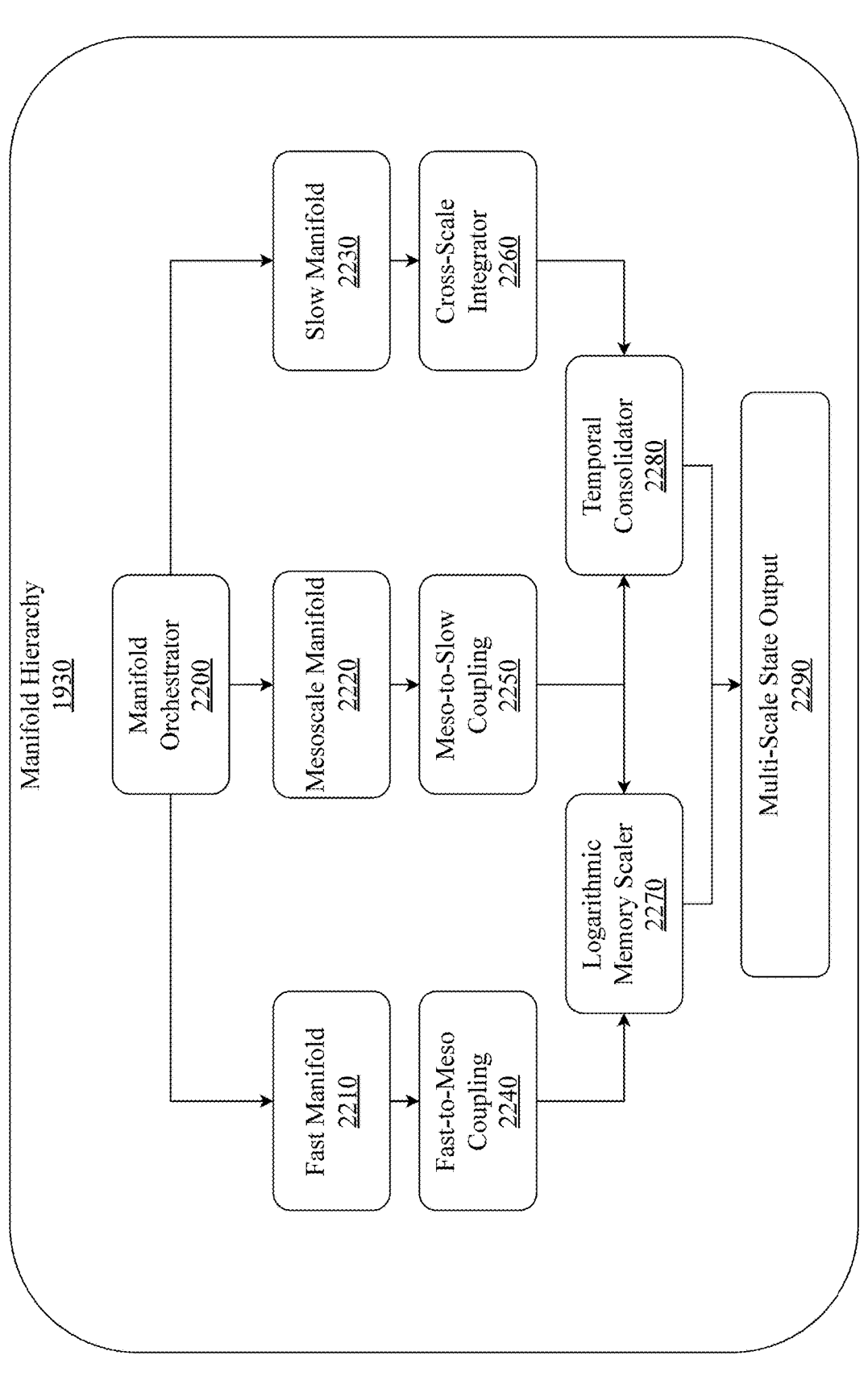
FIG. 22 is a block diagram illustrating an exemplary internal architecture of a manifold hierarchy.

FIG. 22 is a block diagram illustrating an exemplary internal architecture of a manifold hierarchy. Manifold hierarchy 1930 embodies the fundamental insight that industrial systems exhibit characteristic dynamics across vastly different timescales, requiring specialized representations and processing strategies for each temporal regime.

A manifold orchestrator 2200 serves as the central coordinator for the three-tier temporal structure, managing the flow of information between timescales and determining which events should be preserved, propagated, or pruned as they move through the hierarchy. This component implements the critical selection criteria that prevent the system from being overwhelmed by high-frequency noise while ensuring that significant anomalies are captured regardless of their temporal characteristics. The orchestrator continuously monitors the information content and novelty of events at each scale, applying the logarithmic scaling principle where the expected marginal novelty decreases as $1/n$ for the nth event, thereby ensuring that memory consumption grows only as $M(n)\sim\log n$ rather than linearly with operational history.

A fast manifold 2210 operates at the highest temporal resolution, processing real-time telemetry streams with update rates from milliseconds to seconds. This manifold captures instantaneous sensor readings such as vibration amplitudes, pressure fluctuations, flow velocities, and electrical measurements that characterize the moment-to-moment state of industrial equipment. The fast manifold 2210 must handle enormous data volumes—a single compressor station might generate millions of data points per hour—while identifying which patterns warrant elevation to higher temporal scales. Events in the fast manifold undergo noise-to-flow phase transitions when their action density exceeds critical thresholds, transforming from random fluctuations into coherent trajectories that indicate emerging operational patterns.

A mesoscale manifold 2220 operates at intermediate timescales from minutes to hours, encoding tactical information such as operator annotations, control adjustments, and transient operational modes. This manifold captures the decision-making layer of industrial operations where human operators and automated control systems respond to evolving conditions. For example, mesoscale manifold 2220 might track how operators adjust setpoints in response to demand changes, how equipment transitions between operating modes, or how maintenance activities affect system performance. The mesoscale undergoes static-to-coherent-to-generative phase transitions as patterns accumulate, first becoming recognizable, then predictable, and finally generating expectations about future tactical decisions.

A slow manifold 2230 encompasses the longest timescales from days to years, consolidating operational patterns into strategic schemas that represent institutional knowledge about the industrial system. This manifold encodes information such as seasonal demand patterns, equipment degradation curves, maintenance schedules, and long-term performance trends that evolve slowly but profoundly influence operational strategy. Slow manifold 2230 undergoes episodic-to-doctrinal phase transitions where isolated experiences coalesce into operational doctrines that guide future decision-making. For instance, after observing multiple equipment failures under similar conditions, the slow manifold develops schemas that recognize precursor patterns months before failures manifest.

A fast-to-meso coupling 2240 manages the selective elevation of information from millisecond sensor data to minute-scale tactical representations. This component implements filtering algorithms that distinguish between transient noise that can be safely discarded and significant events that require tactical attention. The coupling employs techniques such as surprise-based selection where events with high information content relative to predictions are promoted, persistence filtering where patterns that maintain coherence over multiple fast-manifold cycles are elevated, and threshold detection where specific operational boundaries trigger immediate escalation. Through these mechanisms, fast-to-meso coupling 2240 achieves compression ratios of 1000:1 or higher while preserving operationally relevant information.

A meso-to-slow coupling 2250 governs the consolidation of tactical patterns into strategic knowledge, determining which operational experiences warrant long-term preservation in the slow manifold. This coupling implements criteria based on factors such as but not limited to operational impact where events with significant consequences are preserved, pattern frequency where recurring tactical patterns are generalized into strategic principles, and novelty detection where unprecedented situations are retained for future reference. Meso-to-slow coupling 2250 performs abstraction operations that extract invariant features from specific instances, creating generalized schemas that apply across diverse operational contexts while discarding implementation details that lack strategic relevance.

A cross-scale integrator 2260 enables bidirectional influence between non-adjacent temporal scales, allowing fast events to directly impact strategic understanding and slow patterns to bias real-time processing. This component recognizes that certain events transcend the normal temporal hierarchy, such as catastrophic failures that immediately alter strategic planning or long-term trends that manifest as subtle biases in sensor readings. Cross-scale integrator 2260 maintains attention mechanisms that detect when patterns at one scale have implications for distant scales, creating bypass connections that preserve temporal causality while enabling rapid adaptation to significant events.

A logarithmic memory scaler 2270 implements the mathematical framework that ensures memory requirements grow sublinearly with operational history. This component maintains running estimates of information entropy at each temporal scale, dynamically adjusting retention thresholds to maintain constant memory pressure while preserving maximum information content. Logarithmic memory scaler 2270 may employ techniques such as but not limited to reservoir sampling where representative examples are maintained with decreasing probability over time, semantic deduplication where similar patterns are merged rather than stored separately, and progressive summarization where detailed records are replaced with statistical summaries as they age. Through these mechanisms, a system that has processed billions of events over years of operation requires only marginally more memory than one that has operated for months.

A temporal consolidator 2280 performs the critical function of transferring knowledge between temporal scales during designated consolidation periods, analogous to sleep states in biological systems. During these consolidation phases, temporal consolidator 2280 identifies patterns that span multiple timescales, strengthens associations between related events at different temporal resolutions, and prunes redundant or obsolete information to maintain cognitive efficiency. The consolidation process employs techniques such as replay-based reinforcement where important sequences are rehearsed to strengthen their encoding, cross-temporal association where causal relationships between events at different scales are identified and encoded, and compression-based pruning where information that can be reconstructed from other stored patterns is eliminated.

A multi-scale state output 2290 provides integrated access to the complete temporal hierarchy, presenting operators and downstream systems with contextually appropriate information drawn from the relevant temporal scale. This interface implements intelligent scale selection that automatically determines whether a query requires real-time sensor data, tactical operational context, or strategic historical perspective. For example, when diagnosing an immediate equipment anomaly, multi-scale state output 2290 might primarily draw from the fast manifold while enriching the assessment with relevant tactical patterns and historical precedents. The output interface maintains temporal coherence, ensuring that information from different scales is properly aligned and that causal relationships are preserved across temporal boundaries.

In operation, manifold hierarchy 1930 enables the industrial monitoring platform to maintain comprehensive awareness across all relevant timescales while respecting computational and memory constraints. Information flows upward through the hierarchy as patterns stabilize and demonstrate persistence, while strategic knowledge flows downward to bias tactical decisions and real-time processing. The logarithmic scaling ensures that the system can operate indefinitely without memory exhaustion, continuously learning and adapting while maintaining bounded resource consumption. Through this hierarchical temporal organization, the platform achieves the seemingly paradoxical capability of remembering everything important while forgetting almost everything, retaining only the logarithmically growing kernel of operationally significant knowledge.

Figure 23:
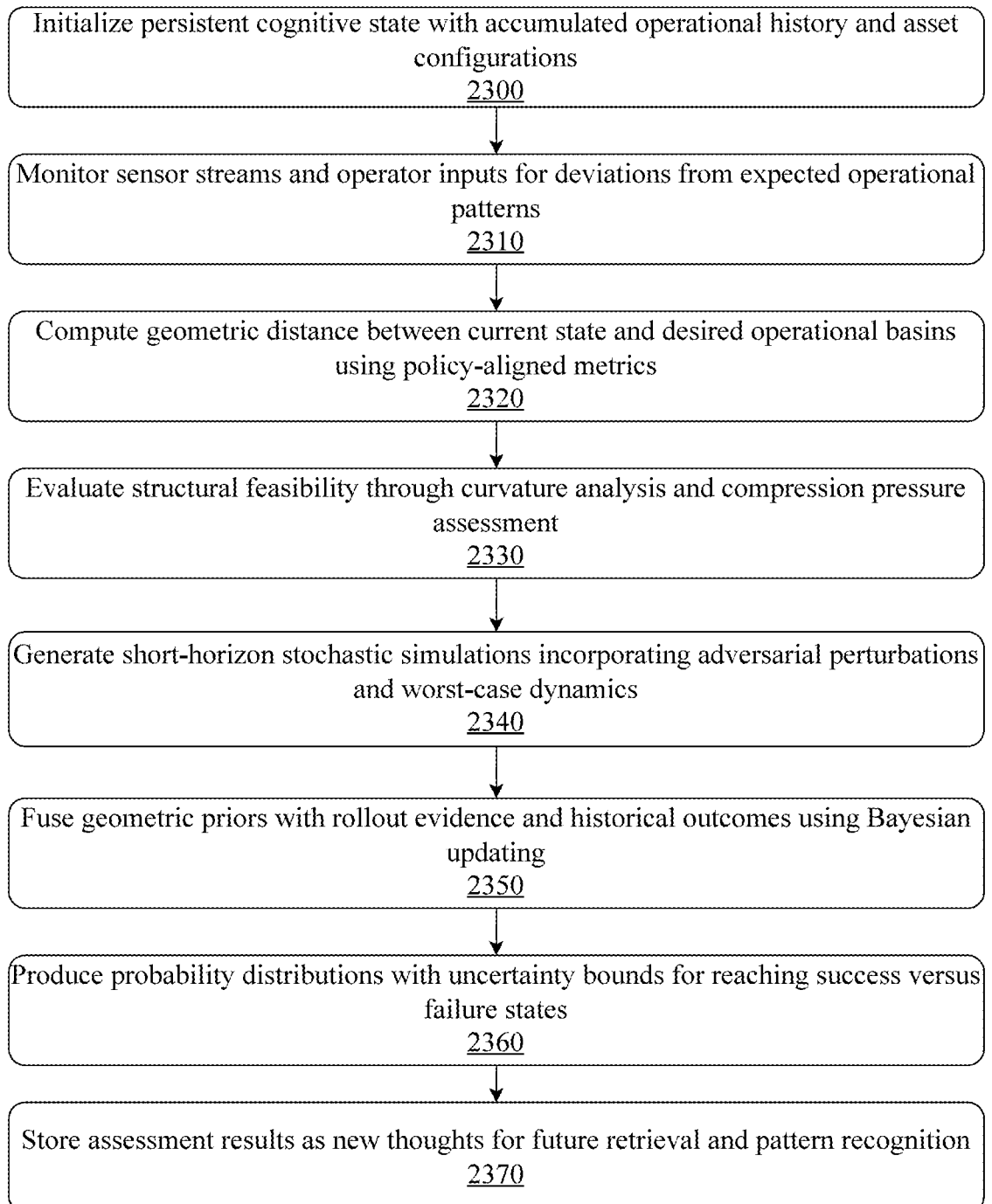
FIG. 23 is a flow diagram illustrating an exemplary method for geometric probability estimation for industrial asset states.

FIG. 23 is a flow diagram illustrating an exemplary method for geometric probability estimation for industrial asset states. In a first step 2300, initialize persistent cognitive state with accumulated operational history and asset configurations. This initialization process establishes the foundational knowledge base by loading previously learned patterns, operational schemas, and equipment-specific characteristics that have been accumulated over time. The initialization involves restoring serialized cognitive states that encode historical experiences, configuring manifold structures to reflect the specific topology and constraints of the monitored assets, and establishing baseline operational patterns against which future deviations will be measured. For industrial applications, this might include loading months or years of accumulated knowledge about normal operating envelopes, typical failure modes, seasonal variations, and equipment-specific quirks that influence operational behavior. The persistent nature of this initialization means that knowledge accumulates across operational sessions rather than resetting with each restart, enabling progressively more sophisticated understanding over time.

In a step 2310, monitor sensor streams and operator inputs for deviations from expected operational patterns. This continuous monitoring process involves analyzing real-time telemetry data against learned expectations to identify anomalies, trends, and emerging patterns that warrant further analysis. The monitoring encompasses both automated sensor readings such as pressure, temperature, flow, and vibration measurements, as well as human-generated inputs including operator annotations, control adjustments, and maintenance reports. Deviations are identified not through simple threshold violations but through comparison with expected patterns learned from historical operations, accounting for contextual factors such as current operating mode, ambient conditions, and upstream/downstream states. The monitoring process maintains temporal context, recognizing that certain deviations may be normal during startup but problematic during steady-state operation, or acceptable in isolation but concerning when combined with other indicators.

In a step 2320, compute geometric distance between current state and desired operational basins using policy-aligned metrics. This computation transforms the abstract notion of operational risk into a quantifiable geometric measure within the manifold representation. The geometric distance calculation traces potential paths from the current operational state to target regions representing successful outcomes, where shorter paths through stable regions indicate higher feasibility. Policy alignment ensures that distances reflect not just physical proximity but also account for control constraints, operational procedures, and safety requirements that may prohibit certain state transitions. The metric incorporates factors such as the energy required to transition between states, the stability of intermediate conditions, and the presence of irreversible transitions that would prevent recovery. For example, the geometric distance to a stable flow regime accounts not only for the difference in flow rates but also for pressure gradients, temperature constraints, and equipment limitations that affect the feasibility of reaching that regime.

In a step 2330, evaluate structural feasibility through curvature analysis and compression pressure assessment. This evaluation examines the local geometric properties of the operational manifold to determine whether proposed trajectories are dynamically stable and practically achievable. Curvature analysis identifies regions where the manifold exhibits sharp bends or twists indicating rapid changes in system behavior, bifurcation points where small perturbations lead to dramatically different outcomes, or unstable equilibria that cannot be maintained under realistic operating conditions. Compression pressure assessment quantifies the information-theoretic cost of the current state by measuring how tightly constrained the operational trajectories are, where high compression indicates limited flexibility to respond to disturbances. Together, these geometric measures provide a structural assessment of operational risk that goes beyond simple distance metrics to consider the dynamic stability and controllability of different operational regimes.

In a step 2340, generate short-horizon stochastic simulations incorporating adversarial perturbations and worst-case dynamics. This simulation process explores probable future trajectories by propagating the current state forward through learned transition dynamics while accounting for uncertainty and potential disturbances. Multiple parallel simulations are executed with different random seeds to capture the range of possible outcomes, with each trajectory incorporating stochastic noise representing measurement uncertainty, process variability, and external disturbances. Adversarial perturbations bias the simulations toward failure modes by introducing worst-case disturbances at critical moments, testing the robustness of operational strategies against hostile conditions. The simulations employ importance sampling techniques to ensure that rare but consequential events are adequately represented in the ensemble of trajectories. Short horizons, typically minutes to hours, balance computational efficiency with prediction accuracy, as uncertainty compounds rapidly in complex industrial systems.

In a step 2350, fuse geometric priors with rollout evidence and historical outcomes using Bayesian updating. This fusion process combines multiple sources of evidence to produce calibrated probability estimates that properly account for both prior knowledge and empirical observations. The Bayesian framework begins with prior distributions derived from geometric analysis, representing structural beliefs about operational feasibility based on manifold properties. These priors are systematically updated with evidence from stochastic simulations, where each trajectory contributes weighted evidence for success or failure based on its importance weight and terminal state. Historical outcomes from similar operational scenarios provide additional evidence, with kernel weighting ensuring that more relevant past experiences have greater influence on current estimates. The fusion process maintains explicit representation of uncertainty through posterior distributions rather than point estimates, distinguishing between aleatory uncertainty arising from inherent randomness and epistemic uncertainty reflecting limited knowledge.

In a step 2360, produce probability distributions with uncertainty bounds for reaching success versus failure states. This production process transforms the internal Bayesian posteriors into actionable assessments that can guide operational decisions. The probability distributions characterize not just the expected likelihood of different outcomes but also the confidence in those estimates through credible intervals and uncertainty bounds. Success probabilities indicate the likelihood of reaching desired operational states such as stable flow regimes or target production rates, while failure probabilities quantify risks of entering prohibited conditions such as equipment damage or safety violations. Uncertainty bounds explicitly represent the limits of predictive capability, widening when operating in novel conditions with limited historical precedent and narrowing in well-understood operational regimes with extensive empirical support. The distributions may be multimodal, reflecting scenarios where multiple distinct outcomes are possible depending on unresolved uncertainties or future control decisions.

In a step 2370, store assessment results as new thoughts for future retrieval and pattern recognition. This storage process ensures that each probability assessment contributes to the accumulating knowledge base, improving future predictions through experiential learning. The assessment results are encoded as structured thoughts that capture not just the final probability estimates but also the context, assumptions, and evidence that produced them. These thoughts are embedded into vector representations that preserve semantic relationships, enabling similar future scenarios to retrieve and leverage relevant past assessments. The storage process implements selective retention based on factors such as prediction accuracy, operational significance, and novelty, ensuring that the knowledge base grows with operationally relevant information rather than redundant observations. Over time, patterns emerge across multiple assessments, revealing systematic biases, recurring failure modes, and successful mitigation strategies that inform both immediate operational decisions and long-term strategic planning.

FIG. 24 is a flow diagram illustrating an exemplary method for federated cross-asset cognitive monitoring and coordination across a distributed industrial network. In a first step 2400, establish individual cognitive instances for each monitored asset within the distributed network. Initialization provisions a local context including but not limited to asset identifiers, operating envelopes, safety limits, and recent state, and binds it to clock synchronization and access control so observations are timestamp-consistent and policy-compliant. Cold-start handling loads baseline priors from commissioning data or nearby peer exemplars, and health checks verify that local sensors and effectors are responsive before enabling autonomous operation, ensuring that learning, inference, and short-horizon decisions remain asset-specific from the outset.

In a step 2410, maintain local manifold representations encoding asset-specific operational states and patterns. Incoming telemetry is organized as trajectories that preserve temporal order, recent derivatives, and context windows; updates occur at the cadence necessary to resolve local dynamics without aliasing. Drift detectors track slow shifts in regime, while outlier buffers retain rare but consequential episodes for later review. Provenance links attach each representation to source signals and operator annotations so that later recommendations can be audited back to evidence.

In a step 2420, connect asset manifolds through couplings that transmit structural influence between nodes. Couplings are declared with direction, latency expectations, and influence weights, then realized via publish/subscribe channels that carry compact structural descriptors instead of raw data (e.g., corridor width changes, instability indices, or feasible-set contractions). Bandwidth guards and backpressure protect slower peers, and privacy filters strip identifiers or quantize values so shared influence signals remain useful while minimizing exposure of sensitive details.

In a step 2430, monitor action-density thresholds to detect phase transitions from stable to critical states. The method estimates activity concentration over recent trajectories (e.g., kernel density or occupancy over path segments) and derives a criticality index that rises as operations crowd into narrow corridors or near constraints. Thresholds adapt to seasonality and local variance, promoting alerts as leading indicators rather than after faults manifest. When indices climb, sampling cadence and watchdog scrutiny escalate to shorten detection latency and prepare downstream assets for potential knock-on effects.

In a step 2440, propagate anomaly signals across coupled manifolds to alert downstream assets of emerging risks. Each signal includes a minimal payload location in state space, severity, confidence, and a time-to-live, to keep it lightweight and bounded in scope. Debounce and hysteresis policies prevent flapping; signatures and sequence numbers mitigate spoofing or replay. Receiving assets fuse multiple upstream warnings, simulate near-term impacts on their own feasible sets, and preemptively widen safety margins, reroute flows, or delay aggressive actions until upstream conditions normalize.

In a step 2450, consolidate cross-asset patterns into global schemas representing network-wide operational modes. Recurrent, multi-node behaviors such as coordinated demand surges or characteristic surge-recovery cycles, are summarized into schemas with applicability conditions, typical evolutions, and recommended playbooks. Schemas carry versioning and confidence audits, allowing the network to retire obsolete responses and refine successful ones as more evidence accrues, and they provide reusable templates for rapid recognition during future events.

In a step 2460, update relationship models between assets based on observed cascade dynamics and correlations. The method estimates lagged influence strengths and directions (e.g., via time-shifted correlation, intervention analysis, or transfer-entropy-style measures) to revise coupling weights and delays. Competing hypotheses are compared with information criteria and validated during drills or post-mortems;

edges strengthen or weaken according to evidence so the network's predictive propagation remains aligned with current realities instead of static assumptions.

In a step 2470, enter periodic sleep states to reorganize federated knowledge and strengthen cross-asset associations. During these windows, local memories are reconciled with global schemas, duplicates are pruned, stale structures are retired, and frequently co-occurring asset patterns are linked more tightly. The process compacts history into decision-relevant summaries, records governance metadata for auditability, and resets alert thresholds based on the latest distribution, yielding a federated memory that grows sublinearly while preserving structure needed for fast, coordinated response.

FIG. 25 is a flow diagram illustrating an exemplary method for multi-timescale cognitive processing that coordinates fast, meso, and slow representations within a persistent platform. In a first step 2500, capture high-frequency telemetry as trajectories within fast manifold representations. The method samples raw signals at the cadence required to resolve micro-events (e.g., milliseconds for vibration), then segments them into short-horizon paths that preserve temporal order, local derivatives, and recent context. Denoising and resampling are applied only to the extent they do not erase transient signatures that inform control, and windowing parameters are selected to maintain phase alignment with downstream estimators. The fast representation supports constant-time updates, enabling immediate anomaly scoring, micro-trend detection, and trigger generation for follow-on analysis without waiting for aggregation at longer horizons.

In a step 2510, aggregate tactical annotations and operator communications into mesoscale cognitive structures. The method fuses short notes, labels, procedural callouts, and coordination messages with statistics derived from fast trajectories to form intermediate abstractions that reflect current tactics, constraints, and intents. Natural-language inputs are normalized into canonical tags and time-bounded facts; quantitative summaries (e.g., rolling quantiles, rate-of-change thresholds) are attached as attributes. These mesoscale structures align human context with machine-observed patterns so that downstream planning can reason over both signal dynamics and operator objectives in a single representation.

In a step 2520, consolidate recurring operational patterns into slow-time schemas and strategic knowledge. The method identifies motifs that recur across shifts, campaigns, or seasons such as surge/settle cycles, maintenance-induced drifts, or weather-linked demand waves and encodes them as durable schemas with parameters, applicability conditions, and confidence intervals. Each schema records precursors, typical evolution, and successful interventions, creating reusable playbooks that summarize long-horizon tendencies. Promotion to slow-time requires sufficient recurrence and stability so the schema generalizes beyond idiosyncratic events.

In a step 2530, transfer information between temporal scales according to relevance and persistence criteria. Signals or patterns that remain salient across windows are promoted upward (fast, meso, slow) based on statistical persistence, cross-context consistency, and intervention utility; highly volatile or expired details are demoted or pruned. The transfer policy includes hysteresis to avoid thrashing, ensures that evidence trails (provenance links) are maintained across promotions, and supports back-propagation of "lessons learned" from slow schemas to refine meso-level tactics and fast-level triggers.

In a step 2540, apply logarithmic memory scaling to bound storage while preserving essential patterns. The method retains progressively fewer exemplars at longer horizons via sketching, clustering, and stratified sampling, so representative structure is preserved as volume grows. Summaries store sufficient statistics for reconstruction of decision-relevant features, while rare but high-impact outliers are safeguarded from down-sampling through importance criteria. This scaling keeps compute and storage sublinear in history length without sacrificing preparedness for low-frequency, high-consequence regimes.

In a step 2550, generate insights by connecting patterns across temporal scales during consolidation periods. Cross-scale linking explains how micro-level dynamics (e.g., transient pressure oscillations) roll up into mesoscale tactics (e.g., throttling policies) that, over time, shape slow-time strategies (e.g., seasonal set-point schedules). The method quantifies causal plausibility with time-lagged correlations, counterfactual comparisons, or controlled rollouts, and records the resulting hypotheses with confidence bounds so they can inform forecasts and operator recommendations.

In a step 2560, surface contextually relevant knowledge from the appropriate temporal scale based on current operational needs. Real-time control consults fast representations for immediate actuation; planning tools query mesoscale structures for near-term coordination and what-if analysis; executive reviews reference slow schemas for policy and capacity decisions. When uncertainty rises or conflicts are detected, the method automatically widens scope to adjacent scales (e.g., a fast-time anomaly triggers meso-time context retrieval) and reports the provenance of each recommendation to support auditability.

In a step 2570, maintain cognitive continuity across system restarts through persistent state serialization. At scheduled intervals and before shutdown, the method serializes each temporal tier and the cross-links among them, including active windows, promotion/demotion queues, schema parameters, and confidence metrics. Upon restart, deserialization restores short-, medium-, and long-horizon reasoning without cold-start penalties, allowing the platform to immediately resume monitoring, planning, and strategy execution with up-to-date context.

Exemplary Computing Environment

Figure 26:
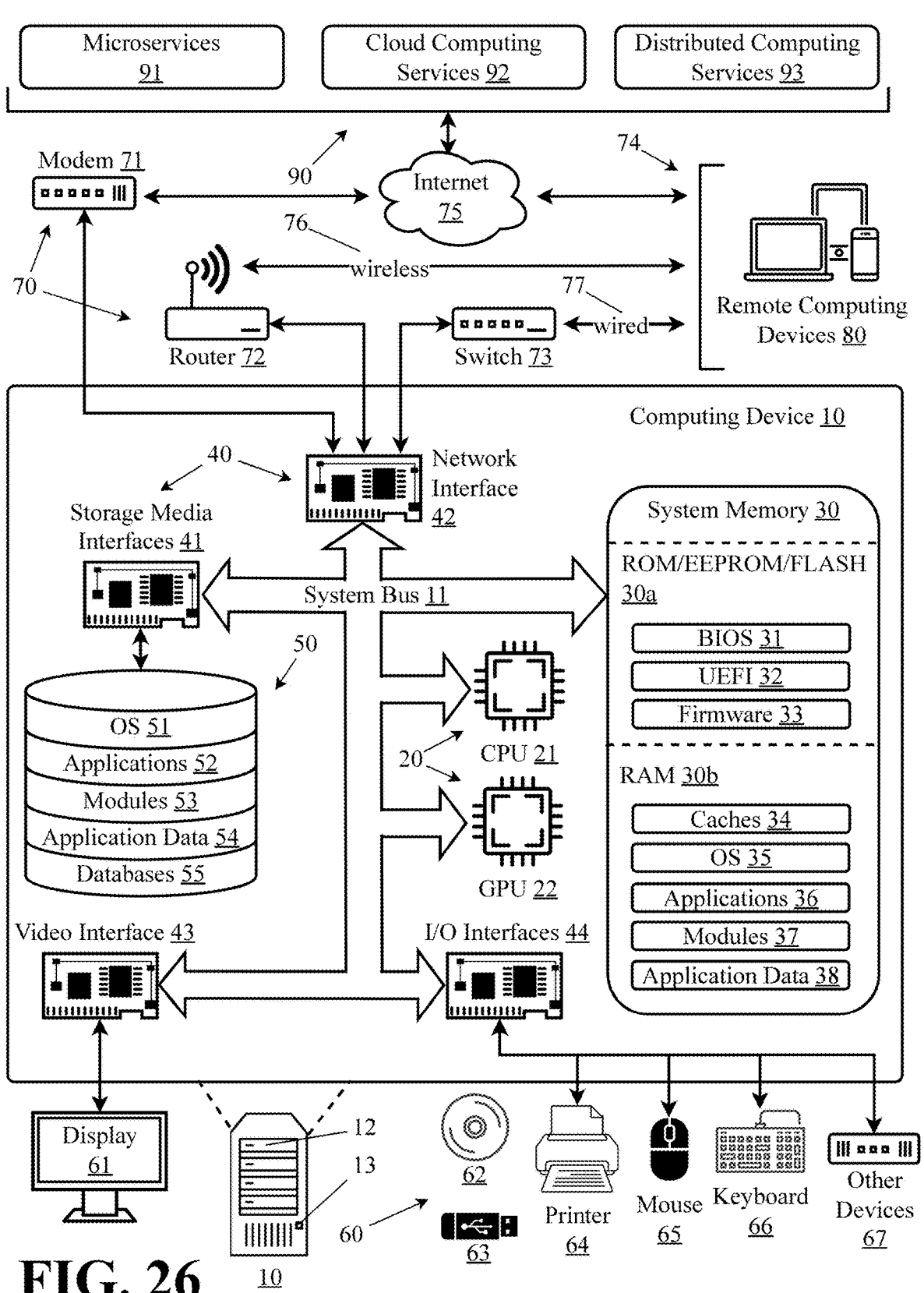
FIG. 26 illustrates an exemplary computing environment on which an embodiment described herein may be implemented.

FIG. 26 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable trans-ceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system comprising:
   a hardware memory, wherein the computer system is configured to execute software instructions stored on nontransitory machine-readable storage media that:
   initialize a persistent cognitive state with language and reasoning capabilities;
   monitor for external stimuli or internal thought triggers;
   retrieve relevant thoughts from a thought cache based on conceptual similarity to current context;
   generate responses using integrated language and reasoning models informed by retrieved thoughts;
   store new thoughts created during processing as vector representations in the thought cache;
   organize stored thoughts based on semantic relationships and temporal context;
   maintain multi-timescale cognitive representations and promote or demote information across manifolds with varying granularities;
   process cognitive representations in a correlation-preserved compressed representation subject to semantic-integrity validation and selectively decompress portions responsive to accuracy thresholds;
   enter periodic sleep states where a plurality of sleep-state operations modify a plurality of memory and thought structures; and
   maintain the persistent cognitive state across system restarts.

2. The computer system of claim 1, wherein organizing stored thoughts based on semantic relationships further comprises:
   converting thoughts into vector representations in a high-dimensional abstract space;
   clustering similar thoughts based on vector proximity;
   establishing connections between frequently co-activated thoughts; and
   strengthening or weakening thought connections based on activation patterns.

3. The computer system of claim 1, wherein the sleep state operations comprise:
   consolidating recent experiences from short-term to long-term memory;
   generating new insights by connecting previously unrelated thought patterns;
   pruning less relevant or outdated thoughts to optimize memory efficiency; and
   reorganizing memory structures for improved future retrieval.

4. The computer system of claim 1, wherein maintaining persistent cognitive state comprises:

serializing cognitive states including thought cache contents, relationship models, and system configuration;

creating periodic checkpoints of system state;

storing serialized state in persistent storage; and restoring complete cognitive state upon system restart.

5. A computer-implemented method comprising the steps of:

initializing a persistent cognitive state with language and reasoning capabilities;

monitoring for external stimuli or internal thought triggers;

retrieving relevant thoughts from a thought cache based on conceptual similarity to current context;

generating responses using integrated language and reasoning models informed by retrieved thoughts;

storing new thoughts created during processing as vector representations in the thought cache;

organizing stored thoughts based on semantic relationships and temporal context;

maintaining multi-timescale cognitive representations and promote or demote information across manifolds with varying granularities;

processing cognitive representations in a correlation-preserved compressed representation subject to semantic-integrity validation and selectively decompress portions responsive to accuracy thresholds;

entering periodic sleep states where a plurality of sleep-state operations modify a plurality of memory and thought structures; and maintaining the persistent cognitive state across system restarts.

6. The computer-implemented method of claim 5, wherein organizing stored thoughts based on semantic relationships further comprises:

converting thoughts into vector representations in a high-dimensional abstract space;

clustering similar thoughts based on vector proximity;

establishing connections between frequently co-activated thoughts; and strengthening or weakening thought connections based on activation patterns.

7. The computer-implemented method of claim 5, wherein the sleep state operations comprise:

consolidating recent experiences from short-term to long-term memory;

generating new insights by connecting previously unrelated thought patterns;

pruning less relevant or outdated thoughts to optimize memory efficiency; and reorganizing memory structures for improved future retrieval.

8. The computer-implemented method of claim 5, wherein maintaining persistent cognitive state comprises:

serializing cognitive states including thought cache contents, relationship models, and system configuration;

creating periodic checkpoints of system state;

storing serialized state in persistent storage; and restoring complete cognitive state upon system restart.

\* \* \* \* \*